US011040620B2

(12) United States Patent
Jang et al.

(10) Patent No.: US 11,040,620 B2
(45) Date of Patent: Jun. 22, 2021

(54) USER INTERFACE APPARATUS FOR VEHICLE, AND VEHICLE

(71) Applicant: LG ELECTRONICS INC., Seoul (KR)

(72) Inventors: Suhyung Jang, Seoul (KR); Gangseub Lee, Seoul (KR); Jongmin Baek, Seoul (KR); Sowoon YooN, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 170 days.

(21) Appl. No.: 16/181,881

(22) Filed: Nov. 6, 2018

(65) Prior Publication Data

US 2019/0070963 A1    Mar. 7, 2019

Related U.S. Application Data

(63) Continuation of application No. 15/429,843, filed on Feb. 10, 2017, now Pat. No. 10,144,290.

(Continued)

(51) Int. Cl.
*B60K 37/06* (2006.01)
*B60K 35/00* (2006.01)

(Continued)

(52) U.S. Cl.
CPC ......... *B60K 37/06* (2013.01); *B60H 1/00985* (2013.01); *B60K 35/00* (2013.01); *B60W 10/18* (2013.01); *B60W 10/20* (2013.01); *B60W 40/08* (2013.01); *B60W 40/105* (2013.01); *B60W 50/08* (2013.01); *B60W 50/082* (2013.01); *B60W 50/14* (2013.01);

(Continued)

(58) Field of Classification Search
CPC .... B60K 37/06; B60K 35/00; B60H 1/00985; B60W 10/18; B60W 10/20; B60W 40/08; B60W 40/105; B60W 50/08; B60W 50/082; B60W 50/14; G06F 3/04817
See application file for complete search history.

(56) References Cited

U.S. PATENT DOCUMENTS 9,834,224 B2    12/2017   Gordon et al.
2011/0164063 A1   7/2011   Shimotani et al.
(Continued)

FOREIGN PATENT DOCUMENTS

JP    8-184449 A      7/1996
JP    2009-75656 A    4/2009
(Continued)

*Primary Examiner* — Michael D Lang
(74) *Attorney, Agent, or Firm* — Birch, Stewart, Kolasch & Birch, LLP

(57) ABSTRACT

A user interface apparatus configured to be installed in a vehicle, the apparatus includes a touch screen; a gesture detecting unit configured to detect a gesture of a user and convert the gesture into an electrical signal; and at least one processor configured to determine whether a criteria for switching to an autonomous driving state is satisfied in response to the gesture detected by the gesture detecting unit being applied from a driver seat of the vehicle to the touch screen, further, in response to the criteria for switching to the autonomous driving state being satisfied, the at least one processor is further configured to switch a state of the vehicle to the autonomous driving state.

8 Claims, 39 Drawing Sheets

Related U.S. Application Data

(60) Provisional application No. 62/294,503, filed on Feb. 12, 2016.

(51) Int. Cl.

| | | |
|---|---|---|
| *G06F 3/0488* | (2013.01) | |
| *G06F 3/0481* | (2013.01) | |
| *B60W 40/08* | (2012.01) | |
| *B60W 40/105* | (2012.01) | |
| *B60H 1/00* | (2006.01) | |
| *B60W 50/08* | (2020.01) | |
| *G06F 3/0482* | (2013.01) | |
| *G06F 3/0484* | (2013.01) | |
| *B60W 50/14* | (2020.01) | |
| *B60W 10/18* | (2012.01) | |
| *B60W 10/20* | (2006.01) | |

(52) U.S. Cl.
CPC .......... *G06F 3/0482* (2013.01); *G06F 3/0488* (2013.01); *G06F 3/04817* (2013.01); *G06F 3/04842* (2013.01); *G06F 3/04883* (2013.01); *B60K 2370/11* (2019.05); *B60K 2370/111* (2019.05); *B60K 2370/141* (2019.05); *B60K 2370/146* (2019.05); *B60K 2370/148* (2019.05); *B60K 2370/149* (2019.05); *B60K 2370/1438* (2019.05); *B60K 2370/1464* (2019.05); *B60K 2370/1468* (2019.05); *B60K 2370/152* (2019.05); *B60K 2370/175* (2019.05); *B60K 2370/186* (2019.05); *B60K 2370/195* (2019.05); *B60K 2370/197* (2019.05); *B60K 2370/21* (2019.05); *B60K 2370/52* (2019.05); *B60K 2370/741* (2019.05); *B60K 2370/774* (2019.05); *B60W 2050/146* (2013.01); *B60W 2540/215* (2020.02); *G06F 2203/04803* (2013.01); *G06F 2203/04806* (2013.01); *G06F 2203/04808* (2013.01)

(56) References Cited

U.S. PATENT DOCUMENTS

| | | |
|---|---|---|
| 2014/0079285 A1 | 3/2014 | Yamashita et al. |
| 2015/0032322 A1* | 1/2015 | Wimmer ................ B60K 35/00 701/23 |
| 2016/0016473 A1 | 1/2016 | Van Wiemeersch et al. |

FOREIGN PATENT DOCUMENTS

| | | |
|---|---|---|
| JP | 5405876 B2 | 5/2016 |
| KR | 10-1367593 B1 | 2/2014 |
| KR | 10-2015-0072074 A | 6/2015 |
| WO | WO 2016/066258 A1 | 5/2016 |

* cited by examiner

USER INTERFACE APPARATUS FOR VEHICLE, AND VEHICLE

CROSS-REFERENCE TO RELATED APPLICATION

This application is the Continuation of U.S. application Ser. No. 15/429,843, filed on Feb. 10, 2017, which claims the priority benefit of U.S. Provisional Application No. 62/294,503, filed on Feb. 12, 2016, all of which are hereby expressly incorporated by reference into the present application.

BACKGROUND OF THE INVENTION

1. Field of the Invention

The present invention relates to a user interface apparatus for vehicle, and a vehicle including the same.

2. Description of the Related Art

A vehicle is an apparatus that moves in a direction desired by a user riding therein. A representative example of a vehicle is an automobile. A variety of sensors and electronic devices are mounted in vehicles for convenience of a user who uses the vehicle. In particular, for driving convenience, an Advanced Driver Assistance System (ADAS) has been actively studied. In addition, enormous efforts have been being made to develop autonomous vehicles.

In addition, various user interface apparatuses are provided in a vehicle. A user interface apparatus for a vehicle may be called a Center Information Display (CID) and an Audio Video navigation (AVN) system. Such a user interface apparatus receives a user input and outputs information for a user.

However, the user interface apparatus can be sometimes a hindrance to driving a vehicle. For example, if a user, applies a touch input or stares at a display unit to see information while driving the car, the user cannot focus on driving and may cause an accident.

SUMMARY OF THE INVENTION

The present invention has been made in view of the above problems, and it is one object of the present invention to provide a user interface apparatus for a vehicle, which determines whether a gesture is applied from the driver seat or the front passenger seat, and operates differently based on the determination.

It is another object of the present invention to provide a vehicle including a user interface apparatus.

In accordance with an embodiment of the present invention, the above and other objects can be accomplished by the provision of an user interface apparatus for a vehicle, the apparatus including a display unit, a gesture input unit configured to detect a gesture of a user, and a processor configured to, based on a motion trajectory of the gesture, determine a direction from which the gesture is applied, and, based on whether the gesture is applied from a driver seat or a front passenger seat, control the display unit to display a preset different screen.

Further scope of applicability of the present invention will become apparent from the detailed description given hereinafter. However, the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The embodiments will be described in detail with reference to the following drawings in which like reference numerals refer to like elements wherein.

DETAILED DESCRIPTION OF THE PREFERRED EMBODIMENTS

Figure 1:
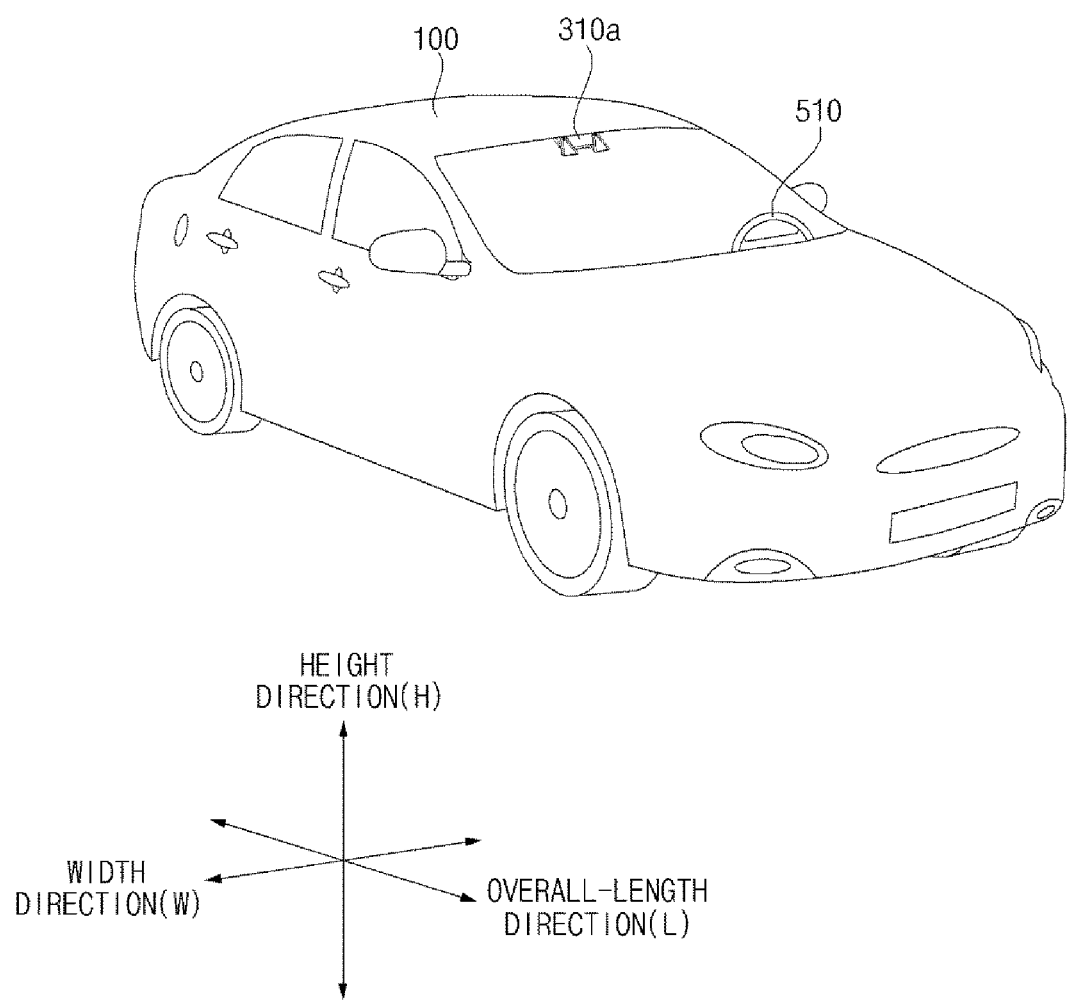
FIG. 1 is a diagram illustrating the external appearance of a vehicle according to an embodiment of the present invention.
Figure 2:
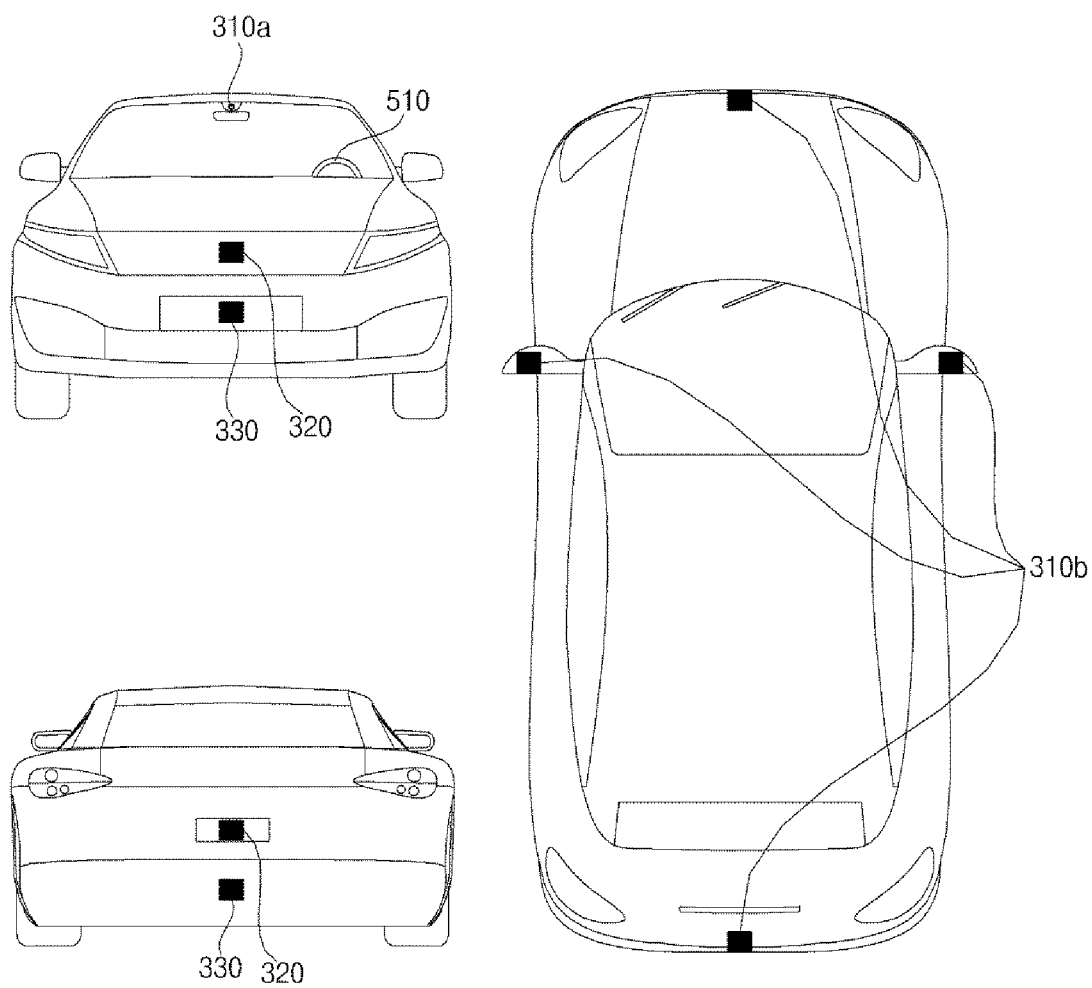
FIG. 2 are different angled views of the external appearance of a vehicle according to an embodiment of the present invention.
Figure 3:
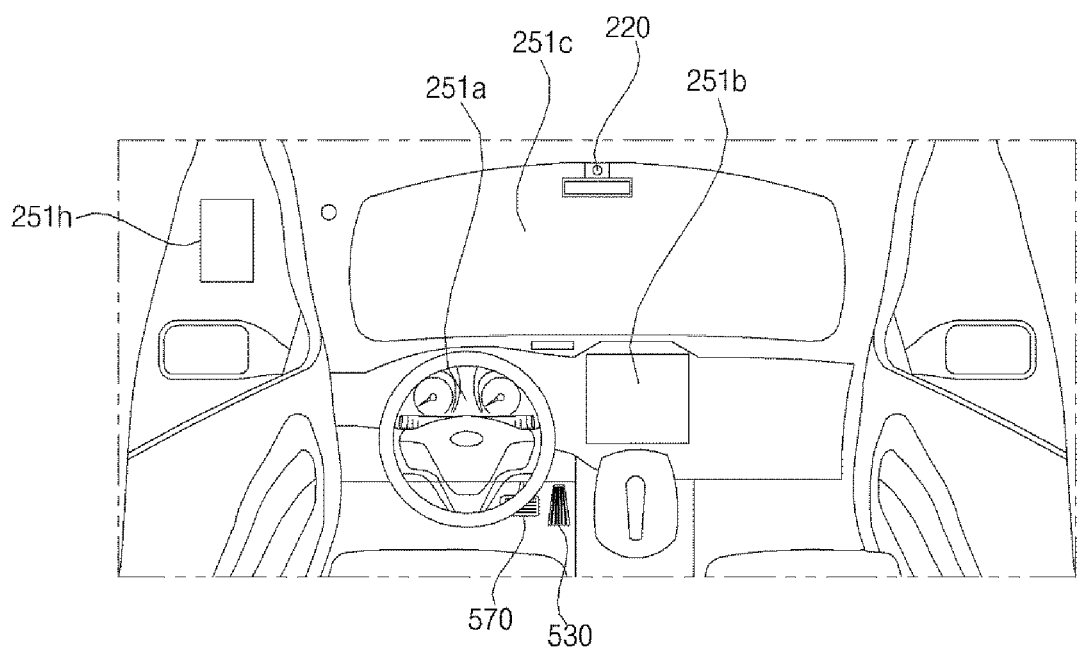
FIGS. 3 and 4 are diagrams illustrating the interior configuration of a vehicle according to an embodiment of the present invention.
Figure 4:
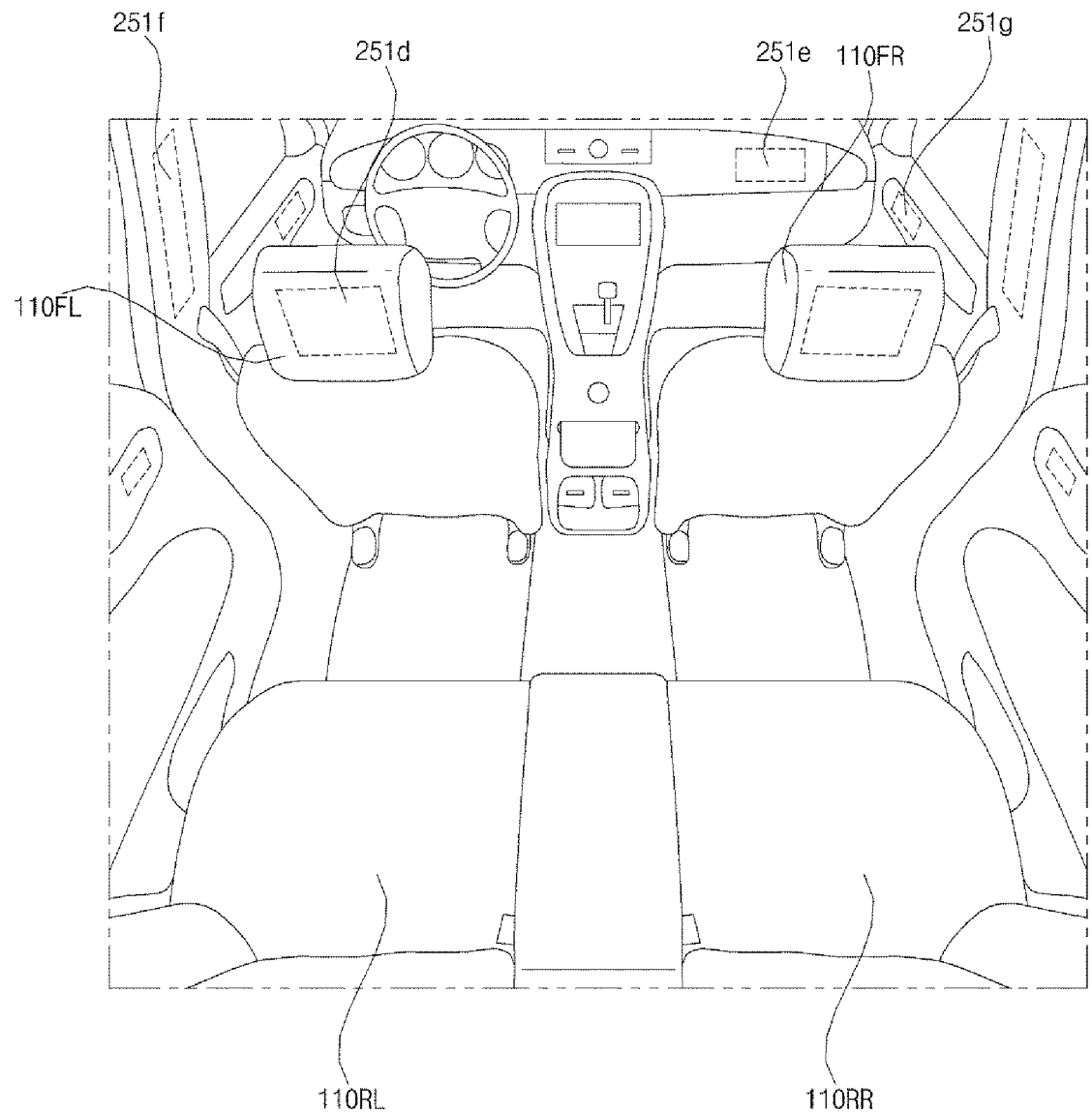

Hereinafter, the embodiments disclosed in the present specification will be described in detail with reference to the accompanying drawings, and the same or similar elements are denoted by the same reference numerals even though they are depicted in different drawings and redundant descriptions thereof will be omitted. In the following description, with respect to constituent elements used in the following description, the suffixes "module" and "unit" are used or combined with each other only in consideration of ease in the preparation of the specification, and do not have or serve as different meanings. Accordingly, the suffixes "module" and "unit" may be interchanged with each other. In addition, the accompanying drawings are provided only for a better understanding of the embodiments disclosed in the present specification and are not intended to limit the technical ideas disclosed in the present specification. Therefore, it should be understood that the accompanying drawings include all modifications, equivalents and substitutions included in the scope and sprit of the present invention.

Although the terms "first," "second," etc., may be used herein to describe various components, these components should not be limited by these terms. These terms are only used to distinguish one component from another component. When a component is referred to as being "connected to" or "coupled to" another component, it may be directly connected to or coupled to another component or intervening components may be present. In contrast, when a component is referred to as being "directly connected to" or "directly coupled to" another component, there are no intervening components present.

As used herein, the singular form is intended to include the plural forms as well, unless the context clearly indicates otherwise. In the present application, it will be further understood that the terms "comprises", includes," etc. specify the presence of stated features, integers, steps, operations, elements, components, or combinations thereof, but do not preclude the presence or addition of one or more other features, integers, steps, operations, elements, components, or combinations thereof.

A vehicle as described in this specification may include an automobile and a motorcycle. Hereinafter, a description will be given based on an automobile. A vehicle as described in this specification may include all of an internal combustion engine vehicle including an engine as a power source, a hybrid vehicle including both an engine and an electric motor as a power source, and an electric vehicle including an electric motor as a power source. In the following description, "the left side of the vehicle" refers to the left side in the forward driving direction of the vehicle, and "the right side of the vehicle" refers to the right side in the forward driving direction of the vehicle.

FIGS. 1 to 7 illustrate a vehicle 100 including a plurality of wheels rotated by a power source, and a steering input apparatus 510 for controlling a driving direction of the vehicle 100. The vehicle 100 may be an autonomous vehicle.

Further, the vehicle 100 can be switched to an autonomous driving mode or a manual mode in response to a user input. For example, in response to a user input received through a user interface apparatus 200, the vehicle 100 can be switched from a manual mode to an autonomous driving mode, or vice versa. The vehicle 100 may also be switched to an autonomous mode or a manual mode based on driving situation information.

The driving situation information may include information on an object outside the vehicle 100, navigation information, and vehicle state information. For example, the vehicle 100 can be switched from the manual mode to the autonomous driving mode, or vice versa, based on driving environment information generated by the object detection device 300.

In another example, the vehicle 100 can be switched from the manual mode to the autonomous driving mode, or vice versa, based on driving environment information received through a communication device 400. The vehicle 100 can be switched from the manual mode to the autonomous driving mode, or vice versa, based on information, data, and a signal provided from an external device.

When the vehicle 100 operates in the autonomous driving mode, the autonomous vehicle 100 can operate based on an operation system 700. For example, the autonomous vehicle 100 can operate based on information, data, or signals generated by a driving system 710, a parking system 740, and a parking out system 750.

While operating in the manual mode, the autonomous vehicle 100 may receive a user input for driving of the vehicle 100 through a driving manipulation device 500. In response to the user input received through the driving manipulation device 500, the vehicle 100 can operate.

The term "overall length" means the length from the front end to the rear end of the vehicle 100, the term "overall width" means the width of the vehicle 100, and the term "overall height" means the height from the bottom of the wheel to the roof. In the following description, the term "overall length direction L" may mean the reference direction for the measurement of the overall length of the vehicle 100, the term "overall width direction W" may mean the reference direction for the measurement of the overall width of the vehicle 100, and the term "overall height direction H" may mean the reference direction for the measurement of the overall height of the vehicle 100.

Figure 7:
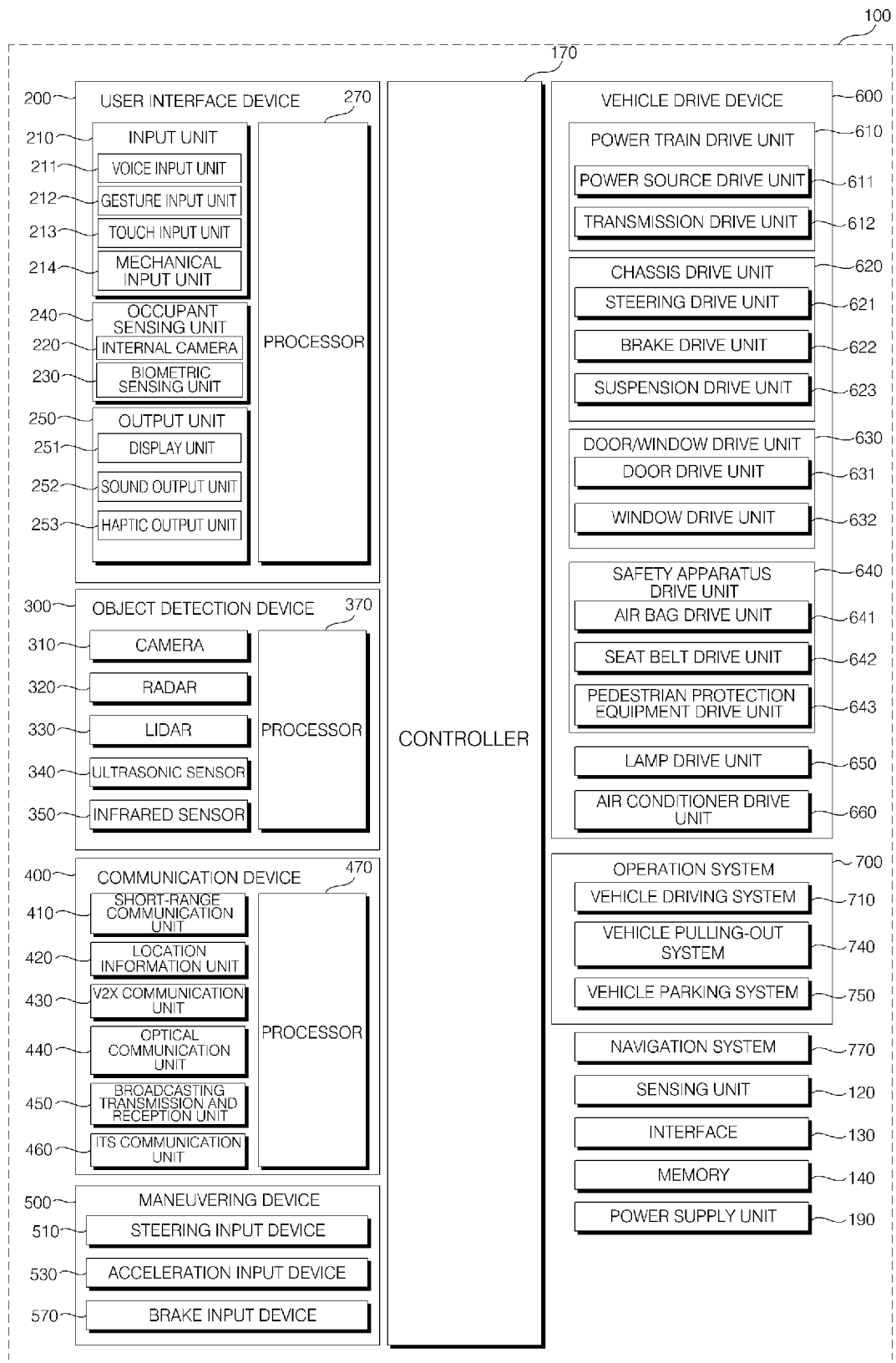
FIG. 7 is a block diagram illustrating a vehicle according to an embodiment of the present invention.

As illustrated in FIG. 7, the vehicle 100 may include the user interface apparatus 200, the object detection device 300, the communication device 400, the driving manipulation device 500, a vehicle drive device 600, the operation system 700, a navigation system 770, a sensing unit 120, an interface 130, a memory 140, a controller 170, and a power supply unit 190. The vehicle 100 may further include other components in addition to the aforementioned components, or may not include some of the aforementioned components.

The user interface apparatus 200 is provided to support communication between the vehicle 100 and a user. The user interface apparatus 200 can receive a user input, and provide information generated in the vehicle 100 to the user. The vehicle 100 may enable User Interfaces (UI) or User Experience (UX) through the user interface apparatus 200.

The user interface apparatus 200 may include an input unit 210, an internal camera 220, a biometric sensing unit 230, an output unit 250, and a processor 270. The user interface apparatus 200 may further include other components in addition to the aforementioned components, or may not include some of the aforementioned components.

The input unit 210 is configured to receive information from a user, and data collected in the input unit 210 can be analyzed by the processor 270 and then processed into a control command of the user. The input unit 210 can be disposed inside the vehicle 100. For example, the input unit 210 can be disposed in a region of a steering wheel, a region of an instrument panel, a region of a seat, a region of each pillar, a region of a door, a region of a center console, a region of a head lining, a region of a sun visor, a region of a windshield, or a region of a window.

The input unit 210 may include a voice input unit 211, a gesture input unit 212, a touch input unit 213, and a mechanical input unit 214. The voice input unit 211 may convert a voice input of a user into an electrical signal. The converted electrical signal may be provided to the processor 270 or the controller 170. The voice input unit 211 may include one or more microphones.

The gesture input unit 212 may convert a gesture input of a user into an electrical signal. The converted electrical signal may be provided to the processor 270 or the controller 170. The gesture input unit 212 can detect a gesture of a user and include at least one of an infrared sensor and an image sensor for sensing a gesture input of a user.

The gesture input unit 212 may sense a three-dimensional (3D) gesture input of a user. Thus, the gesture input unit 212 may include a plurality of light emitting units for outputting infrared light, or a plurality of image sensors. The gesture input unit 212 can sense the 3D gesture input by employing a Time of Flight (TOF) scheme, a structured light scheme, or a disparity scheme.

The touch input unit 213 can convert a user's touch input into an electrical signal, and the converted electrical signal can be provided to the processor 270 or the controller 170. The touch input unit 213 may include a touch sensor for sensing a touch input of a user. The touch input unit 210 may be integrally formed with a display unit 251 to implement a touch screen, and the touch screen can provide an input interface and an output interface between the vehicle 100 and the user.

The mechanical input unit 214 may include at least one of a button, a dome switch, a jog wheel, and a jog switch. An electrical signal generated by the mechanical input unit 214 may be provided to the processor 270 or the controller 170. The mechanical input unit 214 can be located on a steering wheel, a center fascia, a center console, a cockpit module, a door, etc.

Further, the internal camera 220 can acquire images of the inside of the vehicle 100. Also, the processor 270 can sense a user's condition based on the images of the inside of the vehicle 100. The processor 270 can acquire information on an eye gaze of the user and can sense a gesture of the user from the images of the inside of the vehicle 100.

The biometric sensing unit 230 can acquire biometric information of the user. The biometric sensing unit 230 may include a sensor for acquire biometric information of the user, and may utilize the sensor to acquire finger print information, heart rate information, etc. of the user. The biometric information may be used for user authentication.

The output unit 250 is configured to generate a visual, audio, or tactile output. The output unit 250 may include at least one of a display unit 251, a sound output unit 252, and a haptic output unit 253. The display unit 251 may display graphic objects corresponding to various types of information. The display unit 251 may include at least one of a Liquid Crystal Display (LCD), a Thin Film Transistor-Liquid Crystal Display (TFT LCD), an Organic Light-Emitting Diode (OLED), a flexible display, a 3D display, and an e-ink display.

The display unit 251 may form an inter-layer structure together with the touch input unit 213, or may be integrally formed with the touch input unit 213 to implement a touch screen. The display unit 251 may also be implemented as a Head Up Display (HUD). When implemented as a HUD, the display unit 251 may include a projector module in order to output information through an image projected on a windshield or a window.

The display unit 251 may include a transparent display attached on the windshield or the window. The transparent display can display a predetermined screen with a predetermined transparency. In order to achieve the transparency, the transparent display may include at least one of a transparent Thin Film Electroluminescent (TFEL) display, an Organic Light Emitting Diode (OLED) display, a transparent Liquid Crystal Display (LCD), a transmissive transparent display, and a transparent Light Emitting Diode (LED) display. The transparency of the transparent display may be adjustable.

In addition, the user interface apparatus 200 may include a plurality of display units 251a to 251g. The display unit 251 can be disposed in a region of a steering wheel, a region 251a, 251b, or 251e of an instrument panel, a region 251d of a seat, a region 251f of each pillar, a region 251g of a door, a region of a center console, a region of a head lining, a region of a sun visor, a region 251c of a windshield, or a region 251h of a window.

The sound output unit 252 converts an electrical signal from the processor 270 or the controller 170 into an audio signal, and outputs the audio signal. Thus, the sound output unit 252 may include one or more speakers. In addition, the haptic output unit 253 generates a tactile output. For example, the haptic output unit 253 can operate to vibrate a steering wheel, a safety belt, and seats 110FL, 110FR, 110RL, and 110RR so as to allow a user to recognize the output.

Further, the processor 270 can control the overall operation of each unit of the user interface apparatus 200. The user interface apparatus 200 may include a plurality of processors 270 or may not include the processor 270. When the user interface apparatus 200 does not include the processor 270, the user interface apparatus 200 can operate under the control of the controller 170 or a processor of a different device inside the vehicle 100. In addition, the user interface apparatus 200 may be referred to as a display device for vehicle and can operate under the control of the controller 170.

The object detection device 300 is an apparatus for detecting an object located outside the vehicle 100 and can generate object information based on sensing data. The object information may include information as to existence of an object, location information of an object, information on a distance between the vehicle 10 and the object, and information on relative speed of the vehicle 100 and the object. Further, the object may be any of various objects related to travelling of the vehicle 100.

Figure 5:
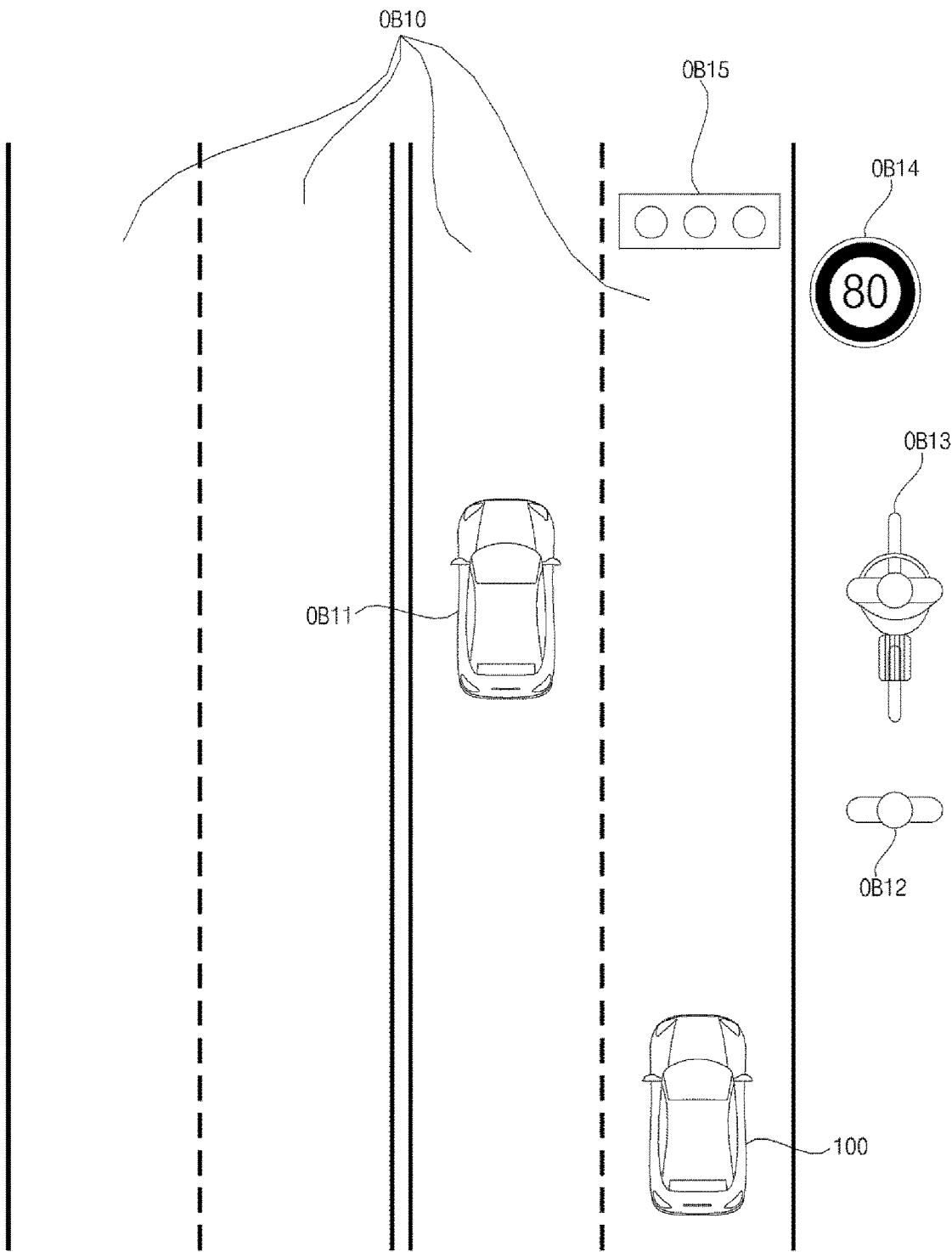
FIGS. 5 and 6 are diagrams illustrating an object according to an embodiment of the present invention.
Figure 6:
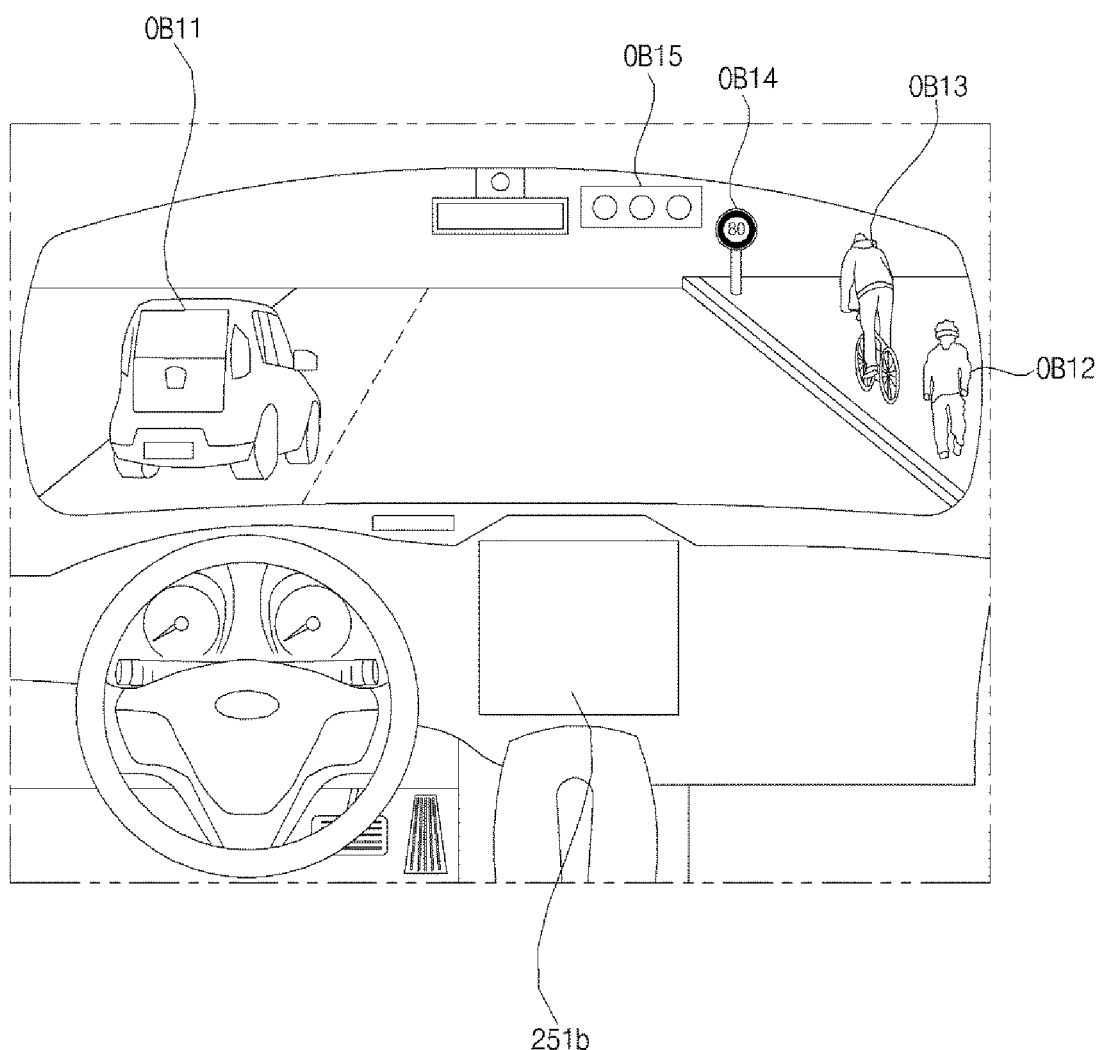

Referring to FIGS. 5 and 6, an object o may include a lane OB10, a nearby vehicle OB11, a pedestrian OB12, a two-wheeled vehicle OB13, a traffic signal OB14 and OB15, a light, a road, a structure, a bump, a geographical feature, an animal, etc. Further, the lane OB10 may be a lane in which the vehicle 100 is traveling or a lane next to the lane in which the vehicle 100 is traveling and may include left and right lines that define the lane.

The nearby vehicle OB11 may be a vehicle that is travelling in the vicinity of the vehicle 100. Further, the nearby vehicle OB11 may be a vehicle within a predetermined distance from the vehicle 100. For example, the nearby vehicle OB11 may be a vehicle that is preceding or following the vehicle 100. In addition, the pedestrian OB12 may be a person in the vicinity of the vehicle 100 such as a person within a predetermined distance from the vehicle 100. For example, the pedestrian OB12 may be a person on a sidewalk or on the roadway.

The two-wheeled vehicle OB13 is a vehicle that is located in the vicinity of the vehicle 100 and moves with two wheels. The two-wheeled vehicle OB13 may be a vehicle that has two wheels within a predetermined distance from the vehicle 100. For example, the two-wheeled vehicle OB13 may be a motorcycle or a bike on a sidewalk or the roadway.

The traffic signal may include a traffic light OB15, a traffic sign plate OB14, and a pattern or text painted on a road surface. The light may be light generated by a lamp provided in the nearby vehicle. Further, the light may be light generated by a street light. The light may also be solar light. The road may include a road surface, a curve, and slopes, such as an upward slope and a downward slope.

The structure may be a body located around the road in the state of being fixed onto the ground. For example, the structure may include a streetlight, a roadside tree, a building, a traffic light, and a bridge. The geographical feature may include a mountain and a hill. In addition, the object may be classified as a movable object or a stationary object, and the movable object may include a nearby vehicle and a pedestrian. For example, the stationary object may include a traffic signal, a road, and a structure.

The object detection device 300 may include a camera 310, a radar 320, a lidar 330, an ultrasonic sensor 340, an infrared sensor 350, and a processor 370. The object detection device 300 may further include other components in addition to the aforementioned components, or may not include some of the aforementioned components.

The camera 310 can be located at an appropriate position outside the vehicle 100 in order to acquire images of the outside of the vehicle 100. The camera 310 may be a mono camera, a stereo camera 310a, an Around View Monitoring (AVM) camera 310b, or a 360-degree camera. Further, the camera 310 can acquire location information of an object, information on a distance to the object, and information on a speed relative to the object, by using various image processing algorithms.

For example, the camera 310 can acquire the information on the distance to the object and information on the speed relative to the object, based on change over time in size of the object, the change which is detected in acquired images. In another example, the camera 310 can acquire the information on the distance to the object and information on the speed relative to the object, by using a pin hole model or profiling a road surface.

In addition, the camera 310 can acquire the information on the distance to the object and the information on the speed relative to the object, based on information on disparity in stereo images acquired by a stereo camera 310a. For example, the camera 310 can be disposed near a front windshield in the vehicle 100 in order to acquire images of the front of the vehicle 100. Alternatively, the camera 310 can be disposed around a front bumper or a radiator grill.

In another example, the camera 310 can be disposed near a rear glass in the vehicle 100 in order to acquire images of the rear of the vehicle 100. Alternatively, the camera 310 can be disposed around a rear bumper, a trunk, or a tailgate. In yet another example, the camera 310 can be disposed near at least one of the side windows in the vehicle 100 in order to acquire images of the side of the vehicle 100. Alternatively, the camera 310 can be disposed around a side mirror, a fender, or a door. The camera 310 can provide an acquired image to the processor 370.

The radar 320 may include an electromagnetic wave transmission unit and an electromagnetic wave reception unit. The radar 320 may be realized as a pulse radar or a continuous wave radar depending on the principle of emission of an electronic wave. In addition, the radar 320 may be realized as a Frequency Modulated Continuous Wave (FMCW) type radar or a Frequency Shift Keying (FSK) type radar depending on the waveform of a signal.

The radar 320 can detect an object through the medium of an electromagnetic wave by employing a time of flight (TOF) scheme or a phase-shift scheme, and can detect a location of the detected object, the distance to the detected object, and the speed relative to the detected object. Further, the radar 320 can be located at an appropriate position outside the vehicle 100 in order to sense an object located in front of the vehicle 100, an object located to the rear of the vehicle 100, or an object located to the side of the vehicle 100.

The lidar 330 may include a laser transmission unit and a laser reception unit. Further, the lidar 330 may be implemented by the TOF scheme or the phase-shift scheme. The lidar 330 may also be implemented as a drive type lidar or a non-drive type lidar. When implemented as the drive type lidar, the lidar 300 can rotate by a motor and detect an object in the vicinity of the vehicle 100.

When implemented as the non-drive type lidar, the lidar 300 can utilize a light steering technique to detect an object located within a predetermined distance from the vehicle 100. The lidar 330 can also detect an object through the medium of laser light by employing the TOF scheme or the phase-shift scheme, and can detect a location of the detected object, the distance to the detected object, and the speed relative to the detected object. Further, the lidar 330 can be located at an appropriate position outside the vehicle 100 in order to sense an object located in front of the vehicle 100, an object located to the rear of the vehicle 100, or an object located to the side of the vehicle 100.

The ultrasonic sensor 340 may include an ultrasonic wave transmission unit and an ultrasonic wave reception unit. The ultrasonic sensor 340 can detect an object based on an ultrasonic wave, and can detect a location of the detected object, the distance to the detected object, and the speed relative to the detected object. Further, the ultrasonic sensor 340 can be located at an appropriate position outside the vehicle 100 in order to detect an object located in front of the vehicle 100, an object located to the rear of the vehicle 100, and an object located to the side of the vehicle 100.

The infrared sensor 350 may include an infrared light transmission unit and an infrared light reception unit. The infrared sensor 350 can detect an object based on infrared light, and can detect a location of the detected object, the distance to the detected object, and the speed relative to the detected object. Further, the infrared sensor 350 can be located at an appropriate position outside the vehicle 100 in order to sense an object located in front of the vehicle 100, an object located to the rear of the vehicle 100, or an object located to the side of the vehicle 100.

The processor 370 can control the overall operation of each unit of the object detection device 300. The processor 370 can detect and classify an object by comparing data sensed by the camera 310, the radar 320, the lidar 330, the ultrasonic sensor 340, and the infrared sensor 350 with pre-stored data. Further, the processor 370 can detect and track an object based on acquired images. The processor 370 can, for example, calculate the distance to the object and the speed relative to the object by using image processing algorithms.

For example, the processor 370 can acquire information on the distance to the object and information on the speed relative to the object based on change over time in size of the object in acquired images. For example, the processor 370 can acquire information on the distance to the object or information on the speed relative to the object by employing a pin hole model or by profiling a road surface. For example, the processor 370 can acquire information on the distance to the object and information on the speed relative to the object based on information on disparity in stereo images acquired from the stereo camera 310a.

The processor 370 can detect and track an object based on a reflection electromagnetic wave which is formed as a result of reflection a transmission electromagnetic wave by the object. Based on the electromagnetic wave, the processor 370 can, for example, calculate the distance to the object and the speed relative to the object.

The processor 370 can detect and track an object based on a reflection laser light which is formed as a result of reflection of transmission laser by the object. Based on the laser light, the processor 370 can, for example, calculate the distance to the object and the speed relative to the object. The processor 370 can detect and track an object based on a reflection ultrasonic wave which is formed as a result of reflection of a transmission ultrasonic wave by the object. Based on the ultrasonic wave, the processor 370 can, for example, calculate the distance to the object and the speed relative to the object.

The processor 370 can detect and track an object based on reflection infrared light which is formed as a result of reflection of transmission infrared light by the object. Based on the infrared light, the processor 370 can, for example, calculate the distance to the object and the speed relative to the object.

The object detection device 300 may include a plurality of processors 370 or may not include the processor 370. For example, each of the camera 310, the radar 320, the lidar 330, the ultrasonic sensor 340, and the infrared sensor 350 may include its own processor. When the object detection device 300 does not include the processor 370, the object detection device 300 can operate under the control of the controller 170 or a processor inside the vehicle 100. The object detection device 300 can operate under the control of the controller 170.

The communication device 400 is configured to perform communication with an external device. Here, the external device may be a nearby vehicle, a mobile terminal, or a server. To perform communication, the communication device 400 may include at least one of a transmission antenna, a reception antenna, a Radio Frequency (RF) circuit capable of implementing various communication protocols, and an RF device.

The communication device 400 may include a short-range communication unit 410, a location information unit 420, a V2X communication unit 430, an optical communication unit 440, a broadcasting transmission and reception unit 450, an Intelligent Transport Systems (ITS) communication unit 460, and a processor 470. The communication device 400 may further include other components in addition to the aforementioned components, or may not include some of the aforementioned components.

The short-range communication unit 410 is configured to perform short-range communication. The short-range communication unit 410 may support short-range communication using at least one of Bluetooth™, Radio Frequency IDdentification (RFID), Infrared Data Association (IrDA), Ultra-WideBand (UWB), ZigBee, Near Field Communication (NFC), Wireless-Fidelity (Wi-Fi), Wi-Fi Direct, and Wireless USB (Wireless Universal Serial Bus).

The short-range communication unit 410 may form wireless area networks to perform short-range communication between the vehicle 100 and at least one external device. The location information unit 420 is configured to acquire location information of the vehicle 100. For example, the location information unit 420 may include a Global Positioning System (GPS) module or a Differential Global Positioning System (DGPS) module.

The V2X communication unit 430 is configured to perform wireless communication between a vehicle and a server (that is, vehicle to infra (V2I) communication), wireless communication between a vehicle and a nearby vehicle (that is, vehicle to vehicle (V2V) communication), or wireless communication between a vehicle and a pedestrian (that is, vehicle to pedestrian (V2P) communication). The optical communication unit 440 is configured to perform communication with an external device through the medium of light. Further, the optical communication unit 440 may include a light emitting unit, which converts an electrical signal into an optical signal and transmits the optical signal to the outside, and a light receiving unit which converts a received optical signal into an electrical signal. The light emitting unit may be integrally formed with a lamp provided included in the vehicle 100.

The broadcasting transmission and reception unit 450 is configured to receive a broadcast signal from an external broadcasting management server or transmit a broadcast signal to the broadcasting management server through a broadcasting channel. The broadcasting channel may include a satellite channel, and a terrestrial channel. The broadcast signal may include a TV broadcast signal, a radio broadcast signal, and a data broadcast signal.

The ITS communication unit 460 may exchange information, data, or signals with a traffic system. The ITS communication unit 460 can provide acquired information or data to the traffic system. Further, the ITS communication unit 460 may receive information, data, or signals from the traffic system. For example, the ITS communication unit 460 may receive traffic information from the traffic system and provide the traffic information to the controller 170. In another example, the ITS communication unit 460 may receive a control signal from the traffic system, and provide the control signal to the controller 170 or a processor provided in the vehicle 100.

The processor 470 can control the overall operation of each unit of the communication device 400. The communication device 400 may include a plurality of processors 470, or may not include the processor 470. When the communication device 400 does not include the processor 470, the communication device 400 can operate under the control of the controller 170 or a processor of a device inside of the vehicle 100.

In addition, the communication device 400 may implement a vehicle display device, together with the user interface apparatus 200. In this instance, the vehicle display device may be referred to as a telematics device or an Audio Video Navigation (AVN) device. The communication device 400 can operate under the control of the controller 170.

The driving manipulation device 500 is configured to receive a user input for driving the vehicle 100. In the manual mode, the vehicle 100 can operate based on a signal provided by the driving manipulation device 500. The driving manipulation device 500 may include a steering input apparatus 510, an acceleration input device 530, and a brake input device 570.

The steering input apparatus 510 receives a user input with regard to the direction of travel of the vehicle 100. The steering input apparatus 510 may take the form of a wheel to enable a steering input through the rotation thereof and may be provided as a touchscreen, a touch pad, or a button.

The acceleration input device 530 receives a user input for acceleration of the vehicle 100, and the brake input device 570 receives a user input for deceleration of the vehicle 100. Each of the acceleration input device 530 and the brake input device 570 may take the form of a pedal. The acceleration input device or the brake input device may also be configured as a touch screen, a touch pad, or a button.

The driving manipulation device 500 can operate under the control of the controller 170. Further, the vehicle drive device 600 is configured to electrically control the operation of various devices of the vehicle 100 and may include a power train drive unit 610, a chassis drive unit 620, a door/window drive unit 630, a safety apparatus drive unit 640, a lamp drive unit 650, and an air conditioner drive unit 660.

The vehicle drive device 600 may further include other components in addition to the aforementioned components, or may not include some of the aforementioned components. In addition, the vehicle drive device 600 may include a processor. Each unit of the vehicle drive device 600 may also include its own processor.

The power train drive unit 610 controls the operation of a power train and may include a power source drive unit 611 and a transmission drive unit 612. Further, the power source drive unit 611 can control a power source of the vehicle 100.

When a fossil fuel-based engine is the power source, the power source drive unit 611 can perform electronic control of the engine. As such the power source drive unit 611 can control, for example, the output torque of the engine. The power source drive unit 611 can also adjust the output toque of the engine under the control of the controller 170.

When an electric motor is the power source, the power source drive unit 611 can control the motor. For example, the power source drive unit 610 can control, for example, the RPM and toque of the motor under the control of the controller 170.

The transmission drive unit 612 controls a transmission and adjusts the state of the transmission. The transmission drive unit 612 can adjust a state of the transmission to a drive (D), reverse (R), neutral (N), or park (P) state. Meanwhile, when an engine is the power source, the transmission drive unit 612 can adjust a gear-engaged state to the drive position D.

The chassis drive unit 620 can control the operation of a chassis and may include a steering drive unit 621, a brake drive unit 622, and a suspension drive unit 623. The steering drive unit 621 can perform electronic control of a steering apparatus provided inside the vehicle 100 and change the direction of travel of the vehicle 100.

The brake drive unit 622 can perform electronic control of a brake apparatus provided inside the vehicle 100. For example, the brake drive unit 622 can reduce the speed of the vehicle 100 by controlling the operation of a brake located at a wheel. In addition, the brake drive unit 622 can control a plurality of brakes individually and apply a different degree-braking force to each wheel.

The suspension drive unit 623 can perform electronic control of a suspension apparatus inside the vehicle 100. For example, when the road surface is uneven, the suspension drive unit 623 can control the suspension apparatus so as to reduce the vibration of the vehicle 100. In addition, the suspension drive unit 623 can control a plurality of suspensions individually.

The door/window drive unit 630 can perform electronic control of a door apparatus or a window apparatus inside the vehicle 100. In addition, the door/window drive unit 630 may include a door drive unit 631 and a window drive unit 632.

The door drive unit 631 can control the door apparatus and control opening or closing of a plurality of doors included in the vehicle 100. Further, the door drive unit 631 can control opening or closing of a trunk or a tail gate and control opening or closing of a sunroof.

Further, the window drive unit 632 can perform electronic control of the window apparatus and control opening or closing of a plurality of windows included in the vehicle 100. The safety apparatus drive unit 640 can perform electronic control of various safety apparatuses provided inside the vehicle 100 and may include an airbag drive unit 641, a safety belt drive unit 642, and a pedestrian protection equipment drive unit 643.

The airbag drive unit 641 can perform electronic control of an airbag apparatus inside the vehicle 100. For example, upon detection of a dangerous situation, the airbag drive unit 641 can control an airbag to be deployed. In addition, the safety belt drive unit 642 can perform electronic control of a seatbelt apparatus inside the vehicle 100. For example, upon detection of a dangerous situation, the safety belt drive unit 642 can control passengers to be fixed onto seats 110FL, 110FR, 110RL, and 110RR with safety belts.

The pedestrian protection equipment drive unit 643 can perform electronic control of a hood lift and a pedestrian airbag. For example, upon detection of a collision with a pedestrian, the pedestrian protection equipment drive unit 643 can control a hood lift and a pedestrian airbag to be deployed.

In addition, the lamp drive unit 650 can perform electronic control of various lamp apparatuses provided inside the vehicle 100, and the air conditioner drive unit 660 can perform electronic control of an air conditioner inside the vehicle 100. For example, when the inner temperature of the vehicle 100 is high, the air conditioner drive unit 660 can operate the air conditioner so as to supply cool air to the inside of the vehicle 100.

In addition, the vehicle drive device 600 may include a processor. Each unit of the vehicle dive device 600 may also include its own processor. Further, the vehicle drive device 600 can operate under the control of the controller 170. The operation system 700 is a system for controlling the overall driving operation of the vehicle 100 and can operate in the autonomous driving mode.

The operation system 700 may include the driving system 710, the parking out system 740, and the parking system 750. The operation system 700 may further include other components in addition to the aforementioned components, or may not include some of the aforementioned component.

In addition, the operation system 700 may include a processor. Each unit of the operation system 700 may also include its own processor. When the operation system 700 is implemented as software, the operation system 700 may be a subordinate concept of the controller 170. The operation system 700 may be a concept including at least one of the user interface apparatus 200, the object detection device 300, the communication device 400, the driving manipulation device 500, the vehicle drive device 600, the navigation system 770, and the sensing unit 120, and the controller 170.

The driving system 710 can perform driving of the vehicle 100 by providing a control signal to the vehicle drive device 600 in response to reception of navigation information from the navigation system 770, in response to reception of object information from the object detection device 300, and in response to reception of a signal from an external device through the communication device 400.

Further, the driving system 710 may include at least one of the user interface apparatus 200, the object detection device 300, the communication device 400, the driving manipulation device 500, the vehicle drive device 600, the navigation system 770, the sensing unit 120, and the controller to perform driving of the vehicle 100. The driving system 170 can thus be referred to as a vehicle driving control apparatus.

Further, the vehicle pulling-out system 740 can park the vehicle 100 out of a parking space. For example, the vehicle pulling-out system 740 can move the vehicle 100 out of a parking space, by providing a control signal to the vehicle drive device 600 in response to reception of navigation information from the navigation system 770, in response to reception of object information from the object detection device 300, and in response to reception of a signal from an external device.

In addition, the vehicle pulling-out system 740 may include at least one of the user interface apparatus 200, the object detection device 300, the communication device 400, the driving manipulation device 500, the vehicle drive device 600, the navigation system 770, the sensing unit 120, and the controller 170 to park the vehicle 100 out of a parking space. The vehicle pulling-out system 740 may be referred to as a vehicle pulling-out control apparatus.

In addition, the parking system 750 can park the vehicle 100 in a parking space, by providing a control signal to the vehicle drive device 600 in response to reception of navigation information from the navigation system 770, in response to reception of object information from the object detection device 300, and in response to reception of a signal from an external device. The parking system 750 may include at least one of the user interface apparatus 200, the object detection device 300, the communication device 400, the driving manipulation device 500, the vehicle drive device 600, the navigation system 770, the sensing unit 120, and the controller 170 to park the vehicle 100 in a parking space. The parking system 750 can thus be referred to as a vehicle parking control apparatus.

In addition, the navigation system 770 can provide navigation information including at least one of map information, information on a set destination, information on a route to the set destination, information on various objects along the route, lane information, and information on the current location of a vehicle. The navigation system 770 may also include a memory and a processor. The memory can store navigation information, and the processor can control the operation of the navigation system 770. The navigation system 770 can also update pre-stored information by receiving information from an external device through the communication device 400. The navigation system 770 may be classified as an element of the user interface apparatus 200.

In addition, the sensing unit 120 can sense the state of the vehicle. The sensing unit 120 may include an attitude sensor (for example, a yaw sensor, a roll sensor, or a pitch sensor), a collision sensor, a wheel sensor, a speed sensor, a gradient sensor, a weight sensor, a heading sensor, a gyro sensor, a position module, a vehicle forward/reverse movement sensor, a battery sensor, a fuel sensor, a tire sensor, a steering sensor based on the rotation of the steering wheel, an in-vehicle temperature sensor, an in-vehicle humidity sensor, an ultrasonic sensor, an illumination sensor, an accelerator pedal position sensor, and a brake pedal position sensor.

The sensing unit 120 can also acquire sensing signals with regard to, for example, vehicle attitude information, vehicle collision information, vehicle driving direction information, vehicle location information (GPS information), vehicle angle information, vehicle speed information, vehicle acceleration information, vehicle tilt information, vehicle forward/reverse movement information, battery information, fuel information, tire information, vehicle lamp information, in-vehicle temperature information, in-vehicle humidity information, steering-wheel rotation angle information, out-of-vehicle illumination information, information about the pressure applied to an accelerator pedal, and information about the pressure applied to a brake pedal.

The sensing unit 120 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS). The sensing unit 120 may generate vehicle state information based on sensing data. Further, the vehicle state information may be information that is generated based on data sensed by a variety of sensors inside a vehicle.

For example, the vehicle state information may include vehicle attitude information, vehicle speed information, vehicle tilt information, vehicle weight information, vehicle direction information, vehicle battery information, vehicle fuel information, vehicle tire pressure information, vehicle steering information, in-vehicle temperature information, in-vehicle humidity information, pedal position information, vehicle engine temperature information, etc.

The interface 130 serves as a passage for various kinds of external devices that are connected to the vehicle 100. For example, the interface 130 may have a port that is connectable to a mobile terminal and may be connected to the mobile terminal via the port. In this instance, the interface 130 can exchange data with the mobile terminal.

In addition, the interface 130 can serve as a passage for the supply of electrical energy to a mobile terminal connected thereto. When the mobile terminal is electrically connected to the interface 130, the interface 130 can provide electrical energy, supplied from the power supply unit 190, to the mobile terminal under the control of the controller 170.

Further, the memory 140 is electrically connected to the controller 170 and can store basic data for each unit, control data for the operational control of each unit, and input/output data. The memory 140 may be any of various hardware storage devices, such as a ROM, a RAM, an EPROM, a flash drive, and a hard drive. Further, the memory 140 can store various data for the overall operation of the vehicle 100, such as programs for the processing or control of the controller 170.

In addition, the memory 140 may be integrally formed with the controller 170, or may be provided as an element of the controller 170. The controller 170 controls the overall operation of each unit inside the vehicle 100 and may be referred to as an Electronic Control Unit (ECU). Further, the power supply unit 190 can supply power required to operate each component under the control of the controller 170. In particular, the power supply unit 190 can receive power from, for example, a battery inside the vehicle 100.

At least one processor and the controller 170 included in the vehicle 100 may be implemented using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

Figure 8:
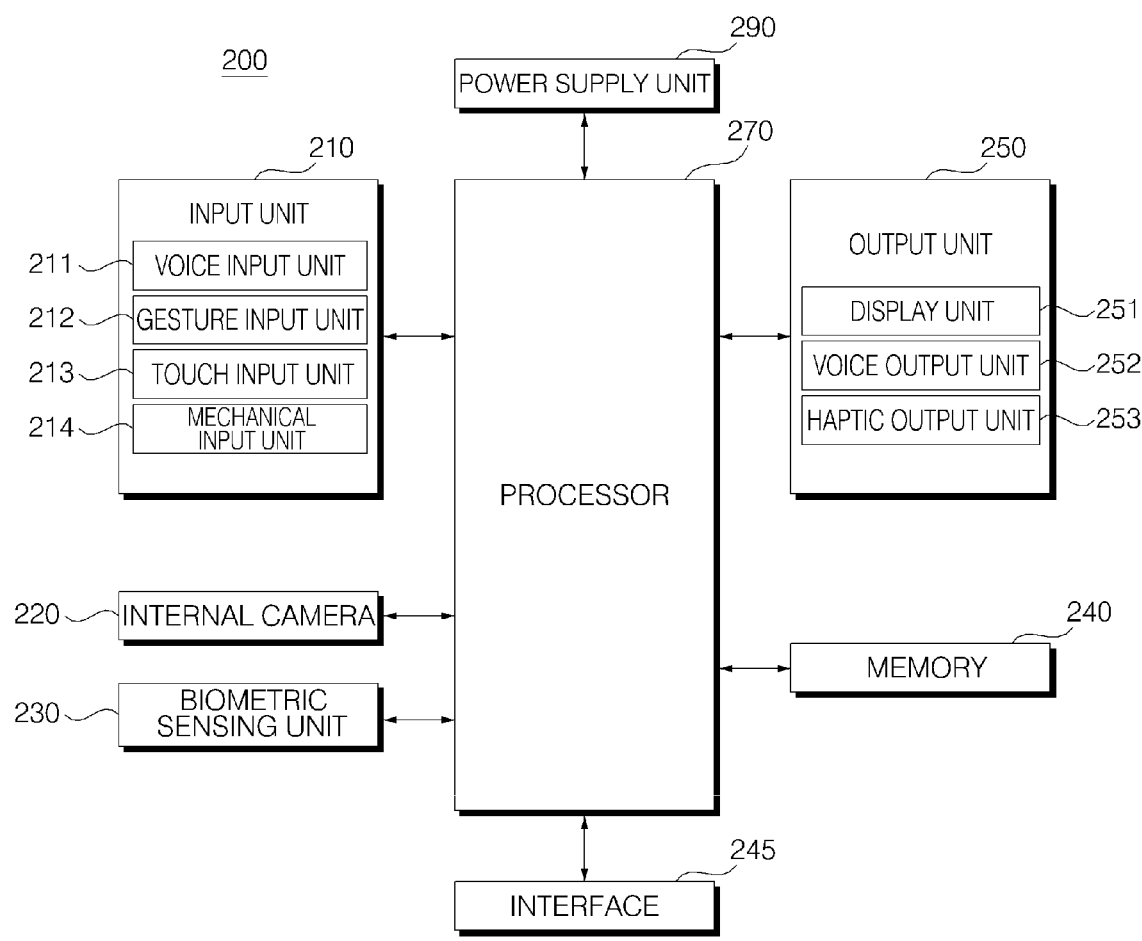
FIG. 8 is a block diagram illustrating a user interface apparatus for a vehicle according to an embodiment of the present invention.

Next, FIG. 8 is a block diagram illustrating a user interface apparatus 200 for a vehicle according to an embodiment of the present invention. Referring to FIG. 8, the user interface apparatus 200 for a vehicle may include an input unit, an internal camera 220, a biometric sensing unit 230, a memory 240, an interface 245, an output unit 250, a processor 270, and a power supply unit 290.

The user interface apparatus 200 may further include other components to the aforementioned components, or may not include some of the aforementioned components. The user interface apparatus 200 shown in FIG. 8 includes each elements of the user interface apparatus 200 described with reference to FIG. 7. Hereinafter, a redundant description of a redundant feature is omitted, and a feature not described with reference to FIG. 7 is described primarily.

The user interface apparatus 200 according to an embodiment of the present invention may be referred to a vehicle display apparatus, a Center Information Display (CID), or an Audio Video Navigation (AVN) system. The user interface apparatus 200 and the communication device 400 may be combined to implement a telematics device.

The input unit 210, the internal camera 220, and the biometric sensing unit 230 may be the same as described with reference to FIG. 7. Further, the input unit 210 can detect a gesture of a user. The internal camera 220 can detect a gaze of a driver. The memory 240 is electrically connected to the processor 270. Further, the memory 240 may store basic data for each unit, control data for the operational control of each unit, and input/output data. The memory 240 may be any of various hardware storage devices, such as a ROM, a RAM, an EPROM, a flash drive, and a hard drive. The memory 240 may store various data for the overall operation of the user interface apparatus 200, such as programs for the processing or control of the processor 270.

The memory 240 may be integrally formed with the processor 270, or may be an element of the processor 270. Further, the interface 245 can exchange information, data, or a signal with a different device included in the vehicle 100. In addition, the interface 245 can transmit received information, data, or signal to the processor 270. The interface 245 can also transmit information, data, or signal generated or processed by the processor 270 to a different device included in the vehicle 100. The interface 245 can receive information, data, or signal from a different device included in the vehicle 100.

The interface 245 can receive a view of an area outside the vehicle 100 from the object detection device 300. The interface 245 can also receive object information from the object detection device 300. For example, the interface 245 can receive information on disparity of multiple objects included in a view of an area outside the vehicle 100.

The interface 245 can receive emergency situation information from the object detection device 300. In addition, the object detection device 300 can generate emergency situation information based on information on Time to Collision (TTC) between the vehicle 100 and an object outside the vehicle 100. Further, the emergency situation information can be generated based on the information on TTC between the vehicle 100 and the object outside the vehicle 100.

The object detection device 300 can generate emergency situation information based on information on a distance between the vehicle 100 and an object outside the vehicle 100, and information on a speed of the vehicle 100 relative to the object outside the vehicle 100. The emergency situation information may be generated based on the information on the distance between the vehicle 100 and an object outside the vehicle 100, and the information on the speed of the vehicle 100 relative to the object outside the vehicle 100. For example, the emergency situation information may be information on a predicted collision between the vehicle 100 and an object.

The interface 245 can receive navigation information from the navigation system 770. The information, data, or signal received by the interface 245 may be provided to the processor 270. Further, the output unit 250 may include a display unit, a sound output unit 252, and a haptic output unit 253.

The output unit 250 may be the same as described with reference to FIG. 7. Hereinafter, the display unit 251 is described primarily. The display unit 251 can operate under control of the processor 270. Further, the display unit 251 may include a touch screen. The processor 270 can control overall operation of each unit of the user interface apparatus 200.

The processor 270 can receive information on detection of a user gesture. The processor 270 can also determine, based on a motion trajectory of a gesture, a direction from which the gesture is applied. For example, the processor 170 can determine, based on a start point of a gesture motion, whether the gesture is applied from the driver seat or a front passenger seat.

The processor 270 can also control the display unit 251 to display a preset different screen based on whether a gesture is applied from a driver seat or a front passenger seat. If it is determined that a gesture detected by the gesture input unit 212 is a gesture applied from the driver seat, the processor 270 can control the display unit 251 to display a preset first screen or a preset second screen.

If it is determined that a gesture detected by the gesture input unit 212 is a gesture applied from the front passenger seat, the processor 270 can control the gesture input unit 212 to display a preset third screen. The third screen may include a screen for operation of a front passenger seat convenient device. For example, the third screen may include at least one of the following: a screen for operation of a front passenger seat position control device, a screen for operation of a front passenger seat window control device, and a screen for operation of a front passenger seat door control device. Alternatively, the third screen may include a screen for operation of a vehicle environment control apparatus. For example, the third screen may include a screen for operation of an air conditioner or a screen for operation of a room lamp.

In addition, the processor 270 can divide the display unit 251 into multiple regions and can control the display unit 251 to display a preset different screen based on which region to which a gesture is applied among the multiple regions. If it is determined that a gesture is applied from the driver seat and that the gesture applied from the driver seat is a gesture applied to a first region among the multiple regions, the processor 270 can control the display unit 251 to display a first screen.

The first screen may include a screen for operation of the vehicle drive device 600. For example, the first screen may include a screen for operation which is designed to control at least one of the power train drive unit 610, the chassis drive unit 620, the door/window drive unit 630, the safety apparatus drive unit 640, the lamp drive unit 650, and the air conditioner drive unit 660.

If it is determined that a gesture is applied from the driver seat and that the gesture applied from the driver seat is a gesture applied to a second region among the multiple regions, the processor 270 can control the display unit 251 to display a second screen. The second screen may include a screen for operation of a vehicle utility device. For example, the second screen may include at least one of the following: a screen for operation of a navigation device, a screen for operation of a communication device, a screen for operation of a music play device, a screen for operation of a schedule management device, and a screen for operation of a video play device.

In addition, the processor 270 can receive information on a speed of the vehicle 100 via the interface 245 and can control the display unit 251 based on the information on the speed of the vehicle 100 to disable displaying of a screen. For example, if the speed of the vehicle 100 is a preset speed or higher, the processor 270 can display the display unit 251, so that nothing is displayed on the screen.

Also, if the speed of the vehicle 100 is a preset speed or higher, the processor 270 can control the display unit 251 to display only a screen related to a preset application. For example, if the speed of the vehicle 100 is a preset speed or higher when the display unit 251 includes a touch screen, the processor 270 can control the display unit 251 to disable displaying of a screen and applying of a touch input via the touch screen. As such, the display unit 251 is controlled based on information on a speed of the vehicle 100, and therefore, a driver, who is driving the vehicle 100 at high speeds, can focus only on the driving, thereby preventing an accident.

The processor 270 can collect traffic flow information via the interface 245. In addition, traffic flow may be a value that is calculated based on the number of vehicles located within a preset range. Further, the traffic flow information may be generated by an external server.

In addition, the processor 270 can receive traffic flow information from the communication device 400 via the interface 245. The processor 270 can then control the display unit 251 based on traffic flow information to disable displaying of a screen. For example, if the traffic flow is equal to or greater than a reference value, the processor 270 can control the display unit 251, so that nothing is displayed on the screen, so that only a screen related to a preset application is displayed, etc. For example, if the traffic flow is equal to or greater than a reference value when the display unit 251 includes a touch screen, the processor 270 can control the display unit 251 to disable displaying of a screen and applying of a touch input via the touch screen.

In addition, the processor 270 can receive information on a degree of driving difficulty in a travel roadway via the interface 245. The degree of driving difficulty may be a value calculated based on at least one of the following: whether there is a curve, a curvature value of the curve, whether there is a slope, a gradient of the slope, whether there is an intersection, whether there is an entrance ramp, whether there is an exit ramp, whether there is a tunnel, etc. Further, the information on the degree of driving difficulty may be generated by an external server. The processor 270 can receive the information on the degree of driving difficulty from the communication device 400 via the interface 245.

Further, the processor 270 can control the display unit 251 based on the information on the degree of driving difficulty to disable displaying of a screen. For example, if a degree of driving difficulty is equal to or greater than a reference value, the processor 270 can control the display unit 251, so that nothing is displayed on the screen, so that only a screen related to a preset application is displayed, etc. If a degree of driving difficulty is equal to or greater than a reference value when the display unit 251 includes a touch screen, the processor 270 can control the display unit 251 to disable displaying of a screen and applying of a touch input via the touch screen. The processor 270 can control the display unit 251 based on driver gaze information to disable displaying of a screen.

In addition, the processor 270 can detect a gaze of a driver via the internal camera 220, and generate information on the gaze of the driver. For example, the processor 270 can detect a pupil of a driver, and generate information on a gaze of the driver by tracking movement of the pupil. The display unit 251 may also include a touch screen. If it is determined that a gaze of a driver has been directed toward the display unit 251 for a preset period of time or more, the processor 270 can control the display unit 251 to disable displaying of a screen on the touch screen or applying a touch input to the touch screen.

As discussed above, the vehicle 100 may be an autonomous vehicle. In more detail, the vehicle 100 may be driven in an autonomous driving state or a manual driving state. If it is determined that a gesture is applied from a driver seat while the vehicle 100 is in the manual driving state, the processor 270 can determine whether a criteria for switching to an autonomous driving state is satisfied. If it is determined that the criteria for switching to the autonomous driving state is satisfied, the processor 270 can provide a signal to switch the state of the vehicle 100 to the autonomous driving state.

The criteria for switching to an autonomous driving state may be based on at least one of the following: information on execution of a preset application, information about entrance in a preset level or higher of a preset application, driver gaze information, information on a degree of driving difficulty, speed information, and traffic flow information. For example, if a preset application is executed while the vehicle 100 is in the manual driving state, the processor 270 can provide a signal so that the state of the vehicle 100 is switched to the autonomous driving state. When entering a preset depth level or higher of a preset application in response to a user input when the preset application is being executed, the processor 270 can provide a signal so that a state of the vehicle 100 is switched from a manual driving state to an autonomous driving state.

A depth level may be defined as the number of user inputs that are required for execution of a function associated with a corresponding item. Further, the higher depth an item has, the more user inputs a user needs to apply to execute a desired function. Accordingly, if a driver behind the wheel wants to execute a function of an item having a higher depth, the driver may not look ahead down the road for a longer time. Thus, when entering a preset depth level or higher of the application, the state of the vehicle 100 can be switched to an autonomous driving state, so that a possible accident can be prevented.

For example, if a gaze of a driver has been directed toward the display unit 251 for a predetermined time or more, the processor 270 can provide a signal to switch the state of the vehicle 100 from the manual driving state to the autonomous driving state. In addition, if a degree of driving difficulty of a roadway being travelled by the vehicle 100 is equal to or greater than a reference value, the processor 270 can provide a signal to switch the state of the vehicle 100 from the manual driving state to the autonomous driving state.

For example, if a speed of the vehicle 100 is equal to or greater than a reference value, the processor 270 can provide a signal to switch the state of the vehicle 100 from the manual driving state to the autonomous driving state, and if traffic flow is equal to or greater than a reference value, the processor 270 can provide a signal to switch the state of the vehicle 100 from the autonomous driving state to the manual driving state. If a criteria for switching to an autonomous driving state is satisfied, the processor 270 can control the display unit 251 to display a screen corresponding to autonomous driving. The screen corresponding to autonomous driving may include a brake input button of the vehicle 100 or a steering input button of the vehicle 100.

The screen corresponding to autonomous driving may include a screen for operation of a vehicle utility device. For example, the screen corresponding to autonomous driving may include at least one of the following: a screen for operation of a navigation device, a screen for operation of a communication device, a screen for operation of a music play device, a screen for operation of a schedule management device, and a screen for operation of a video play device.

The screen corresponding to autonomous driving may include a content provision screen. For example, the screen corresponding to autonomous driving may include at least one of a screen of providing image contents and a screen of providing music contents. If emergency situation information is received on the interface 245, the processor 270 can control the display 251 to display a brake input button or a steering input button.

If a user input is received via the brake input button or the steering input bottom after a gesture detected by the gesture input unit 212 is determined to be a gesture applied from a front passenger seat, the processor 270 can provide a control signal to operate a brake apparatus or a steering apparatus. In such an emergency situation, it is possible to avert an emergency situation in response not only to a user input applied from the driver seat, but from to a user input applied from the front passenger seat, so that an accident can be prevented. Under control of the processor 270, the power supply unit 290 can provide power required for operation of each component. In particular, the power supply unit 290 may be provided with power from a battery inside the vehicle 100.

Figure 9:
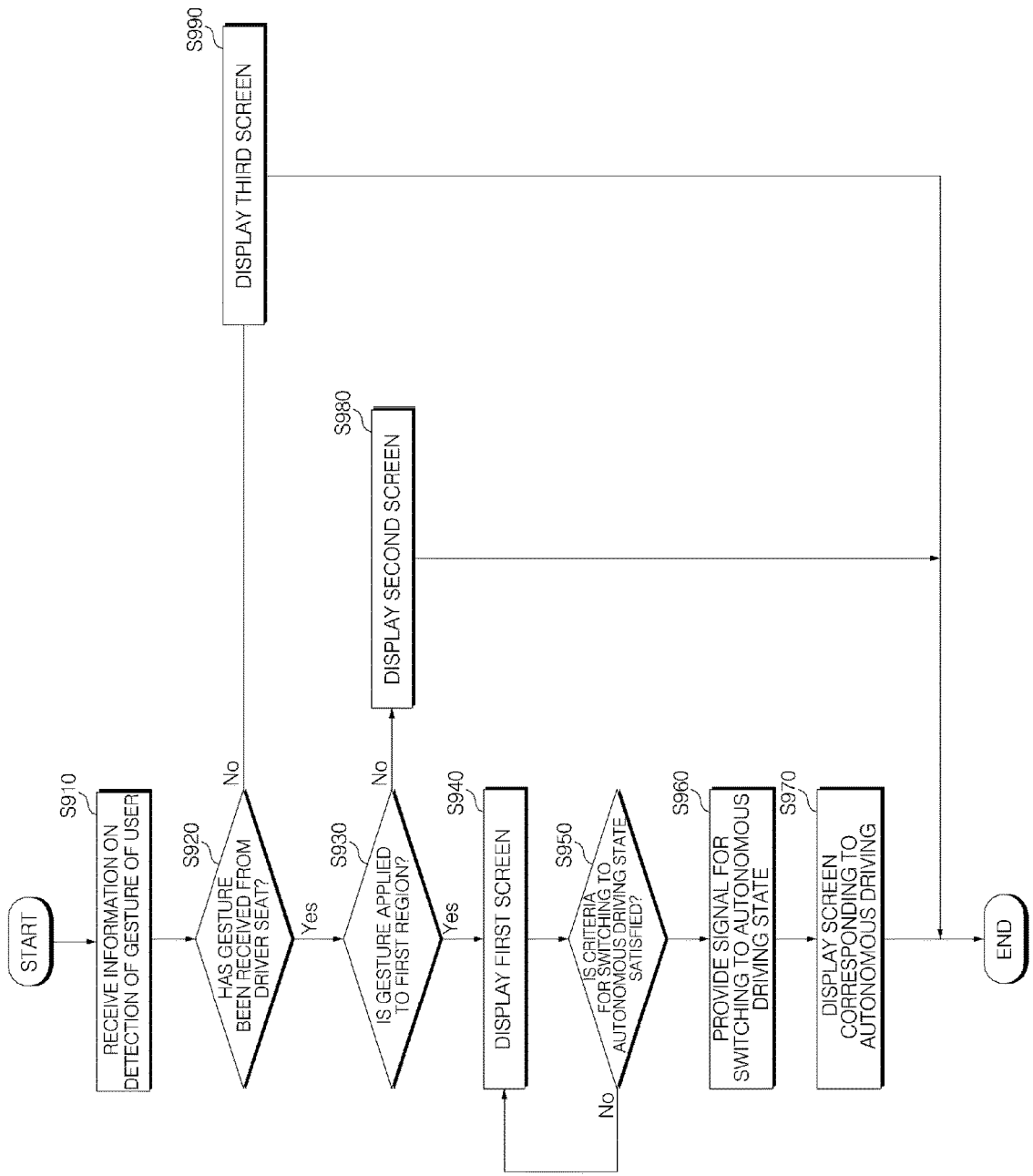
FIG. 9 is a flowchart illustrating how a user interface apparatus for a vehicle operates according to an embodiment of the present invention.

Next, FIG. 9 is a flowchart illustrating how a user interface apparatus for a vehicle operates according to an embodiment of the present invention. Referring to FIG. 9, the processor 270 can receive information on detection of a gesture of a user in S910. The processor 270 can then determine, based on a trajectory of movement of the gesture, a direction from which the gesture is applied in S920. Specifically, the processor 270 can determine whether the gesture is applied from the driver seat or from the front passenger seat.

As discussed above, the processor 270 can divide the display unit 251 into multiple regions. Specifically, the processor 270 can divide the display unit 251 into a first region and a second region. When it is determined that the gesture is be applied from the driver seat, the processor 270 determines which region to which the gesture is applied among the multiple regions in S930. Specifically, the processor 270 determines whether the gesture is applied to the first region or the second region.

When it is determined that the gesture is applied to the first region in S930, the processor 270 displays a first screen in S940. The first screen may include a screen for operation of the vehicle drive device 600. For example, the first screen may include a screen for operation of the power train drive unit 610, the chassis drive unit 620, the door/window drive unit 630, the safety apparatus drive unit 640, the lamp drive unit 650, and the air conditioner drive unit 660.

Then, the processor 270 determines whether a criteria for switching to an autonomous driving state is satisfied in S950. The criteria for switching to the autonomous driving state may be based on at least one of the following: information on execution of a preset application, information about entrance in a preset level or higher of a preset application, driver gaze information, information on a degree of driving difficulty, speed information, and traffic flow information.

If it is determined that the criteria for switching to the autonomous driving state is satisfied in S950, the processor 270 can provide a signal to switch the state of the vehicle 100 from the manual driving state to the autonomous driving state in S960. When the state of the vehicle 100 is switched to the autonomous driving state, the processor 270 can control the display unit 251 to display a screen corresponding to autonomous driving in S970.

Meanwhile, if it is determined in operation S930 that the gesture is applied, not to the first region, but to the second region, the processor 270 displays a second screen in S980. The second screen may include a screen for operation of a vehicle utility device. For example, the second screen may include at least one of the following: a screen for operation of a navigation device, a screen for operation of a communication device, a screen for operation of a music play device, a screen for operation of a schedule management device, and a screen for operation of a video play device.

Meanwhile, if it is determined in S920 that a gesture is applied, not from the driver seat, but from the front passenger seat, the processor 270 can display a third screen in S990. The third screen may include a screen for operation of a front passenger seat utility device. For example, the third screen may include at least one of the following: a screen for operation of a front passenger seat position control device, a screen for operation of a front passenger seat window control device, and a screen for operation of a front passenger seat door control device. Alternatively, the third screen may include a screen for operation of a vehicle environment control apparatus. For example, the third screen may include a screen for operation of an air conditioner or a screen for operation of a room lamp.

Figure 10:
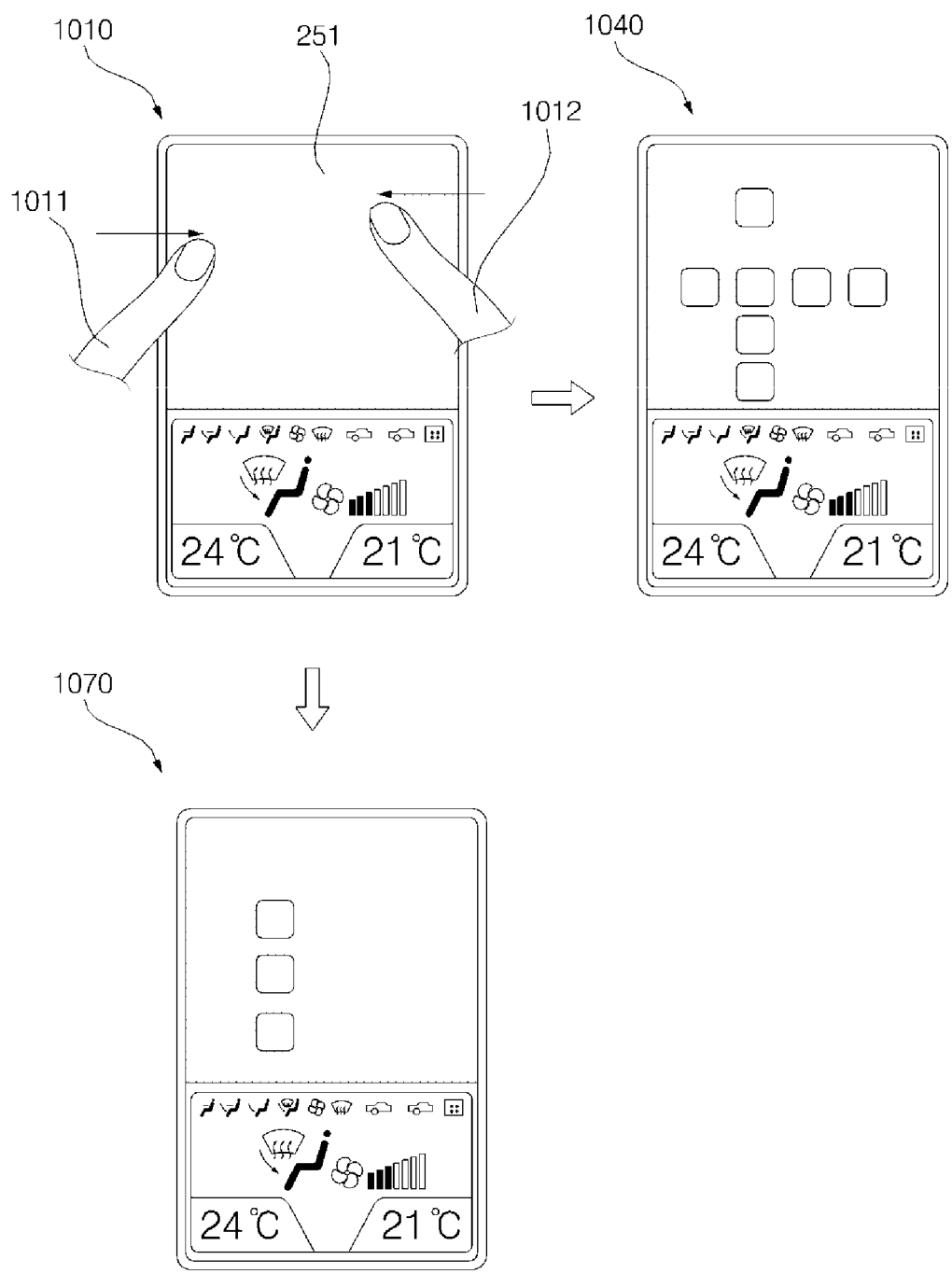
FIGS. 10 to 12 are diagrams illustrating how a user interface apparatus for a vehicle operates according to a gesture input according to an embodiment of the present invention.
Figure 11:
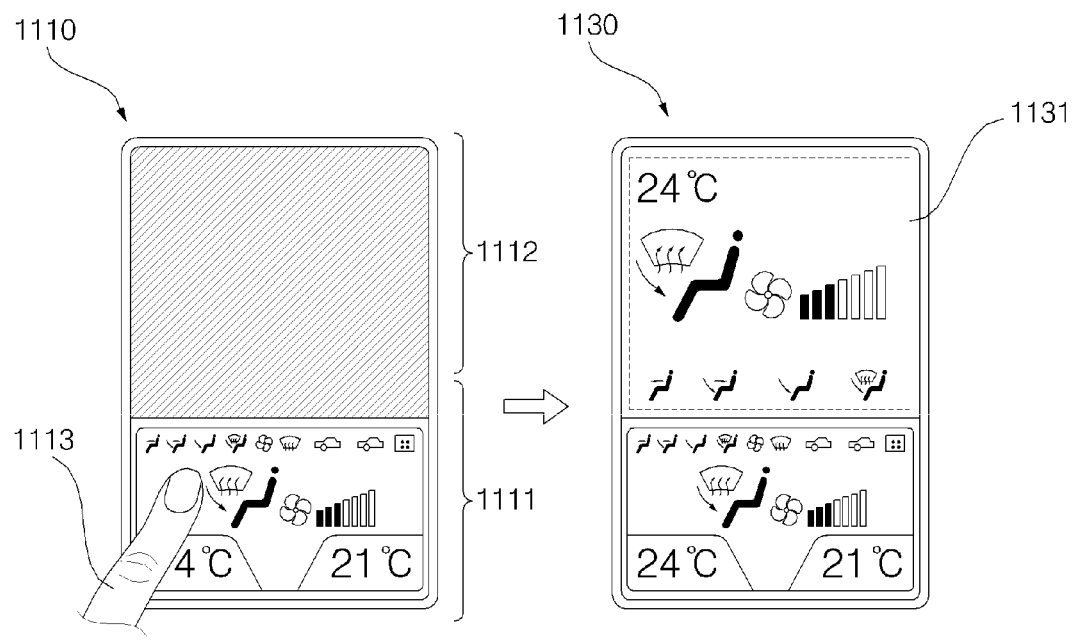
Figure 11:
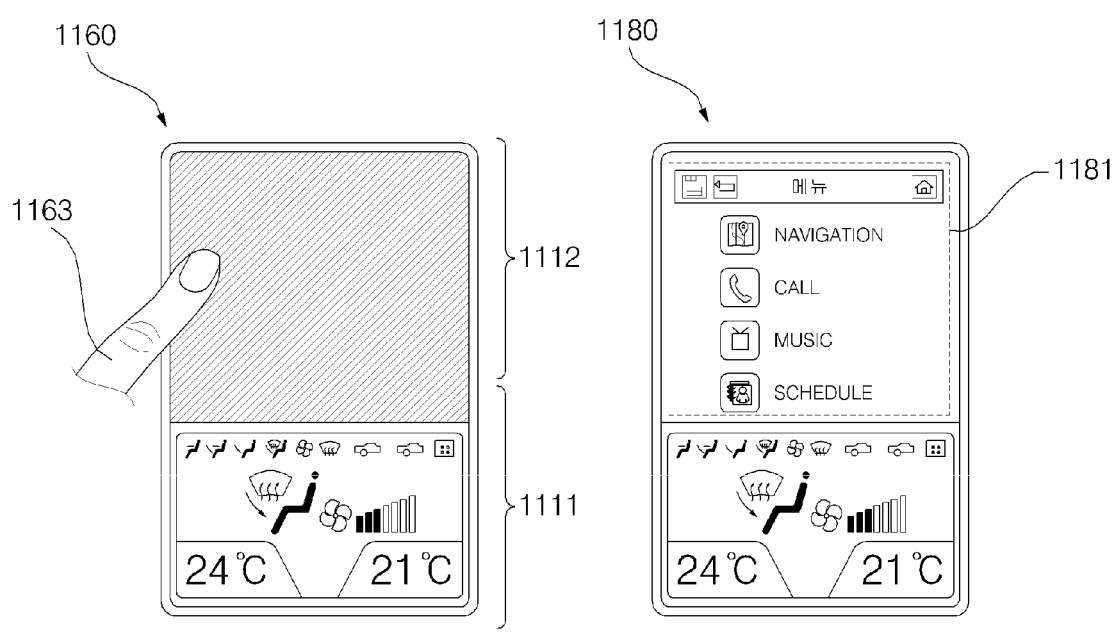
Figure 12:
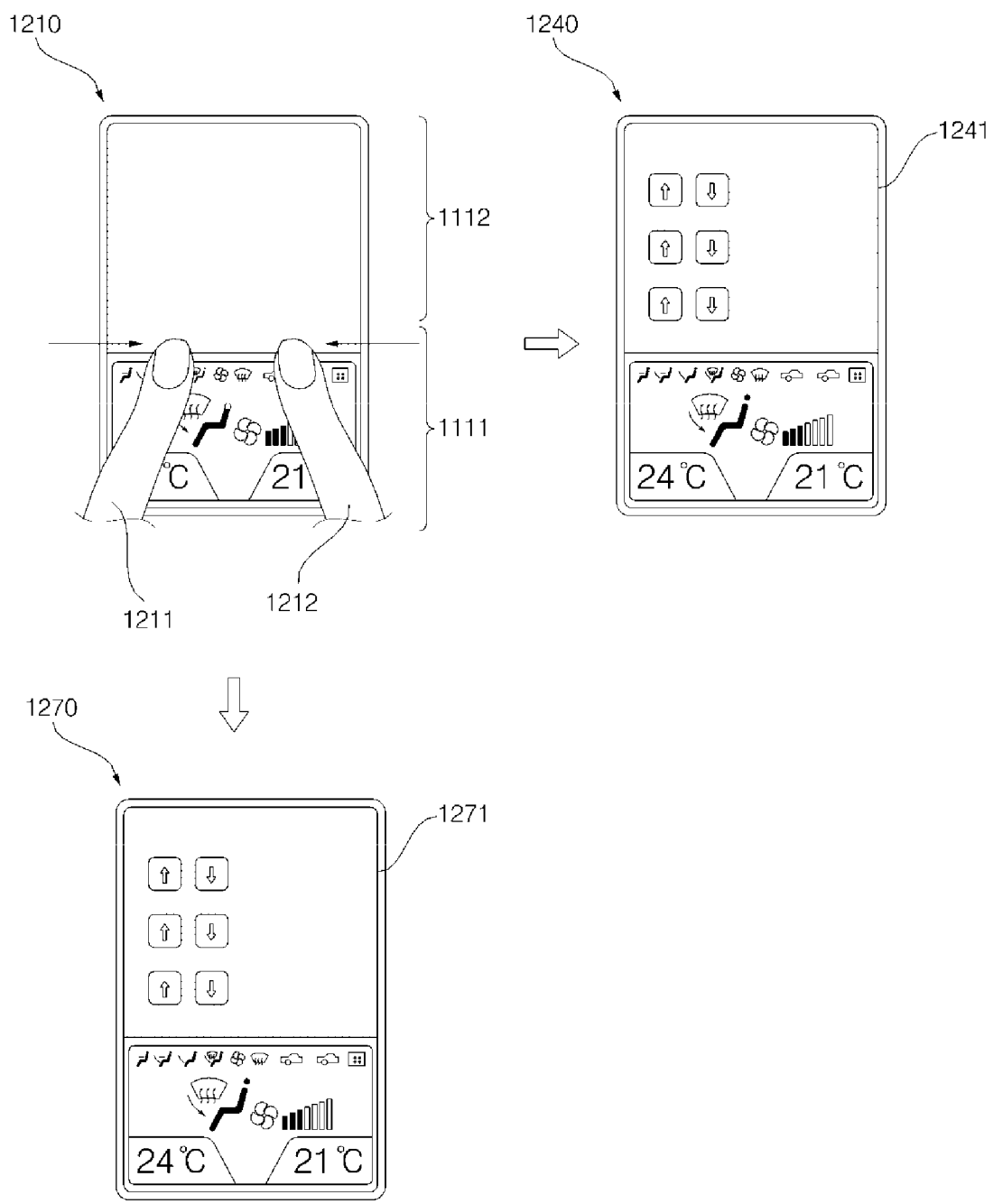

Next, FIGS. 10 to 12 illustrate examples of how a user interface apparatus for a vehicle operates in response to a gesture input according to an embodiment of the present invention. As shown in 1010 of FIG. 10, the gesture input unit 212 can detect gestures 1011 and 1012. The gestures 1011 and 1012 may include a hovering gesture and a touch gesture. Further, the hovering gesture may be a gesture input based on a trajectory of a user's finger that moves at a predetermined distance or more from the display unit 251.

Based on the trajectory of movement of each of the gestures 1011 and 1012, the processor 270 can determine a direction from which each of the gestures is applied. For example, the processor 270 can determine that the gesture 1011 moving from the driver seat toward the display unit 251 is a gesture applied from the driver seat, or the processor 270 can determine that the gesture 1012 moving from the front passenger seat toward the display unit 251 is a gesture applied from the front passenger seat.

On the basis that the gesture 1011 or 1012 is applied from the driver seat or the front passenger seat, the processor 270 can control the display unit 251 to display a preset different screen. If it is determined that the gesture 1011 is a gesture applied from the driver seat, the processor 270 can control the display unit 251 to display a preset first screen or a preset second screen, as shown in 1040 of FIG. 10.

The first screen may include a screen for operation of the vehicle drive device 600. For example, the first screen may be a screen for operation that is designed to control at least one of the power train drive unit 610, the chassis drive unit 620, the door/window drive unit 630, the safety apparatus drive unit 640, the lamp drive unit 650, and the air conditioner drive unit 660.

The second screen may include a screen for operation of a vehicle utility device. For example, the second screen may include at least one of the following: a screen for operation of a navigation device, a screen for operation of a communication device, a screen for operation of a music play device, a screen for operation of a schedule management apparatus, and an image play device. If it is determined that the gesture 1012 is a gesture applied from the front passenger seat, the processor 270 can control the display unit 251 to display a preset third screen, as shown in 1070 of FIG. 10.

The third screen may include a screen for operation of a front passenger seat utility device. For example, the third screen may include at least one of the following: a screen for operation of a front passenger seat position control device, a screen for operation of a front passenger seat window control device, and a screen for operation of a front passenger seat door control device. Alternatively, the third screen may include a screen for operation of a vehicle environment control apparatus, and the third screen may include a screen for operation of an air conditioner or a screen for operation of a room lamp.

As shown in FIG. 11, the processor 270 can divide the display unit 251 into a plurality of regions. For example, the processor 270 can divide the display unit 251 into a first region 1111 and a second region 1112. The processor 270 can control the display unit 251 to display a preset different screen based on which region to which a gesture is applied among the plurality of regions.

As shown in 1110 and 1130 of FIG. 11, if it is determined that a gesture 1113 is a gesture applied to the first region 1111, the processor 270 can control the display unit 251 to display a first screen 1131. In addition, the processor 270 can control the first screen 1131 to be displayed in the first region 1111, the second region 1112, or the entire region of the display unit 251.

The first screen 1131 may include a screen for operation of the vehicle drive device 600. For example, the first screen may include a screen for operation to control at least one of the power train drive unit 610, the chassis drive unit 620, the door/window drive unit 630, the safety apparatus drive unit 640, the lamp drive unit 650, and the air conditioner drive unit 660.

As shown in 1160 and 1180 of FIG. 11, if it is determined that the gesture 1163 is a gesture applied to the second region 1112, the processor 270 can control the display unit 251 to display the second screen 1181. In addition, the processor 270 can control the second screen 1181 to be displayed in the first region 1111, the second region 1112, or the entire region of the display unit 251.

The second screen may include a screen for operation of a vehicle utility device. For example, the second screen may include at least one of the following: a screen for operation of a navigation device, a screen for operation of a communication device, a screen for operation of a music play device, a screen for operation of a schedule management device, and a screen for operation of a video play device.

As illustrated in FIG. 12, the processor 270 can divide the display unit 251 into a plurality of regions. For example, the processor 270 can divide the display unit 251 into a first region 1111 and a second region 1112. The processor 270 can control the display unit 251 to display a preset different screen based on whether a gesture applied to the first region among the plurality of regions is a gesture applied from the driver seat or from the front passenger seat.

If it is determined that a gesture 1211 applied to the first region 1111 is a gesture applied from the driver seat, the processor 270 can control the display unit 251 to display a preset fourth screen 1241, as shown in FIG. 12. In addition, the processor 270 can control the fourth screen 1241 to be displayed in the first region 1111, the second region 1112, or the entire region of the display unit 251.

The fourth screen may include a screen for operation of a driver seat utility device. For instance, the fourth screen may include at least one of the following: a screen for operation of a driver seat position control device, a screen for operation of a driver seat window control device, and a screen for operation of a driver seat door control device.

In another example, the fourth screen may include a screen for operation of an all seat utility device. For instance, the fourth screen may include at least one of the following: a screen for operation of an all seat position control device, a screen for operation of an all seat window control device, and a screen for operation of an all-seat door control device.

In yet another example, the fourth screen may include a screen for operation of any of various apparatuses included in a vehicle. For instance, the fourth screen may include at least one of the following: a screen for operation of an air conditioner, a screen for operation of a room lamp, a screen for operation of a head lamp, a screen for operation of wipers, and a screen for operation of a turn-signal lamp.

If it is determined that a gesture 1212 applied to the first region 1111 is a gesture applied from the front passenger seat, the processor 270 can control the display unit 251 to display a preset fifth screen 1271, as shown in 1270 of FIG. 12. In addition, the processor 270 can control the fifth screen 1271 to be displayed in the first region 1111, the second region 1112, or the entire region of the display unit 251.

The fifth screen 1271 may include a screen for operation of a front passenger seat utility device. For instance, the fifth screen 1271 may include at least one of a screen for operation of a front passenger seat position control device, a screen for operation of a front passenger seat window control device, and a screen for operation of a front passenger seat door control device. In another example, the fifth screen 1271 may include a screen for operation of a vehicle environment control apparatus. For instance, the fifth screen 1271 may include a screen for operation of an air conditioner or a screen for operation of a room lamp.

Figure 13:
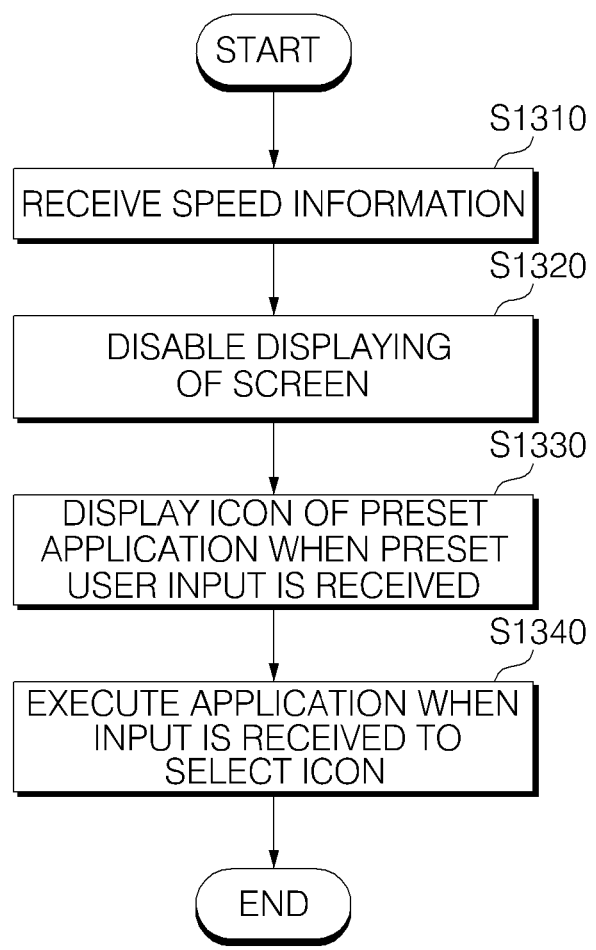
FIG. 13 is a flowchart illustrating an operation of a user interface apparatus for a vehicle according to an embodiment of the present invention.

Next, FIG. 13 is a flowchart illustrating how a user interface apparatus for a vehicle operates according to an embodiment of the present invention. Referring to FIG. 13, the processor 270 can receive information on a speed of the vehicle 100 from the sensing unit 120 or the navigation system 770 via the interface 245 in S1310.

The processor 270 can then control the display unit 251 based on information on a speed of the vehicle 100 to disable displaying of a screen in S1320. For example, if a speed of the vehicle 100 is equal to or greater than a preset value while information on detection of a user gesture is received in S910, the processor 270 can disable displaying of a screen according to a gesture, and if a speed of the vehicle 100 is equal to or greater than a preset value, the processor 270 can control the display unit 251, so that only a screen related to a preset application is displayed.

For example, if a speed of the vehicle 100 is equal to or greater than a preset value when the display 251 includes a touch screen, the processor 270 can control the display 251 to disable displaying of a screen and applying of a touch input via the touch screen. If a preset user input is received while displaying of a screen is disabled, the processor 270 can control an icon of a preset application to be displayed in S1330. Here, the preset user input may include a gesture input, a voice input, and a touch input. If a user input is received to select a displayed icon, the processor 270 can control an application corresponding to the icon to be executed in S1340.

Next, FIGS. 14 to 17 are examples in which a user interface apparatus executes an application when displaying a screen is disabled according to an embodiment of the present invention. The processor 270 can acquire information on a speed of the vehicle 100 and control the display unit 251 based on the information on the speed of the vehicle 100.

Figure 14:
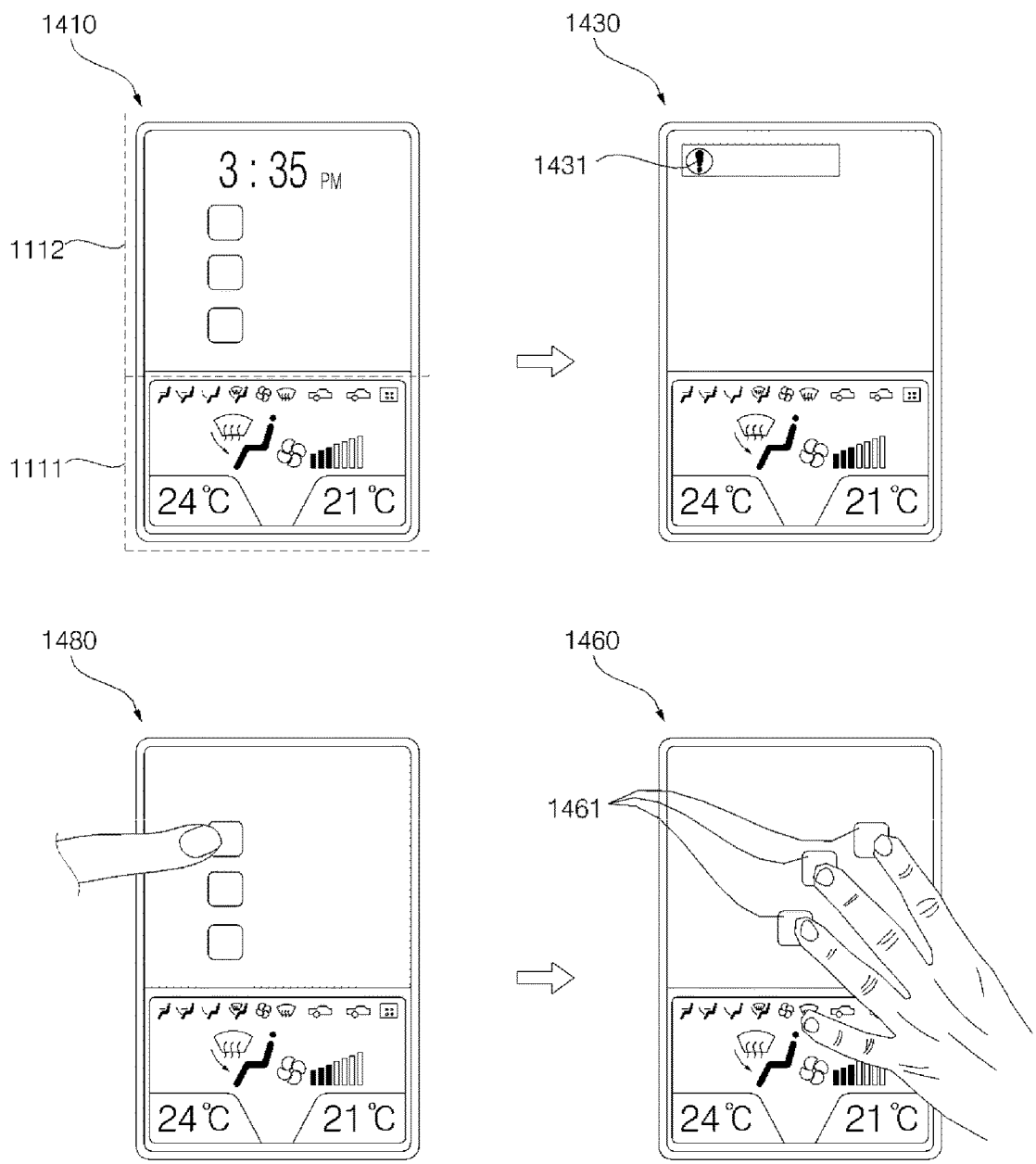
FIGS. 14 to 17 are diagrams illustrating how a user interface apparatus executes an application when displaying of a screen is disabled, according to an embodiment of the present invention.

As shown in 1410 of FIG. 14, when the vehicle 100 is stopped or travels at a speed equal to or smaller than a preset value, the processor 270 can control the display unit 251 to display a specific screen. For example, the processor 270 can control the display unit 251 to display, in the second region 1112, a screen that includes a plurality of icons respectively corresponding to a plurality of applications, the current time, the current day of week, the current date, etc. The processor 270 can also control the display unit 251 to display, in the first region 1111, a screen that includes vehicle state information. The vehicle state information may include indoor temperature information, outdoor temperature information, and air-conditioning state information.

As shown in 1430 of FIG. 14, if a speed of the vehicle 100 is equal to or greater than a preset value, the processor 270 can disable displaying of a screen. In this instance, the processor 270 can display information 1431 indicating that displaying of a screen is disabled. In addition, the processor 270 can control the display unit 251 not to display an application screen and icons corresponding to applications. Even when displaying of a screen is disabled, the processor 270 can control the display unit 251 to display information on weather, the current time, the current day of week, the current date, etc. Even when displaying of a screen is disabled, the processor 270 can control the display unit 251 to display a screen including vehicle state information in the first region 1111.

As shown in 1460 of FIG. 14, if a preset user input is received while displaying of a screen is disabled, the processor 270 can perform a control action to display an icon 1461 of a preset application. The preset application may be an application that helps a driver to drive a vehicle. For example, the preset application may include a navigation-related application, an Advanced Driver Assistance System (ADAS)-related application, a driving situation information-related application, and an autonomous driving-related application.

In 1460 of FIG. 14, a multi-touch input is taken as an example of a user input, but the user input may be a hovering gesture input or a voice input. As shown in 1480 of FIG. 14, when a user input is received to select an icon, the processor 270 can execute an application corresponding to the icon. In 1460 of FIG. 14, a touch input is taken as an example of a user input, but the user input may be a hovering gesture input or a voice input.

As such, a vehicle driving-related application may be driven even when displaying of a screen is disabled, and therefore, safe driving may be maintained and user convenience may improve. As shown in 1510 of FIG. 15, a first application may be displayed on the display unit 251 when displaying of a screen is disabled. In 1510 of FIG. 15, a navigation-related application is taken as an example of a user input.

While the first application is displayed, the processor 270 can receive a user input 1512 to change a displayed application. In 1510 of FIG. 15, a flicking touch input is taken as an example of a user input, but the user input may be a hovering gesture input or a voice input. When the user input 1512 is received, the processor 270 can control the display unit 251 to display a second application, as shown in 1530 of FIG. 15. In 1530 of FIG. 15, an Around View Monitoring (AVM) application, which is one of ADAS-related applications, is taken as an example of the second application. In this instance, the processor 270 can execute the first application, which was previously executed and displayed, in background.

While the second application is displayed, the processor 270 can receive a user input 1532 for changing a displayed application. In 1530 of FIG. 15, a flicking touch input is taken as an example of a user input, but the user input may be a hovering gesture input or a voice input. When the user input 1532 is received, the processor 270 can control the display unit 251 to display a third application.

Figure 15:
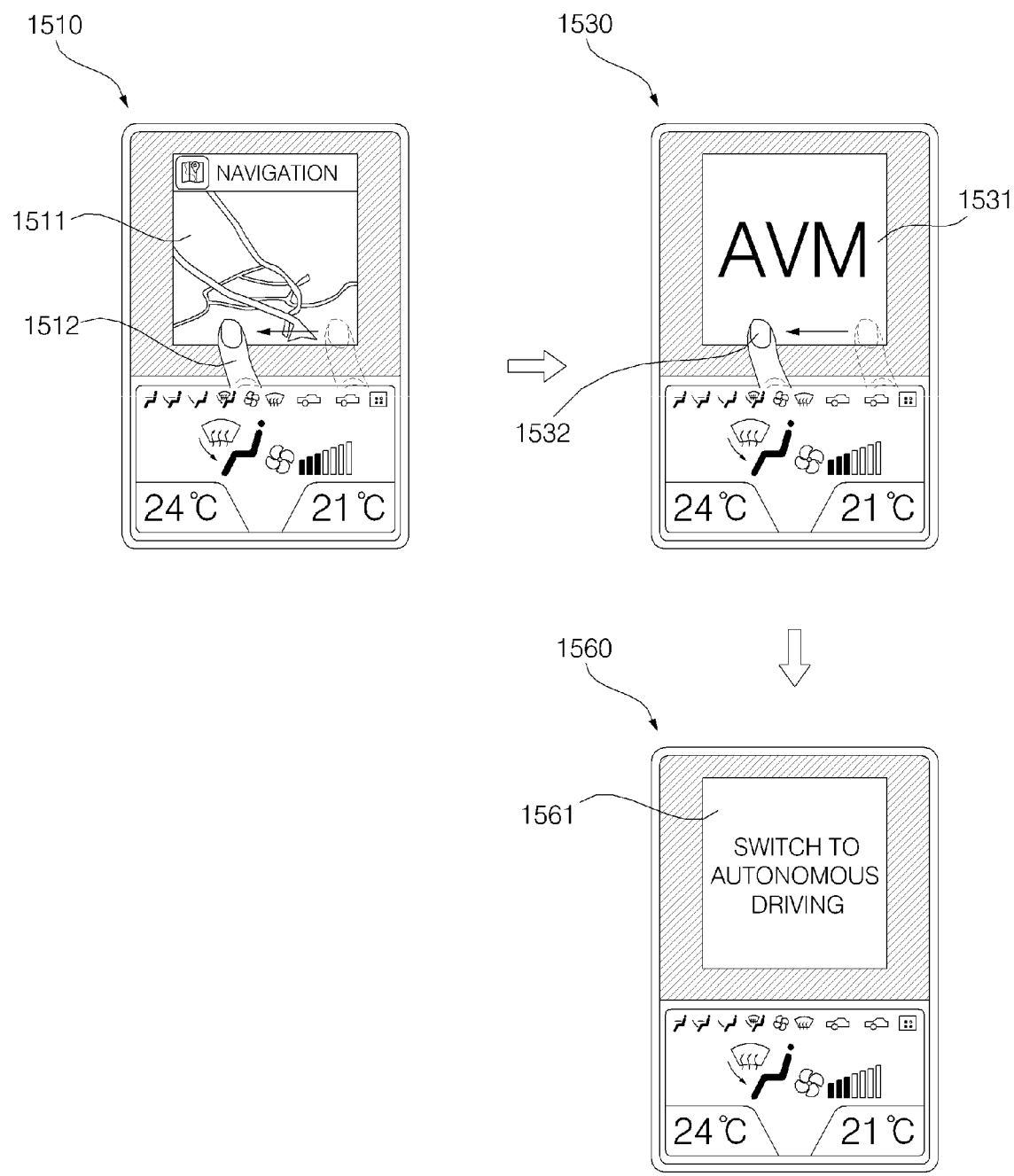

In 1560 of FIG. 15, an autonomous driving-related application is taken as an example of the third application. In this instance, the processor 270 can execute the first or second application, which was previously executed or displayed, in background. In addition, the order of displaying the first to third applications according to a user input may be set in advance. The order may be changed by a user input.

Figure 16:
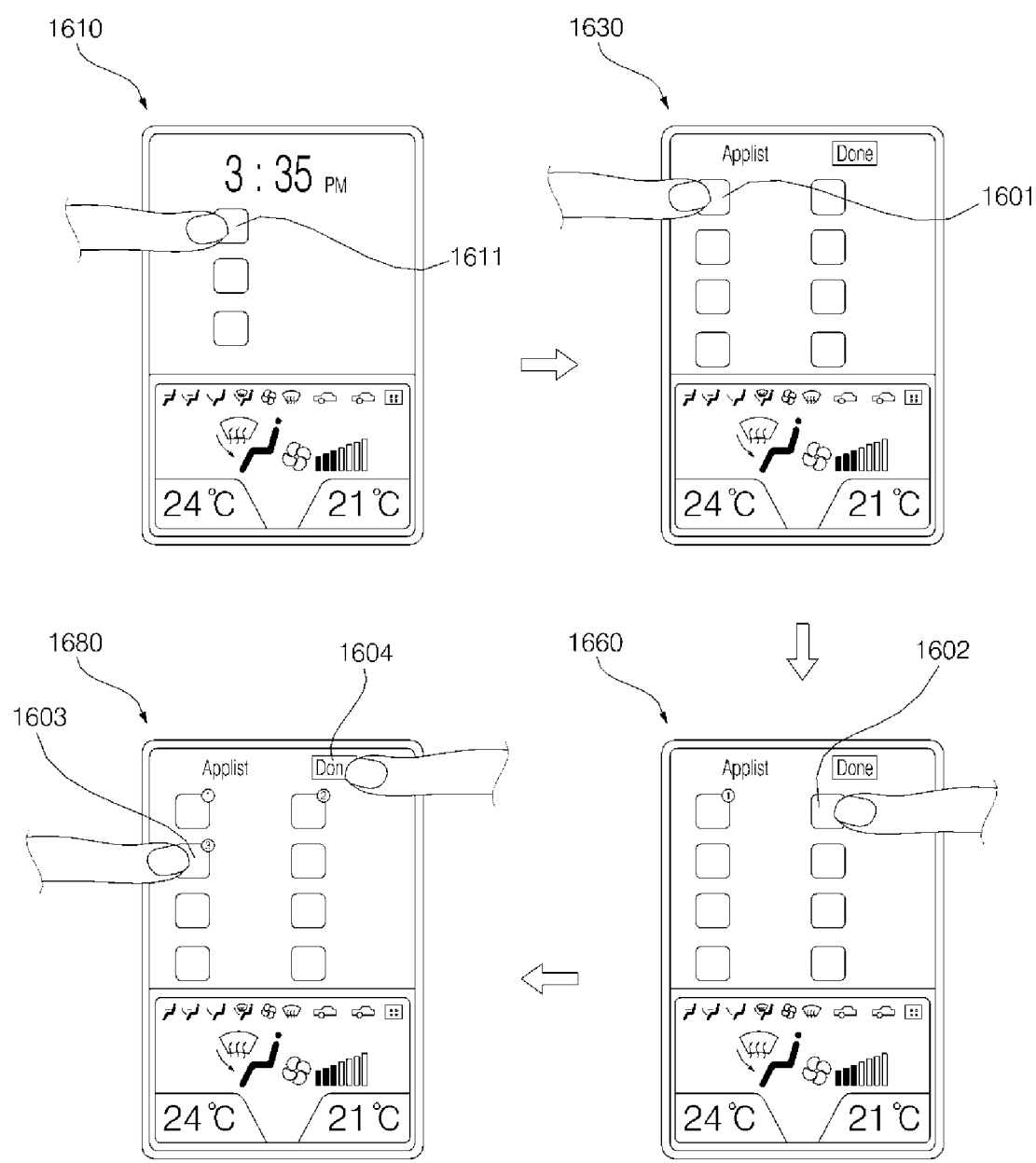

As shown in 1610 of FIG. 16, the processor 270 can receive a touch input on a setting icon 1611. In this instance, as shown in 1630 of FIG. 16, the processor 270 can display a setup screen. Further, the setup screen may be a screen for selecting an application that is executable when displaying of a screen is disabled. The processor 270 can display, on the setup screen, a plurality of icons respectively corresponding to a plurality of applications While the setup screen is displayed, the processor 270 can receive a touch input on a first icon 1601 corresponding to a first application. Then, as shown in 1660 of FIG. 16, the processor 270 can receive a touch input on a second icon 1602 corresponding to a second application. Then, as shown in 1680 of FIG. 16, the processor 270 can receive a touch input on a third icon 1603 corresponding to a third application. Then, the processor 270 can receive a touch input on a done button 1604. Thus, any one of the first to third applications may be selected as an application that is executable when displaying of a screen is disabled. In this instance, the order of displaying applications may correspond to the order of selection of the applications.

Figure 17:
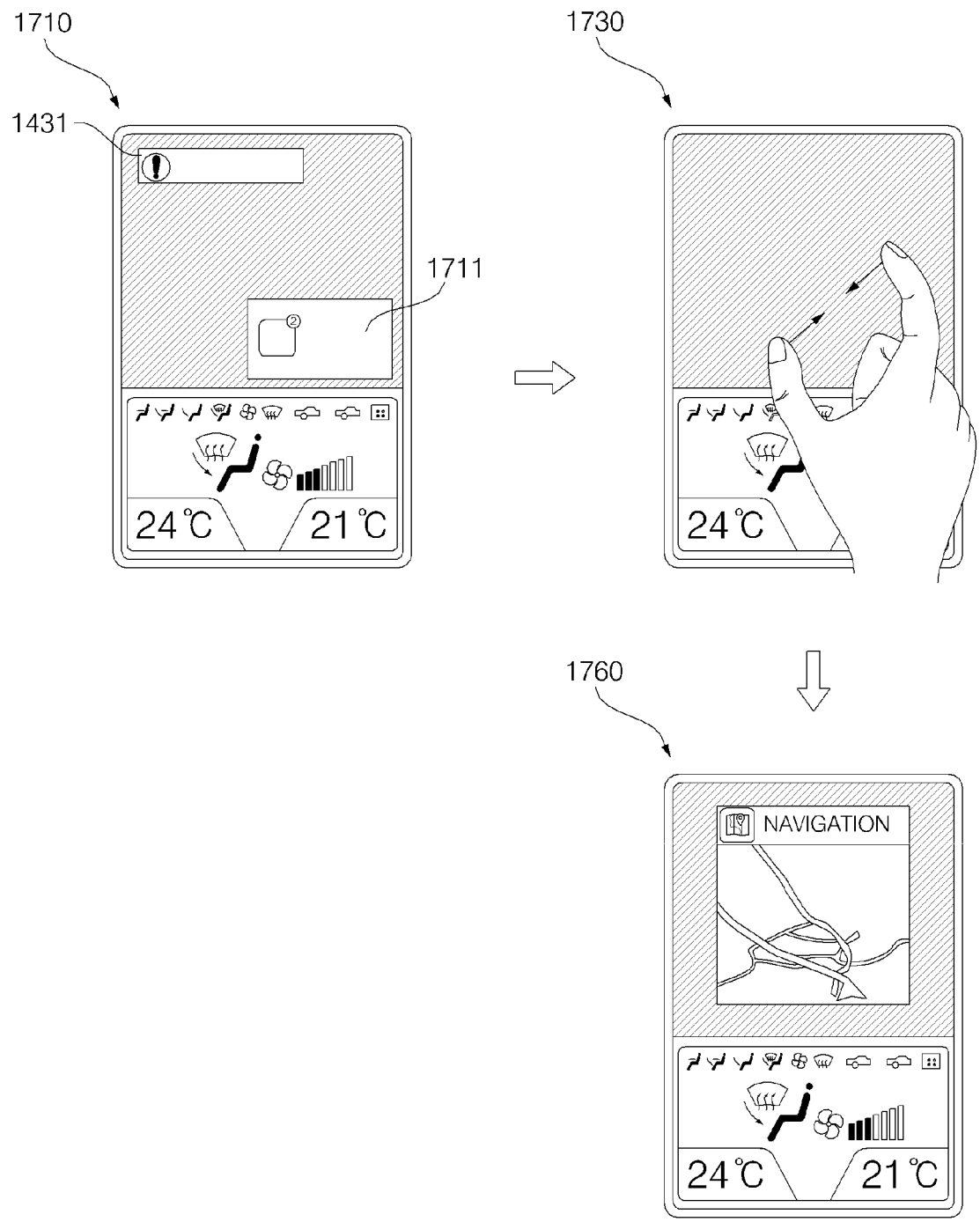

As shown in 1710 of FIG. 17, if a speed of the vehicle 100 is equal to or greater than a preset value, the processor 270 can disable displaying of a screen. In this instance, the processor 270 can display information 1431 indicating that displaying of a screen is disabled, and control the display unit 251 not to display an application screen and icons corresponding to applications.

Even when displaying of a screen is disabled, the processor 270 can control the display unit 251 to display information on weather, the current time, the current day of week, and the current date. Even when displaying of a screen is disabled, the processor 270 can control the display unit 251 to display call receipt information and message receipt information 1711.

As shown in 1730 and 1760 of FIG. 17, if a first user input is received when displaying of a screen is disabled, the processor 270 can perform a control action to display a first application screen. In addition, if a second user input is received when displaying of a screen is disabled, the processor 270 can perform a control action to display a second application screen.

In addition, if a third user input is received when displaying of a screen is disabled, the processor 270 can perform a control action to display a third application screen. Matching of the first to third user inputs with the first and third applications may be readily set. Alternatively, The processor 270 can match the first to third user inputs with the first to third applications based on user inputs.

Figure 18:
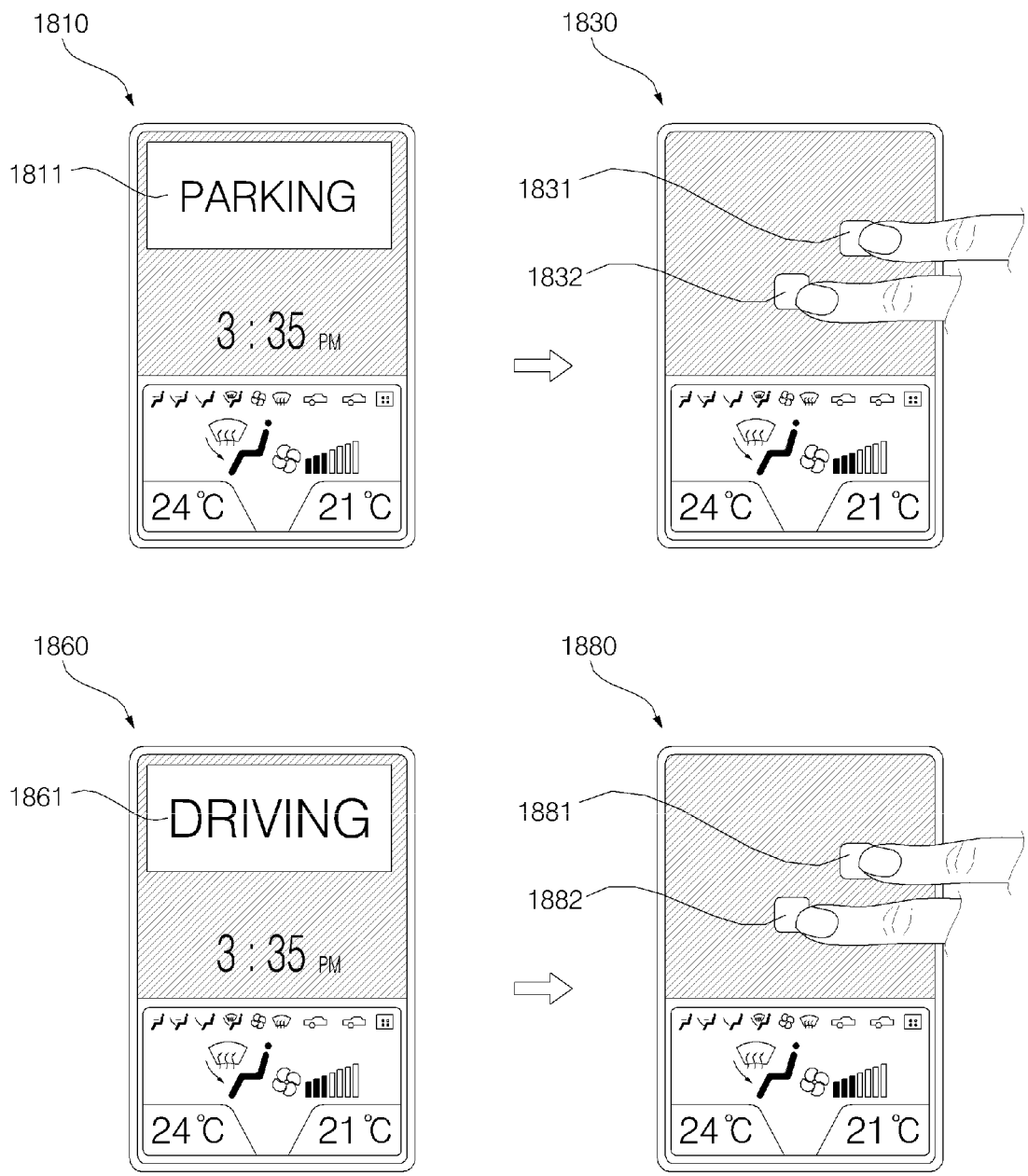
FIG. 18 is a diagram illustrating how an application corresponding to a state of a vehicle is executed, according to an embodiment of the present invention.

FIG. 18 is a diagram illustrating how an application corresponding to a state of a vehicle is executed, according to an embodiment of the present invention. As shown in 1810 of FIG. 18, when the vehicle 100 is in a first state, the processor 270 can disable displaying of a screen. In this instance, the processor 270 can control the display unit 251 to display first state information 1811 of the vehicle 100.

As shown in 1830 of FIG. 18, when displaying of a screen is disabled, the processor 270 can receive a preset user input. In this instance, the processor 270 can perform a control action to display icons 1831 and 1832 of a preset application corresponding to the first state of the vehicle 100. For example, an application corresponding to a parked state may include an AVM application and a parking assist application. If a user's input on any one of the display icons 1831 and 1832 is received, the processor 270 can control the display unit 251 to display an application screen corresponding to autonomous driving.

As shown in 1860 of FIG. 18, when the vehicle 100 is in a second state, the processor 270 can disable displaying of a screen. In this instance, the processor 270 can control the display unit 251 to display second state information 1861 of the vehicle 100. In 1860 of FIG. 18, a driving state is taken as an example of the second state of the vehicle 100.

As shown in 1880 of FIG. 18, when displaying of a screen is disabled, the processor 270 can receive a preset user input. In this instance, the processor 270 can perform a control action to display icons 1881 and 1882 of a preset application corresponding to the second state. For example, an application corresponding to a driving state may include a navigation application, an Autonomous Emergency Braking (AEB) application, an Adaptive Cruise Control (ACC) application, a Blind Spot Detection (BSD) application, and an autonomous driving application. If a user input on any one of the displayed icons 1881 and 1882 is received, the processor 270 can control the display unit 251 to display an application screen corresponding to autonomous driving.

Figure 19:
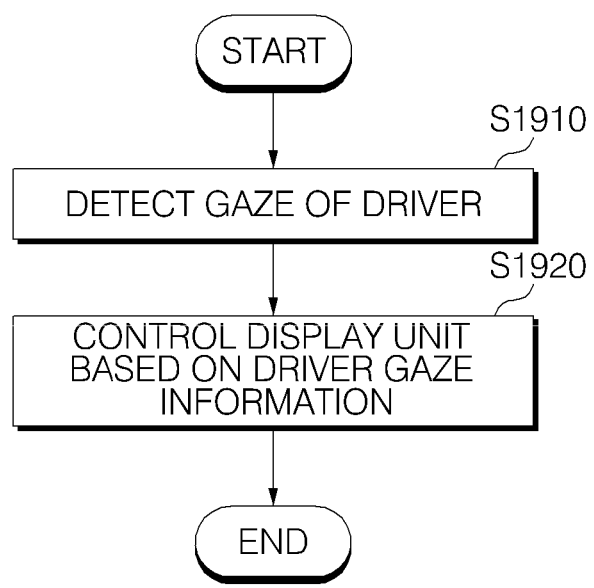
FIG. 19 is a flowchart illustrating how a user interface apparatus for a vehicle operates according to an embodiment of the present invention.

FIG. 19 is a flowchart illustrating how a user interface apparatus for a vehicle operates according to an embodiment of the present invention. Referring to FIG. 19, the processor 270 can detect a gaze of a driver via the internal camera 220 in S1910. The gaze of a driver may indicate a point at which eyes of the driver stare, or a direction of the eyes of the driver. The processor 270 can control the display unit 251 based on driver gaze information in S1920. For example, the processor 270 can determine whether a gaze of the driver is beyond a preset range. Further, the preset range may indicate a range that is preset in order to determine whether the gaze of the driver is toward the area forward of the vehicle 100.

If it is determined that the gaze of the driver is beyond the preset range, the processor 270 can control the display unit 251 to perform a preset function. The preset function may be functions for inducing the driver to look ahead. The preset function may include a function of disabling displaying of a screen. For example, the preset function may include a function of disabling a user's touch input. In this instance, the processor 270 can not respond to the user's touch input.

In addition, the preset function may include a function of outputting a message for inducing the driver to look ahead, or a function of displaying a vehicle front view. For example, the preset function may include a function of displaying a screen, displayed on the display unit 251, in an additionally provided HUD or cluster. Also, if it is determined that the gaze of the driver is beyond a preset range, the processor 270 can switch the state of the vehicle 100 from a manual driving state to an autonomous driving state.

Figure 20:
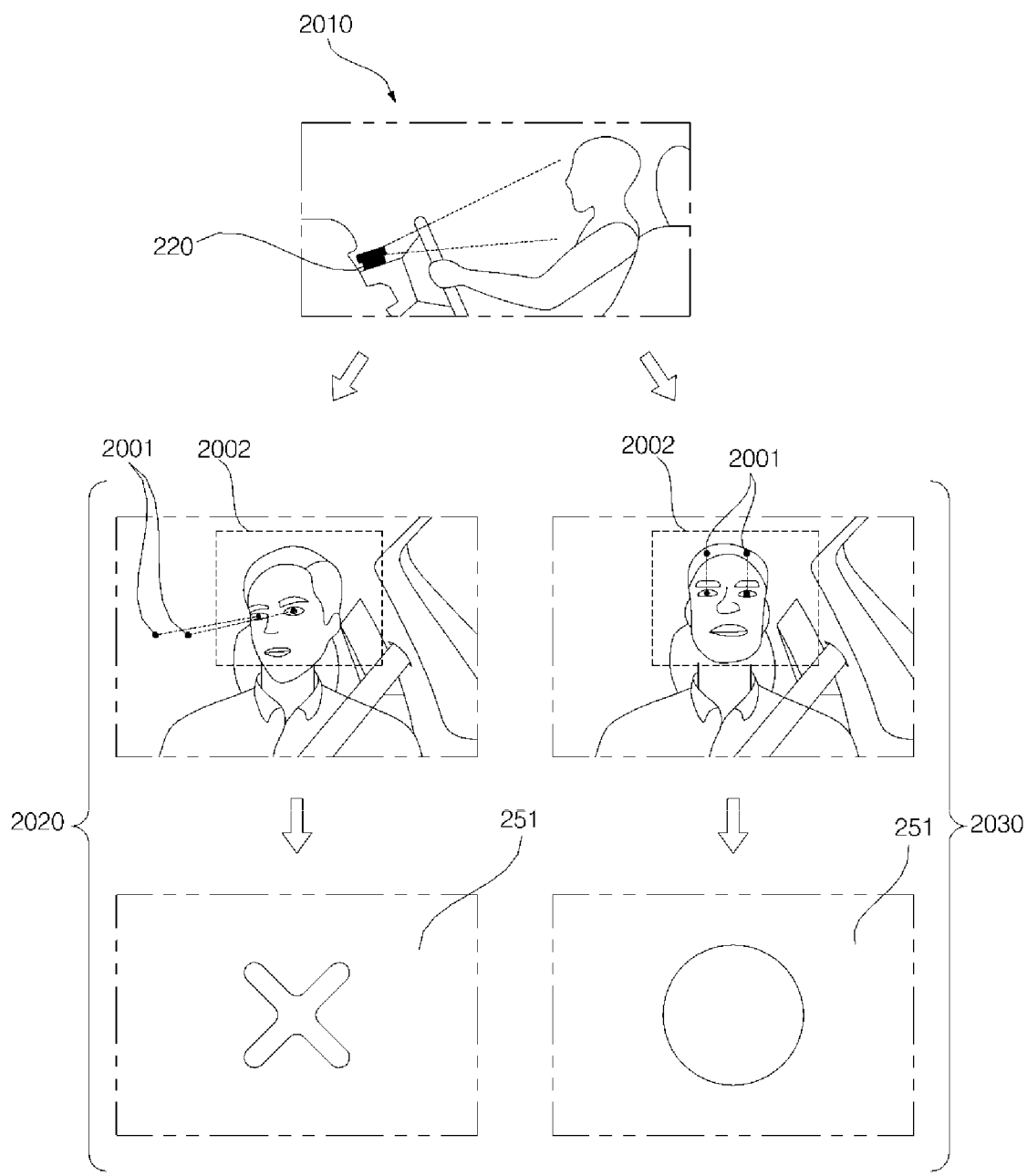
FIG. 20 is a diagram illustrating an example of how a user interface apparatus for a vehicle operates based on driver gaze information according to an embodiment of the present invention.

Next, FIG. 20 is a diagram illustrating an example of how a user interface apparatus for a vehicle operates based on driver gaze information according to an embodiment of the present invention. As shown in 2010 of FIG. 20, the processor 270 can detect a gaze of a driver using the internal camera 220 to generate driver gaze information and control the display unit 251 based on the driver gaze information. Further, the processor 270 can determine whether a gaze 2001 of the driver is beyond a preset range 2002.

As shown in 2020 of FIG. 20, if it is determined that the gaze 2001 of the driver has been beyond the preset range 2002 for a preset period of time or more, the processor 270 can control the display unit 251 to disable displaying of a screen. In this instance, the processor 270 can disable a touch input function in a touch screen. As shown in 2030 of FIG. 20, if it is not determined that the gaze 2001 of the driver is beyond the preset range 2002, the processor 270 can control the display unit 251 to display a screen normally.

Figure 21:
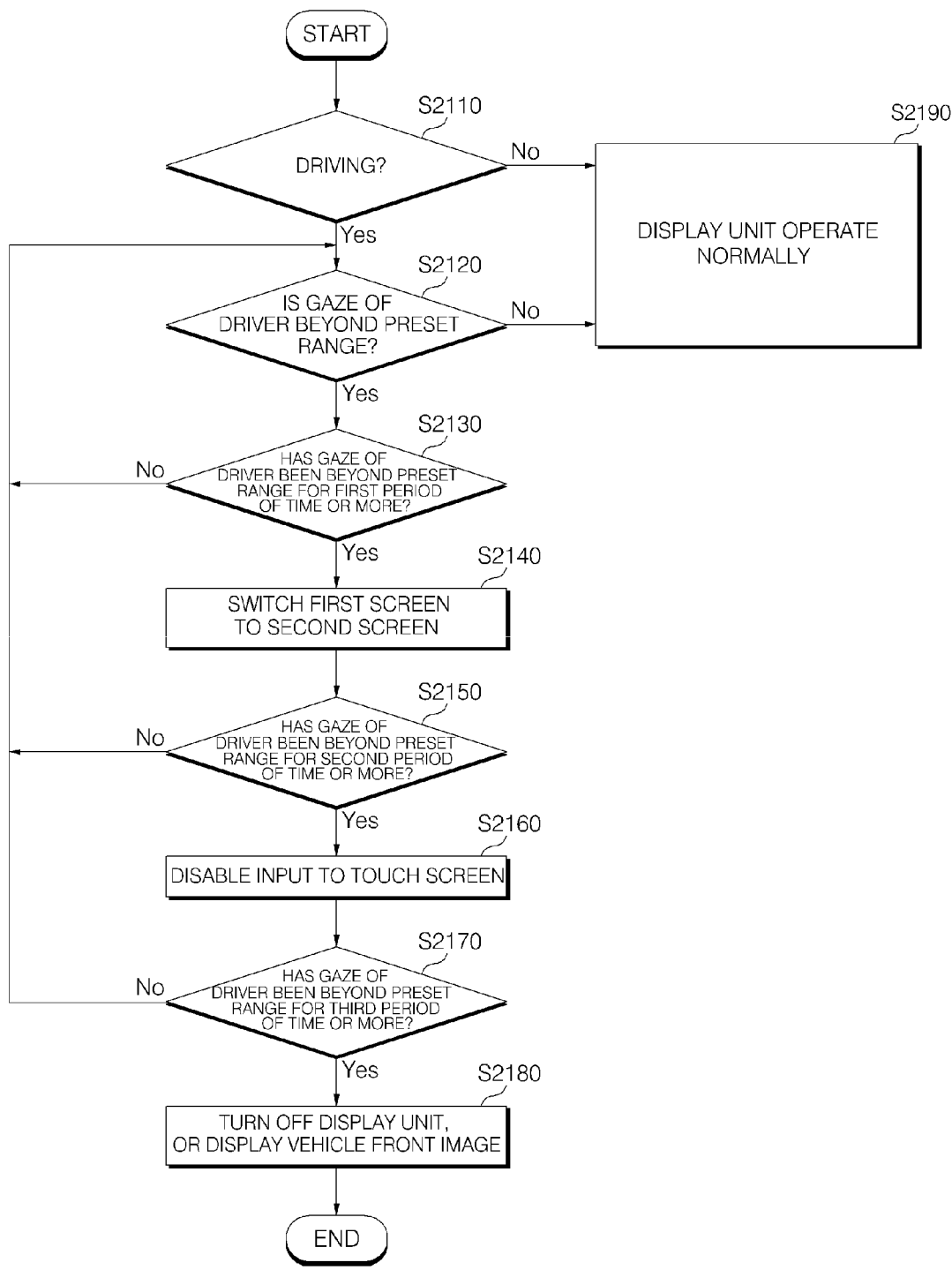
FIG. 21 is a flowchart illustrating how a user interface apparatus for a vehicle operates according to an embodiment of the present invention.
Figure 22:
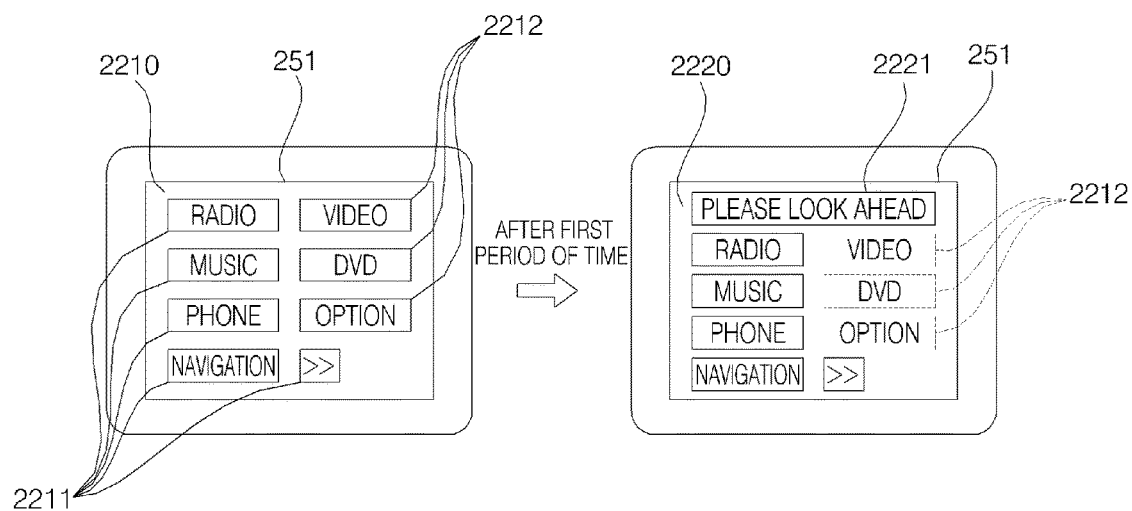
FIGS. 22 to 24 are diagram illustrating examples of the operation described with reference to FIG. 21.
Figure 23:
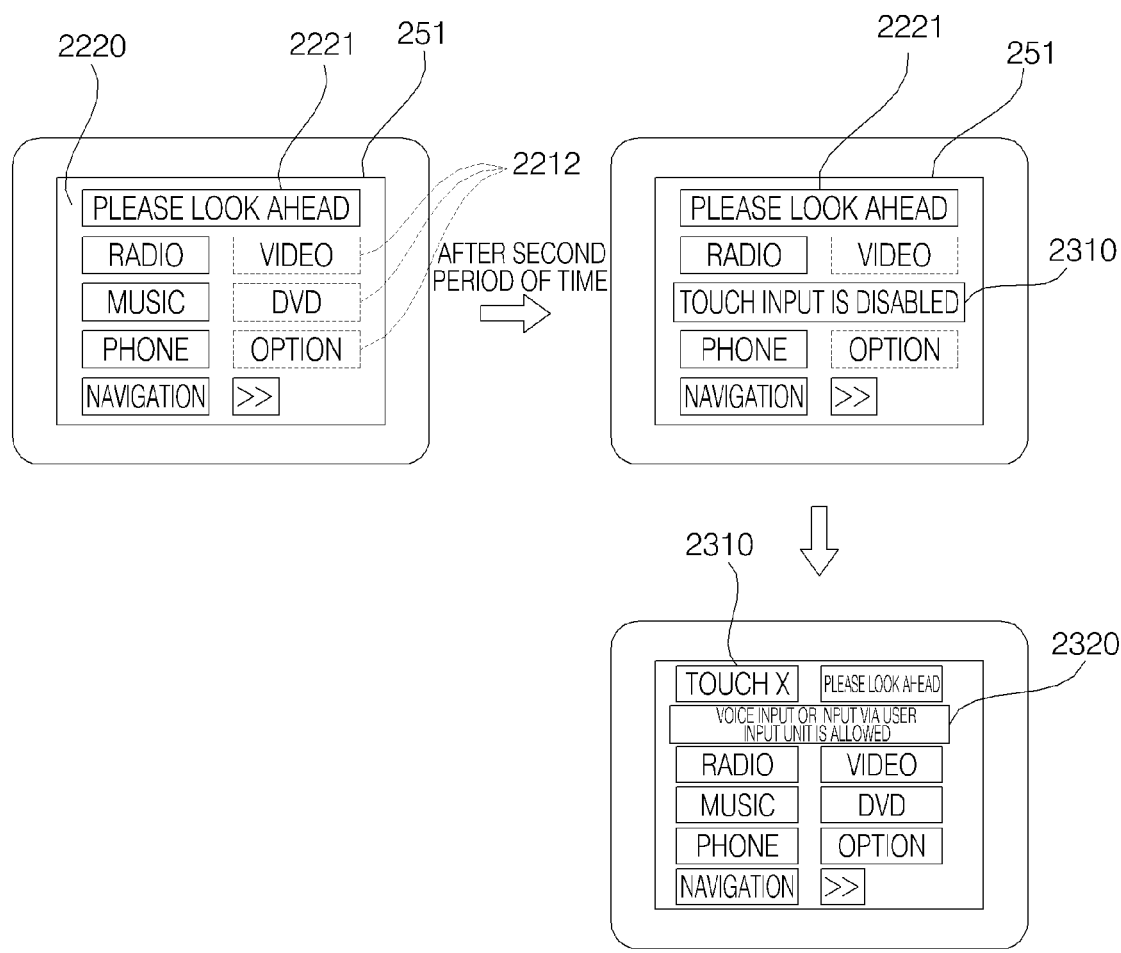
Figure 24:
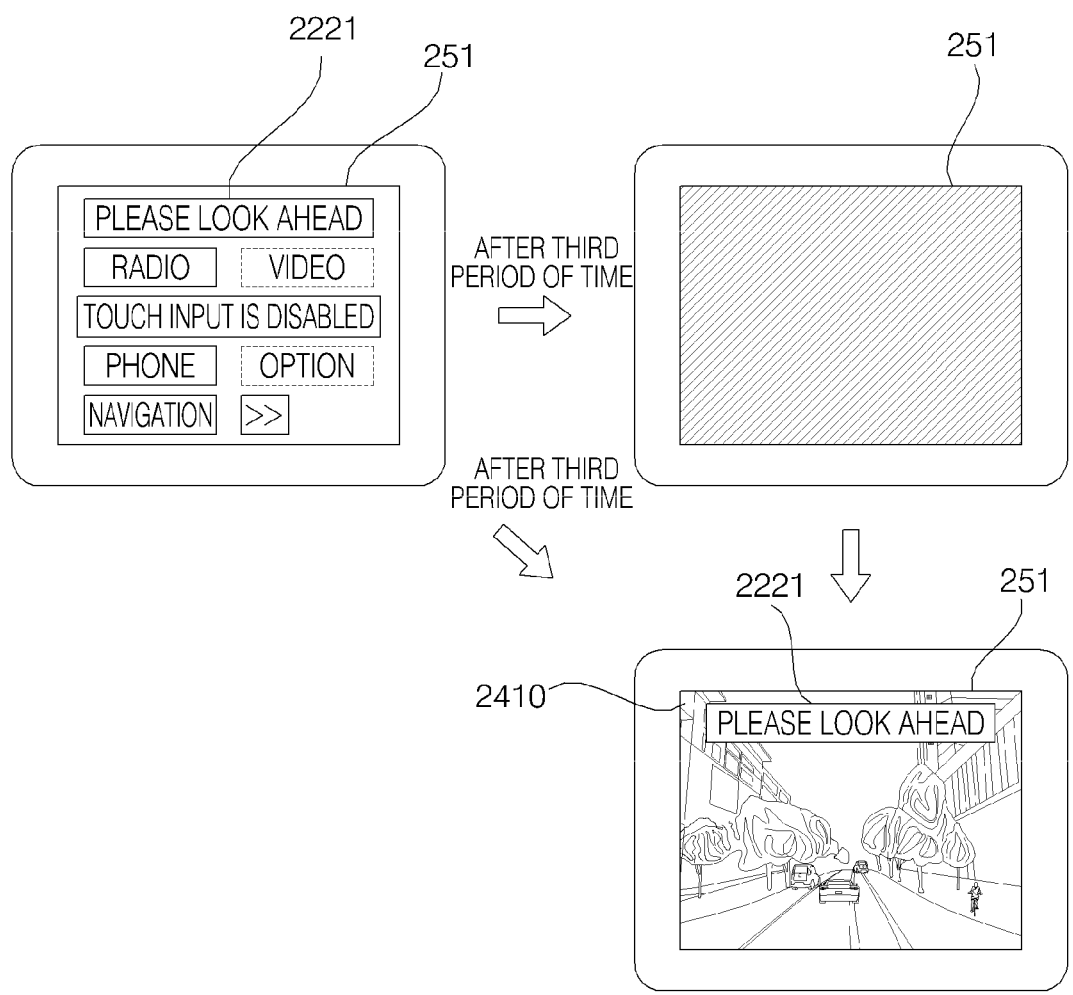

FIG. 21 is a flowchart illustrating an operation of a user interface apparatus for a vehicle according to an embodiment of the present invention and FIGS. 22 to 24 are diagrams illustrating examples of the operation described with reference to FIG. 21. Referring to FIG. 21, the processor 270 can determine whether the vehicle 100 is in a driving state in S2110. If it is not determined that the vehicle 100 is in the driving state, the processor 270 can control the display unit 251 to operate normally in S2190.

If it is determined that the vehicle 100 is in the driving state, the processor 270 can determine whether a gaze (indicated by 2001 in FIG. 20) of a driver is beyond a preset range (indicated by 2002 in FIG. 20) in S2120. If it is not determined that the gaze of the driver is beyond the preset range, the processor 270 can control the display unit 251 to operate normally in S2190.

If it is determined that the gaze of the driver is beyond the preset range, the processor 270 can determine whether the gaze of the driver has been beyond the preset range for a first period of time or more in S2130. If it is determined that the gaze of the driver is has been beyond the preset range for less than the first period of time, the processor 270 can return to operation S2120.

If it is determined that the gaze of the driver has been beyond the preset range for the first period of time or more, the processor 270 can control the display unit 251 to switch a first screen into a second screen in S2140. The second screen may be a screen in which displaying some of the information items included in the first screen is disabled.

The second screen may include a lesser number of information items than the first screen. The second screen may include information that a user can more intuitively perceive, compared to the first screen. For example, the first screen may be configured with texts, and the second screen may be configured with an image.

Referring to FIG. 22, the processor 270 can display a first screen 2210. The first screen may include a plurality of information items 2211 and 2212 or a plurality of content items. If it is determined that a gaze of a driver has been beyond a preset range for the first period of time or more, the processor 270 can control the display unit 251 to switch the first screen 2210 into a second screen 2220. Further, the second screen 2220 may be a screen in which some information items 2212 are disabled, compared to the first screen 2210. In addition, the processor 270 can control the display unit 251 to display a message 2211 for inducing a driver to look ahead.

Referring again to FIG. 21, the processor 270 can determine whether the gaze of the driver has been beyond the preset range for a second period of time or more in S2150. The second period of time may be longer than the first period of time. If it is determined that the gaze of the driver has been beyond the preset range for less than the second period of time, the processor 270 can return to operation S2120.

If it is determined that the gaze of the driver has been beyond the preset range for the second period of time or more, the processor 270 can disable a touch input function in S2160. In this instance, the processor 270 can control the display unit 251 to display a notification to inform that the touch input function is disabled.

Referring to FIG. 23, if it is determined that the gaze of the driver has been beyond the present range for the second period of time or more, the processor 270 can disable the touch input function. In this instance, the processor 270 can control the display unit 251 to display a notification 2310 to inform that the touch input function is disabled.

In addition, the processor 270 can change a user input means. For example, the processor 270 can change a type of a user input from a touch input to a voice input or a gesture input. The processor 270 can also control the display unit 251 to display a notification 2320 to inform that inputs (e.g., a voice input and a gesture input) other than a touch input are enabled. Further, the processor 270 can control the display unit 251 based on a user input that is received by use of a changed user input means.

Again, referring to FIG. 21, the processor 270 can determine whether the gaze of the driver has been beyond the preset range for a third period of time or more in S2170. The third period of time may be longer the second period of time. If it is determined that the gaze of the driver has been beyond the preset range for less than the third period of time, the processor 270 can return to operation S2120. If the gaze of the driver is determined to have been beyond the preset range for the third period of time or more, the processor 270 can turn off the display unit 251 or output a vehicle front view in S2180.

Referring to FIG. 24, if it is determined that the gaze of the driver has been beyond the preset range for the third period of time or more, the processor 270 can turn off the display unit 251. In this instance, nothing may be displayed on the display unit 251. If it is determined that the gaze of the driver has been beyond the preset range for the third period of time or more, the processor 270 can output a vehicle front view 2410. In this instance, the processor 270 can control the display unit 251 to display an image 2211 for inducing the driver to look ahead. In addition, the vehicle front view 2410 may be an image acquired by the camera 310.

FIGS. 25A to 27 are diagrams illustrating various examples of how a user interface apparatus operates based on a user's gaze according to an embodiment of the present invention. In addition, the user includes a driver and a passenger sitting on the front passenger seat.

Figure 25A:
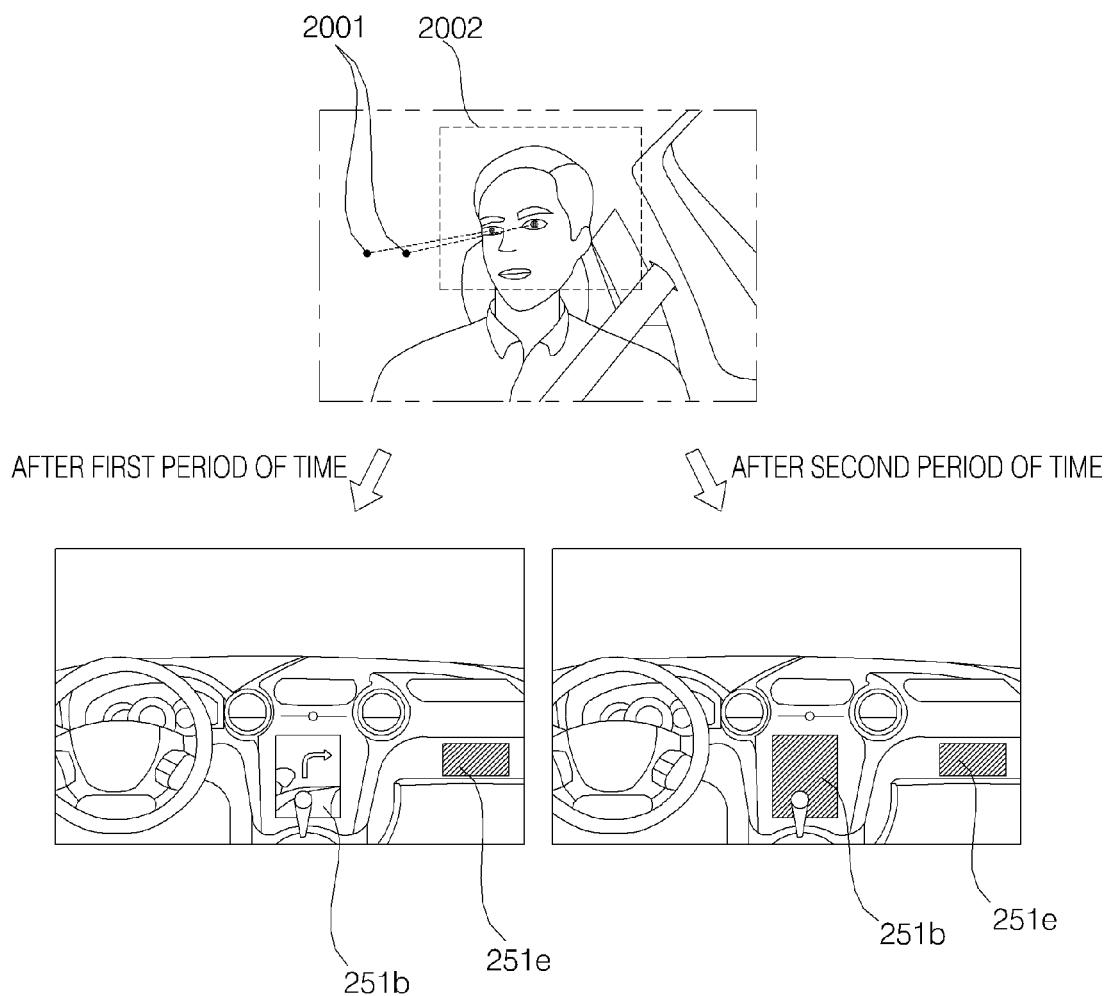
FIGS. 25A to 27 are diagrams illustrating various examples of how a user interface apparatus operates based on a gaze of a user according to an embodiment of the present invention.

As illustrated in FIG. 25A, a user interface apparatus 200 may include a plurality of display units. For example, the user interface apparatus 200 may include a first display unit 251*b* and a second display unit 251*e*. The first display unit 251*b* can be disposed close to a driver, compared to the second display unit 251*e*.

The processor 270 can control the plurality of display units 251*b* and 251*e* individually based on driver gaze information. For example, the processor 270 can perform a control action such that if the period of time for which driver gazes out of the predetermined range is long, a screen being displayed on a display unit (the display unit 251*e*) more distant from the driver among the plurality of display units may disappear. The feature of causing a screen to disappear may include turning off the display unit 251, entering a standby mode, or converting the currently displayed screen into a different screen.

For example, if it is determined that the gaze 2001 of the driver has been beyond the preset range 2002 for a first period of time or more, the processor 270 can cause a screen displayed on the second display unit 251*e* to disappear. Then, if it is determined that the gaze 2001 of the driver has been beyond the preset range 2002 for a second period of time or more, the processor 270 can cause screens displayed on the first and second display units 251*b* and 251*e* to disappear. The second period of time may be longer than the first period of time. In this way, a driver may spend less time in staring at a display unit disposed distant from the driver among a plurality of display units, so that the driver may be induced to focus on driving.

Figure 25B:
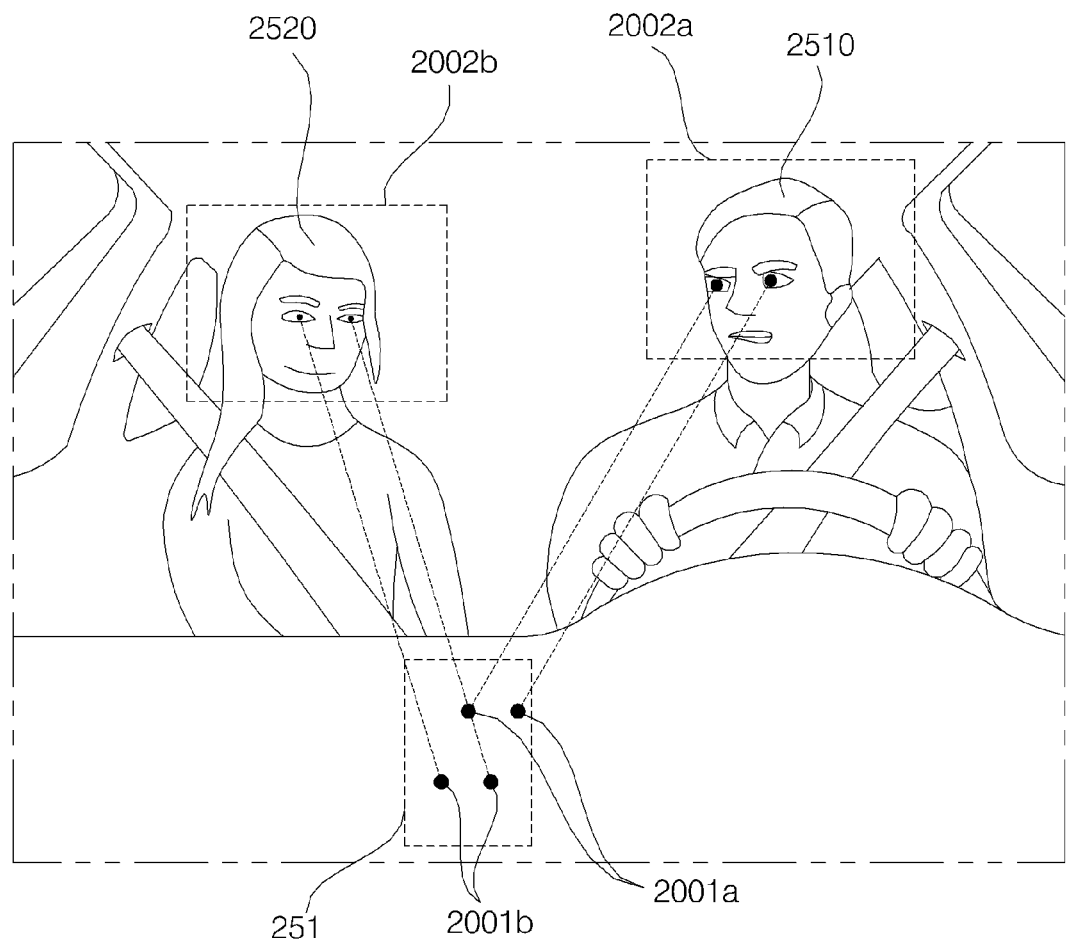
Figure 25B:
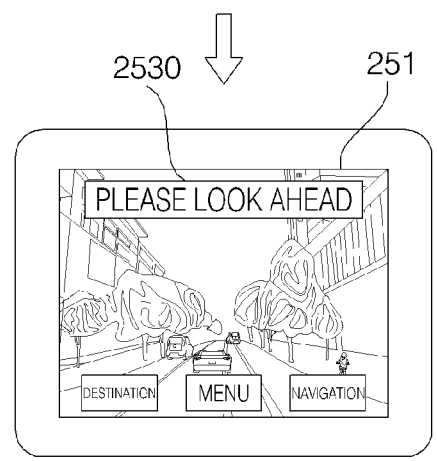

As illustrated in FIG. 25B, the processor 270 can detect a gaze of a driver 2510 and a gaze of a person sitting in the front passenger seat (hereinafter, referred to as a passenger) (2520). If it is determined that a gaze 2001*a* of the driver and a gaze 2001*b* of the passenger have been directed toward the display unit 251 for a preset period of time or more, the processor 270 can output a notification message 2530 to induce the driver 2510 to stare at a preset range 2002*a*.

Figure 25C:
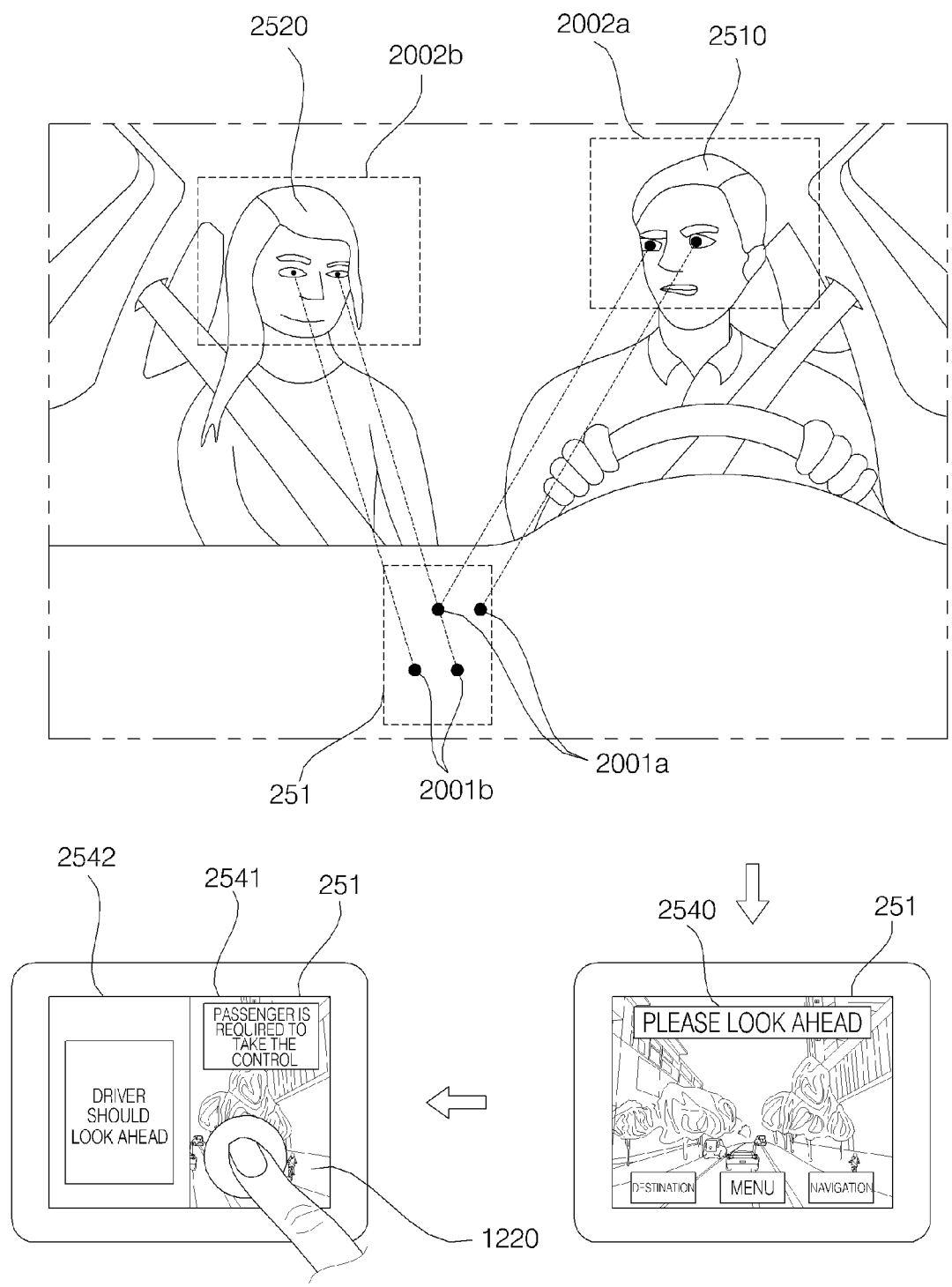

As illustrated in FIG. 25C, if it is determined that the gaze 2001*a* of the driver and the gaze 2001*b* of the passenger have been directed toward the display unit 251 for a preset period of time or more, the processor 270 can change a display format of a screen being displayed on the display unit 251, so that the passenger 2520, rather than the driver 2510, may take control of the display unit 251. For example, the processor 270 can divide the display unit 251 into two regions 2541 and 2542 and control the display unit 251 so that the currently displayed screen is output in any one of the two regions 2541 and 2542.

The region 2541 in which the screen is output may be a region close to the front passenger seat. In this instance, the region 2542 in which the screen is not output may output a message for inducing the driver to look ahead. Alternatively, the processor 270 can output a vehicle front view in the region 2542 in which the screen is not output.

In addition, the processor 270 can maintain the touch input function in the region 2541 in which the screen is output. The processor 270 can disable the touch input function in the region 2542 in which the screen is not output. If it is determined that the gaze 2001 of the driver falls within the preset range 2002a, the processor 270 can control the display unit 251 to restores the original display format of the screen.

Figure 25D:
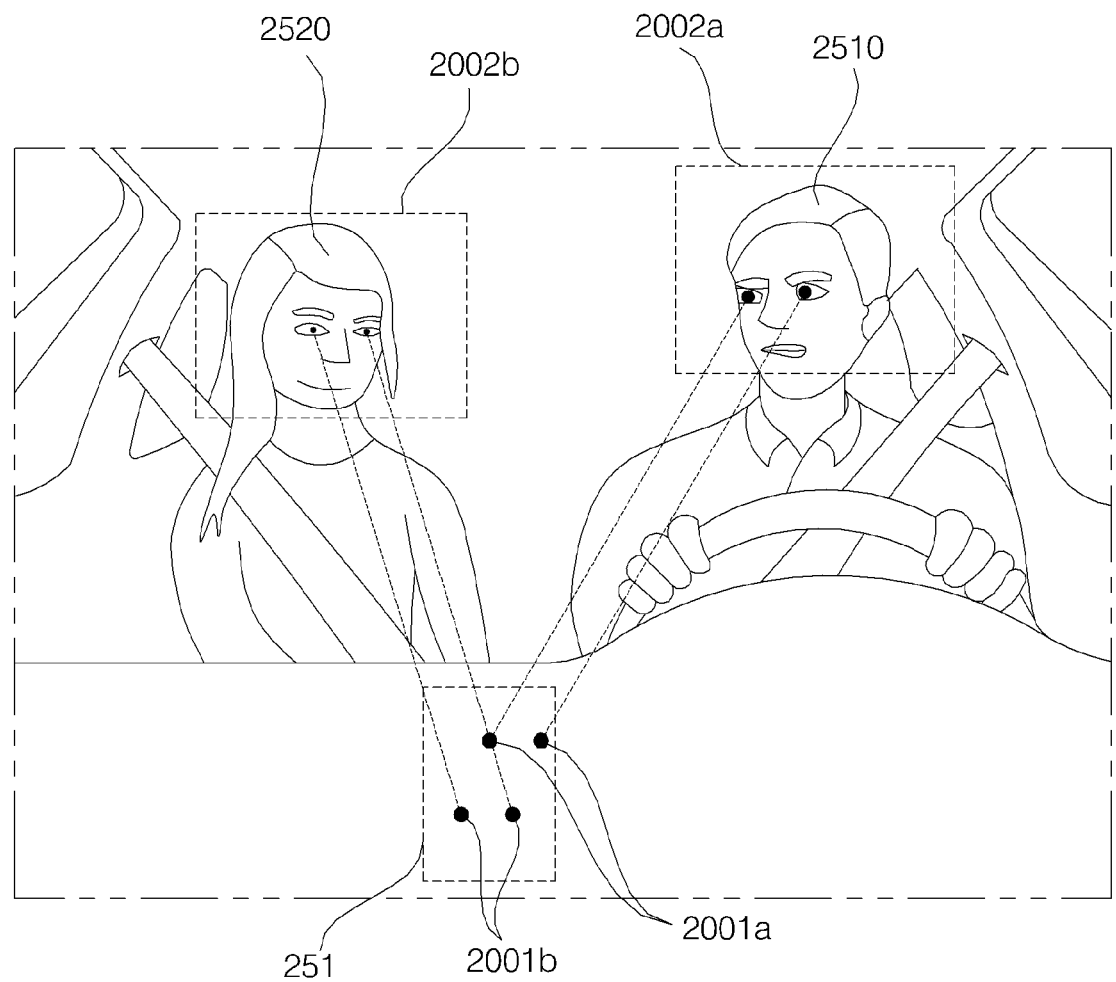
Figure 25D:
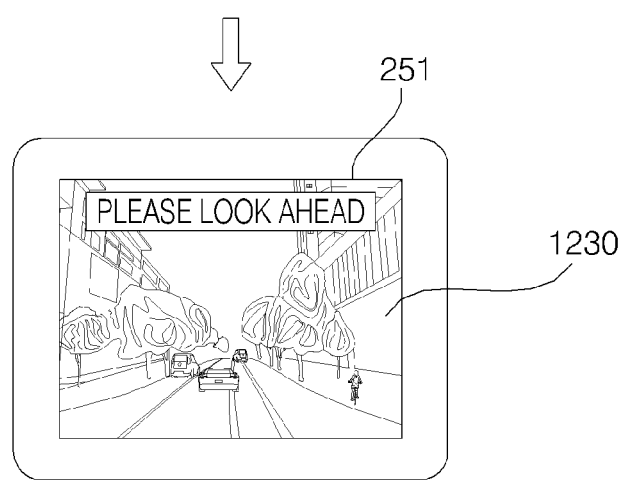

As illustrated in FIG. 25D, if it is determined that the gaze 2001a of the driver and the gaze 2001b of the passenger have been directed toward the display unit 251 for a preset period of time or more, the processor 270 can output a message for inducing the driver to look ahead. Alternatively, the processor 270 can control the display unit 251 to output a vehicle front view.

Figure 26:
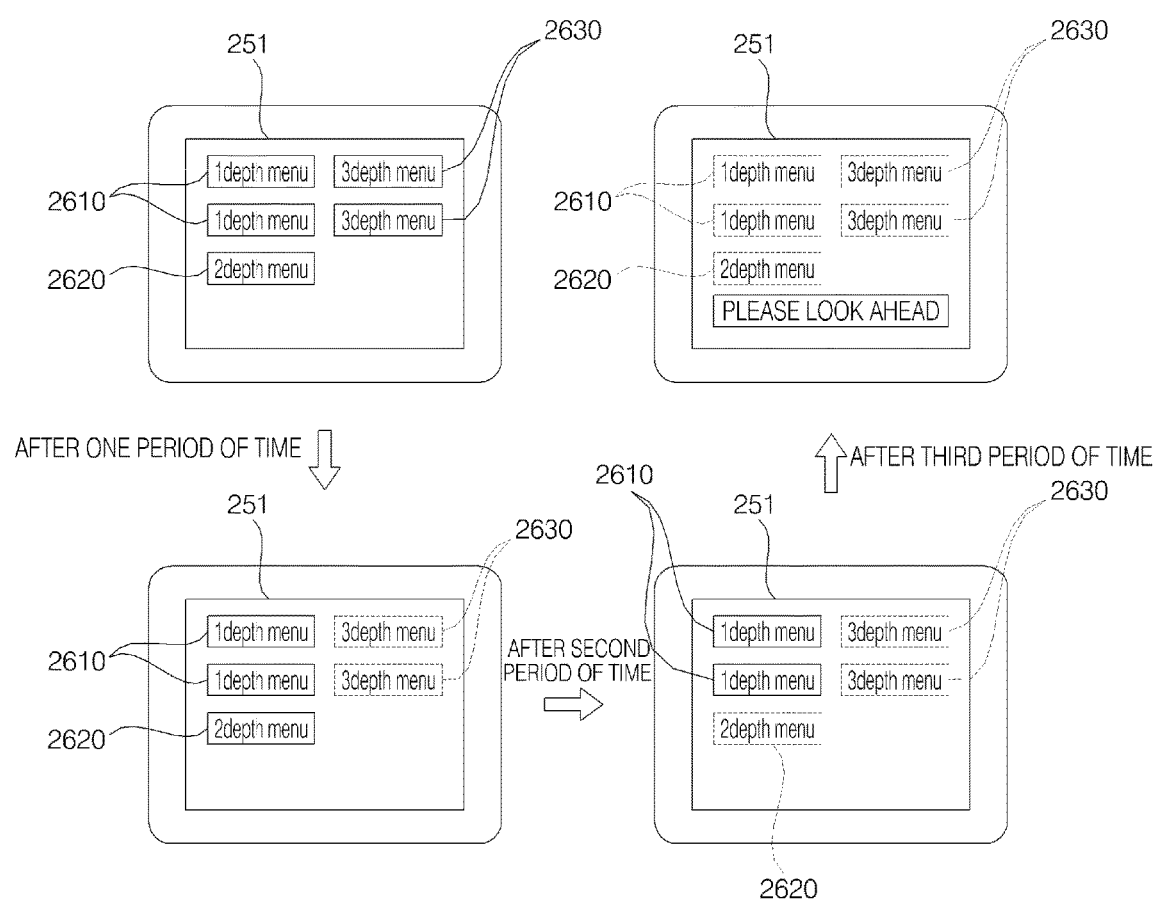

FIG. 26 is a diagram illustrating how a user interface apparatus for a vehicle disables selection of an item having a different depth according to an embodiment of the present invention. Referring to FIG. 26, the processor 270 can control the display unit 251 to output a plurality of items (e.g., graphic objects, icons, widgets, buttons, and images) for selection. Each of the items may be formed to have a preset depth level.

A depth level may be defined as the number of user inputs that are required for execution of a function associated with a corresponding item. For example, a 1-depth item 2610 may be an item that requires a single user input to execute a function associated therewith. For example, a 2-depth item 2620 may be an item that requires double user inputs to execute a function associated therewith. The higher depth level an item has, the more number of user inputs a user needs to apply to execute a desired function. Accordingly, if a driver behind the wheel wants to execute a function of an item having a higher depth, the driver needs a long time for the execution while not looking ahead.

If the time for which a gaze of the driver has been beyond a preset range becomes longer, the processor 270 can disable selection of menu items sequentially in a descending order of depth levels thereof. For example, if it is determined that the gaze of the driver has been beyond the preset range for a first period of time or more, the processor 270 can disable selection of the 3-depth item 2630.

For example, if it is determined that the gaze of the driver has been beyond the preset range for a second period of time or more, the processor 270 can disable selection of the 2-depth item 2620 and the 3-depth item 2630. For example, if it is determined that the gaze of the driver has been beyond the preset range for a third period of time or more, the processor 270 can disable selection of the 1-depth to 3-depth items 2610, 2620, and 2630. In this instance, the processor 270 can control the display unit 251 to output a message for inducing the driver to look ahead.

Figure 27:
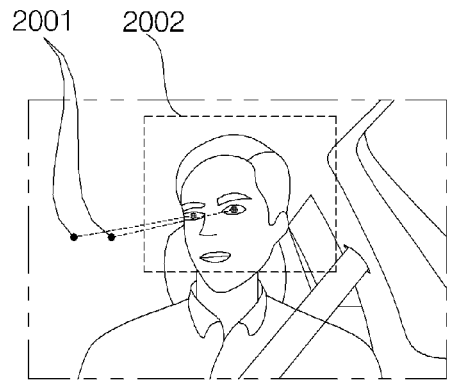
Figure 27:
Figure 27:
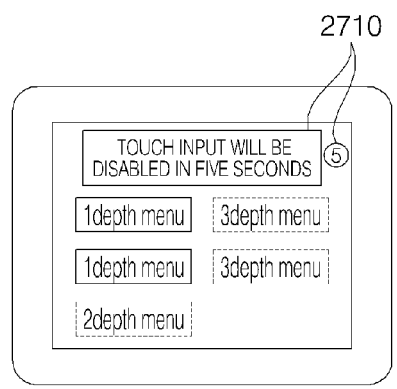
Figure 27:
Figure 27:
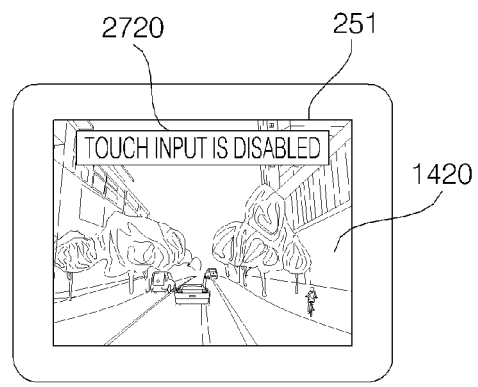

FIG. 27 is a diagram illustrating how a user interface apparatus for a vehicle disables a touch input function according to an embodiment of the present invention. Referring to FIG. 27, if it is determined that a gaze 2001 of a driver has been beyond a preset range for a certain period of time or more, the processor 270 can disable an input function in the display unit 251. In this instance, the processor 270 can control the display unit 251 to output information 2710 about remaining time until the input function is disabled.

Figure 28:
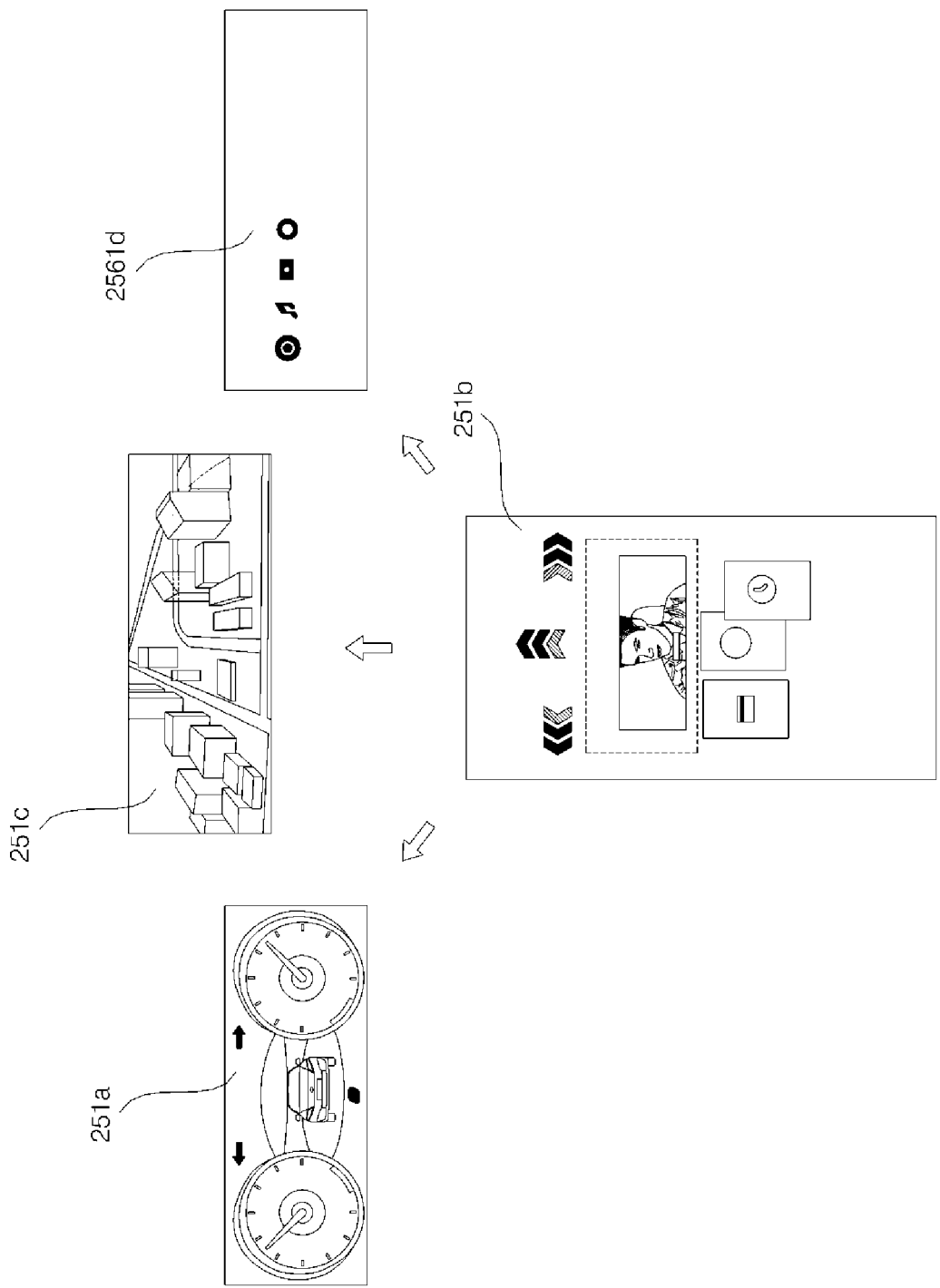
FIG. 28 is a diagram illustrating how a user interface apparatus for a vehicle, including a plurality of display units, operates according to an embodiment of the present invention.

FIG. 28 is a diagram illustrating how a user interface apparatus for a vehicle, including a plurality of display units, operates according to an embodiment of the present invention. Referring to FIG. 28, a user interface apparatus 200 may include a plurality of display units 251a, 251b, 251c, and 251d. For example, the user interface apparatus 200 may include a first display unit 251a, a second display unit 251b, a third display unit 251c, and a fourth display unit 251d.

For example, the first display unit 251a may be a display that operates as a cluster. For example, the second display unit 251 may be a Center Information Display (CID) disposed on the center fascia. A plurality of screens may be displayed on the second display unit 251b. A plurality of information items may be displayed on the second display unit 251b. For example, the third display unit 251c may be a Head Up Display (HUD), and the fourth display unit 251d may be a Rear Seat Entertainment (RSE) display.

If a user input is received when a plurality of screens are displayed on the second display unit 251b, the processor 270 can control the plurality of screens to be separately displayed on the different display units 251a, 251c, and 251d. For example, if a user input is received when a plurality of screens are displayed on the second display unit 251b, the processor 270 can perform a control action such that a first screen is displayed on the first display unit 251a, a second screen is displayed on the second display unit 251b, a third screen is displayed on the third display unit 251c, and a fourth screen is displayed on the fourth display unit 251d.

Figure 29:
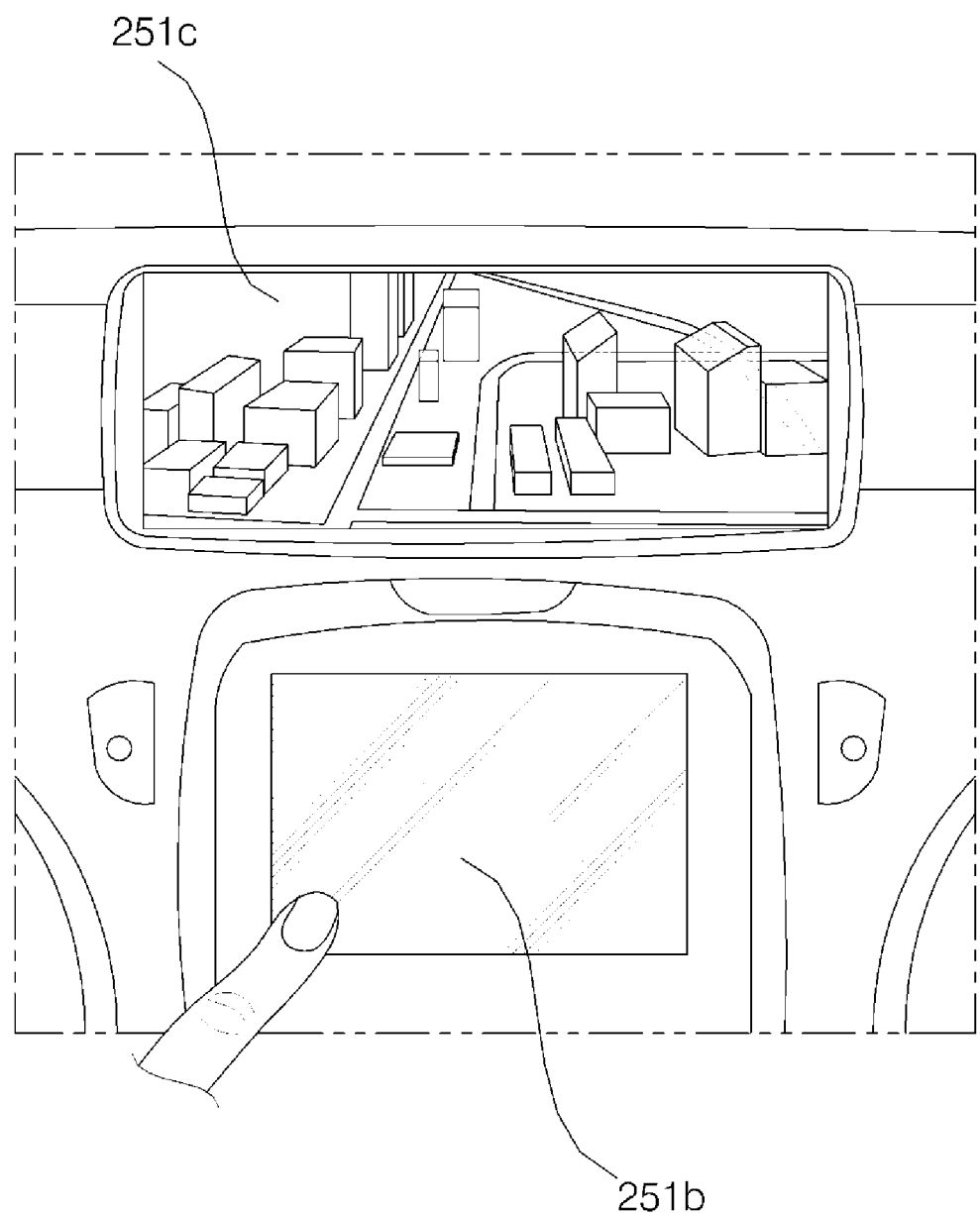
FIG. 29 is a diagram illustrating how a user interface apparatus for a vehicle, including a plurality of display units, operates according to an embodiment of the present invention.

FIG. 29 is a diagram illustrating how a user interface apparatus for a vehicle, including a plurality of display units, operates according to an embodiment of the present invention. Referring to FIG. 29, a user interface apparatus 200 may include a first display unit 251b and a second display unit 251c.

For example, the first display unit 251b may be a CID disposed in the center fascia, and the second display unit 251c may be an HUD. The processor 270 can control the second display unit 251c based on a touch input received on the first display unit 251b. If a drag input is received in the first display unit 251b when a media file control screen is displayed on the second display unit 251c, the processor 270 can play a next file. Also, if a pinch-in input is received in the first display unit 251b when a navigation screen is displayed on the second display unit 251c, the processor 270 can reduce the size of the navigation screen.

Figure 30:
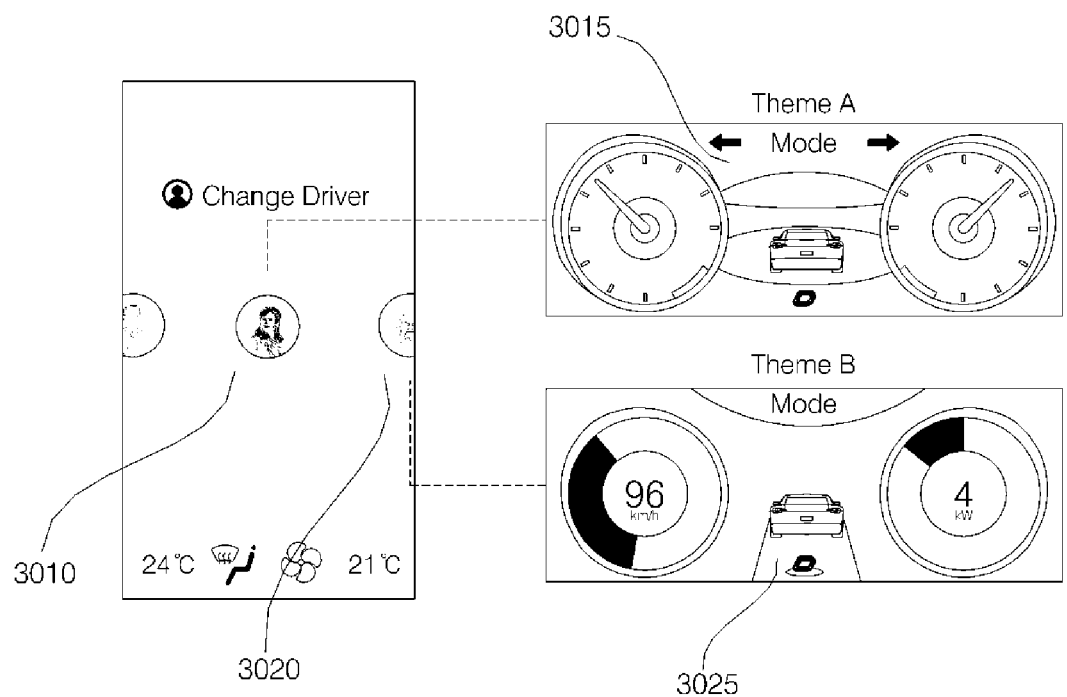
FIG. 30 is a diagram illustrating how a user interface apparatus for a vehicle used by multiple users operates according to an embodiment of the present invention.

FIG. 30 is a diagram illustrating how a user interface apparatus for a vehicle used by multiple users operates according to an embodiment of the present invention. Referring to FIG. 30, the vehicle 100 may be used by multiple users. Information on each of the multiple users may be stored in the memory 240. The memory 240 may store information on each of multiple users 3010 and 3020. Information on a user may include authentication information used to authenticate the user, and Graphic User Interface (GUI) information of the display unit 251, which is set by the user. The authentication information may include biometric information of the user.

The processor 270 can set the display unit 251 based on GUI information corresponding to an authenticated user. For example, if a first user 3010 is in the vehicle 100, the processor 270 can acquire biometric information of the first user 3010 using the biometric sensing unit 230, and compare the biometric information of the first user 2010 with authentication information stored in the memory 240 to authenticate the first user 3010. If the first user 3010 is authenticated, the processor 270 can set the display unit 251 according to GUI set by the first user 3010. For example, if a second user 3020 is in the vehicle 100, the processor 270 can set the display unit 251 according to pre-stored GUI corresponding to the second user 3020.

Figure 31:
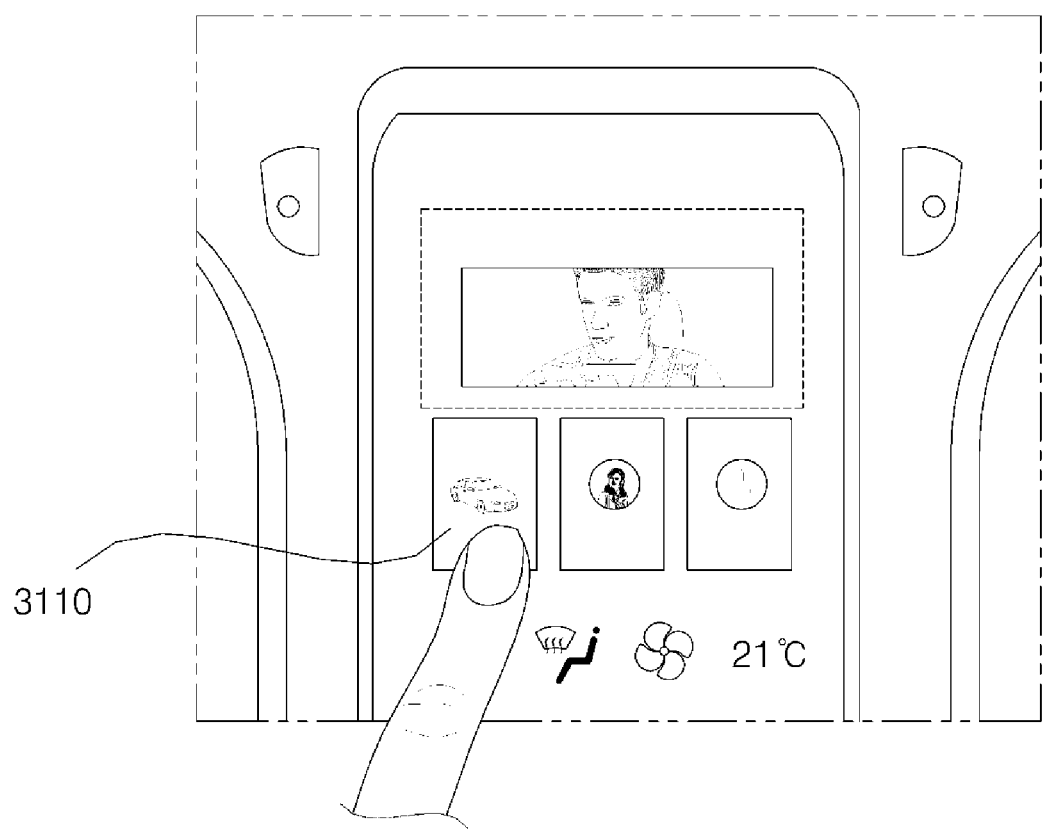
FIGS. 31 to 33 are diagrams illustrating how to switch to an autonomous driving state by a user interface apparatus for a vehicle according to an embodiment of the present invention.
Figure 32:
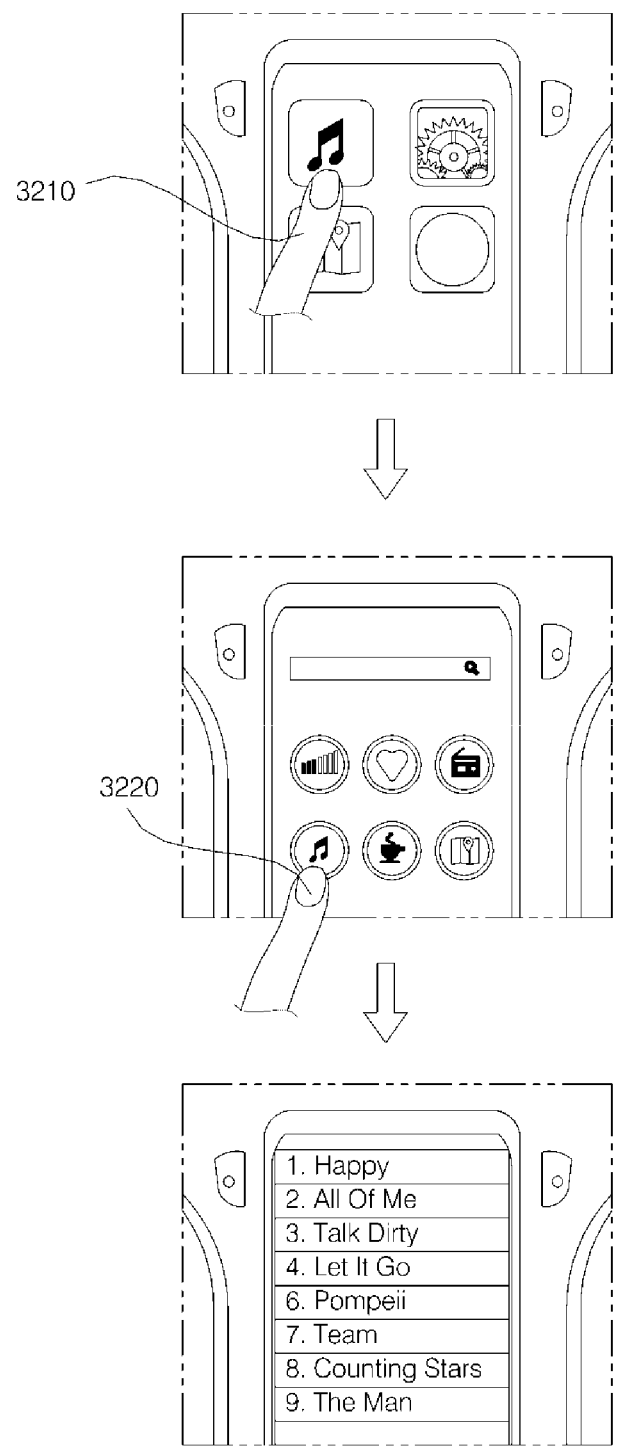
Figure 33:
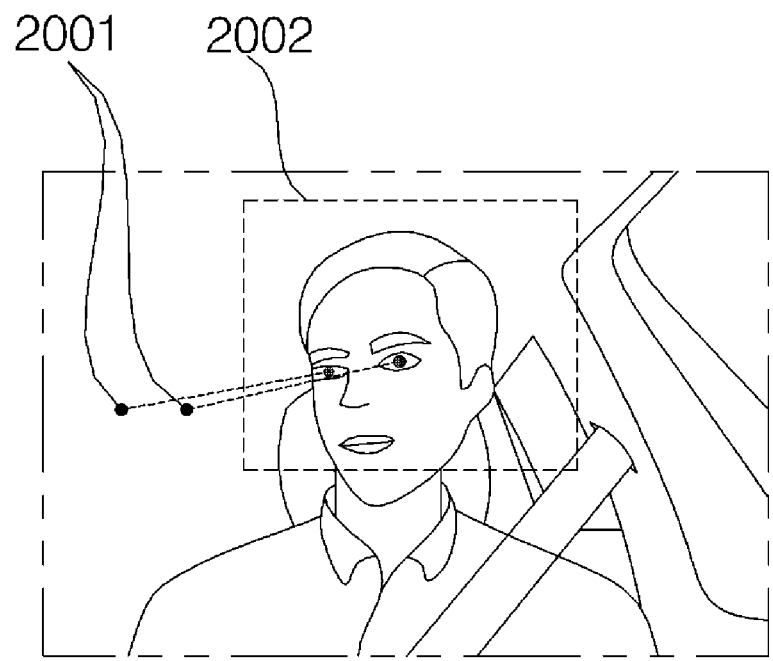

FIGS. 31 to 33 are diagrams illustrating how to switch to an autonomous driving state by a user interface apparatus for a vehicle according to an embodiment of the present invention. Referring to FIG. 31, if a preset application is executed, the processor 270 can provide a signal to switch the state of the vehicle 100 from a manual driving state to an autonomous driving state. For example, if a touch input on an icon 3110 is received when an icon 3110 corresponding to an autonomous driving application is displayed, the processor 270 can provide a signal so that the state of the vehicle 100 is switched from the manual driving state to the autonomous driving state.

Referring to FIG. 32, while a preset application is executed, the processor 270 can enter a preset depth level or higher of the application. In this instance, the processor 270 can provide a signal to switch the state of the vehicle 100 from the manual driving state to the autonomous driving state. For example, the processor 270 can execute a first application in accordance with a first user input 3210. The execution state of the first application may be defined as 1-depth. While the first application is executed, the processor 270 can enter 2 depth in accordance with a second user input 3220.

Entering 2 depth or a higher level of a specific application may be set as a criteria for switching to an autonomous driving state. When entering 2 depth of the specific application, the processor 270 can provide a signal so that the state of the vehicle 100 is switched from the manual driving state to the autonomous driving state.

Referring to FIG. 33, the processor 270 can detect a gaze of a driver using the external camera 220, and generate driver gaze information. The processor 270 can determine whether a gaze 2001 of the driver has been beyond a preset region 2002 for a preset period of time or more. If it is determined that the gaze 2001 of the driver has been beyond the preset region 2002 for the preset period of time or more, the processor 270 can provide a signal to switch the state of the vehicle 100 from a manual driving state to an autonomous driving state.

For example, the processor 270 can determine whether the gaze 2001 of the driver has been directed toward the display unit 251 for a preset period of time or more. If it is determined that the gaze 2001 of the driver has been directed toward the display unit 251 for the preset period of time or more, the processor 270 can provide a signal to switch the state of the vehicle 100 from the manual driving state to the autonomous driving state.

Figure 34:
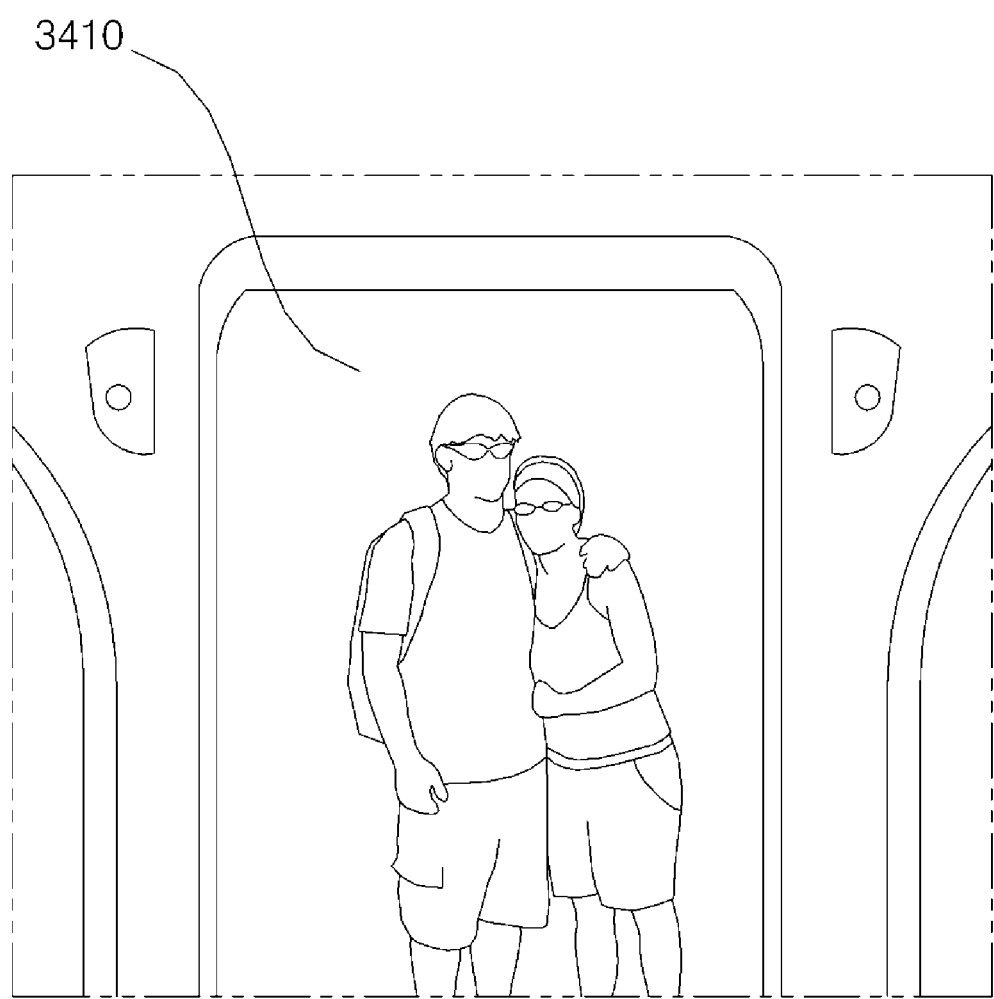
FIGS. 34 to 36 are diagrams illustrating how to operate after switching to an autonomous driving state according to an embodiment of the present invention.
Figure 35:
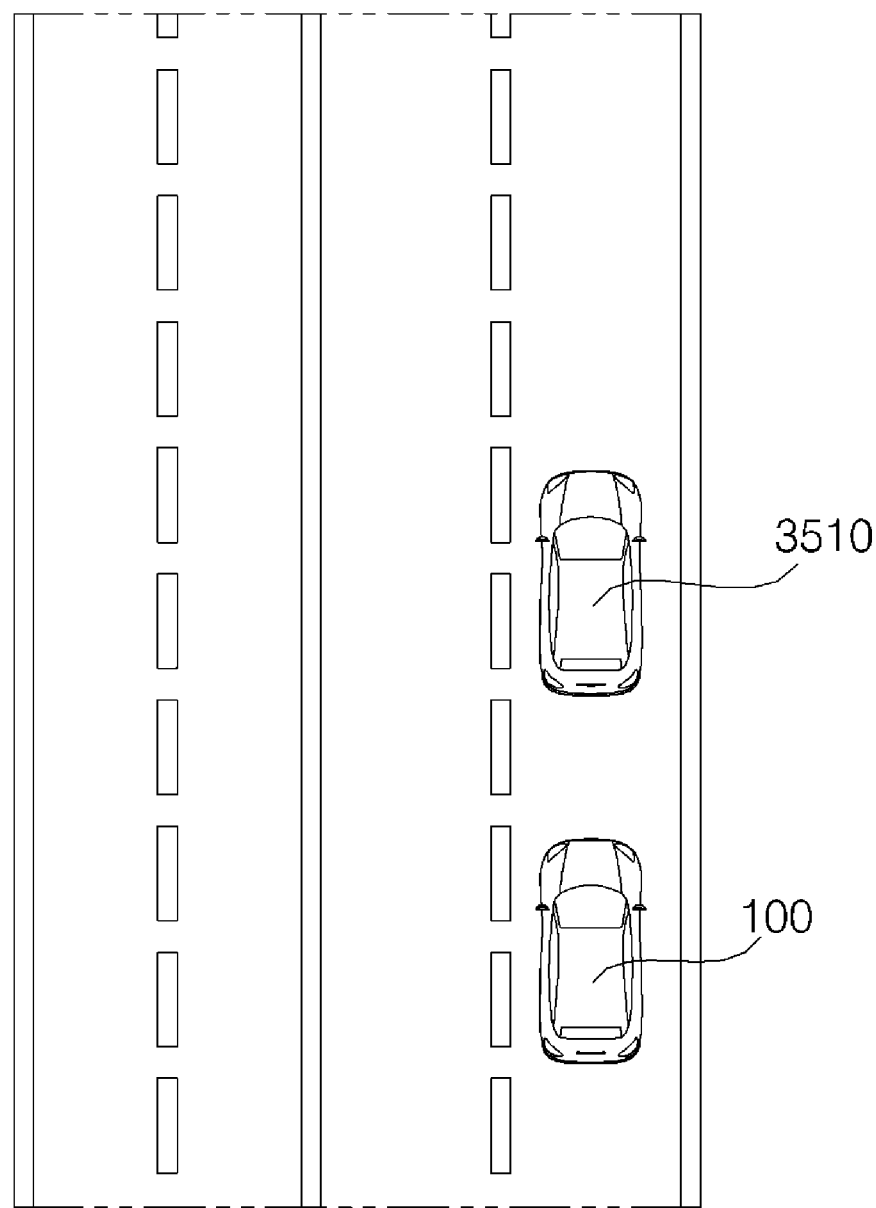
Figure 36:
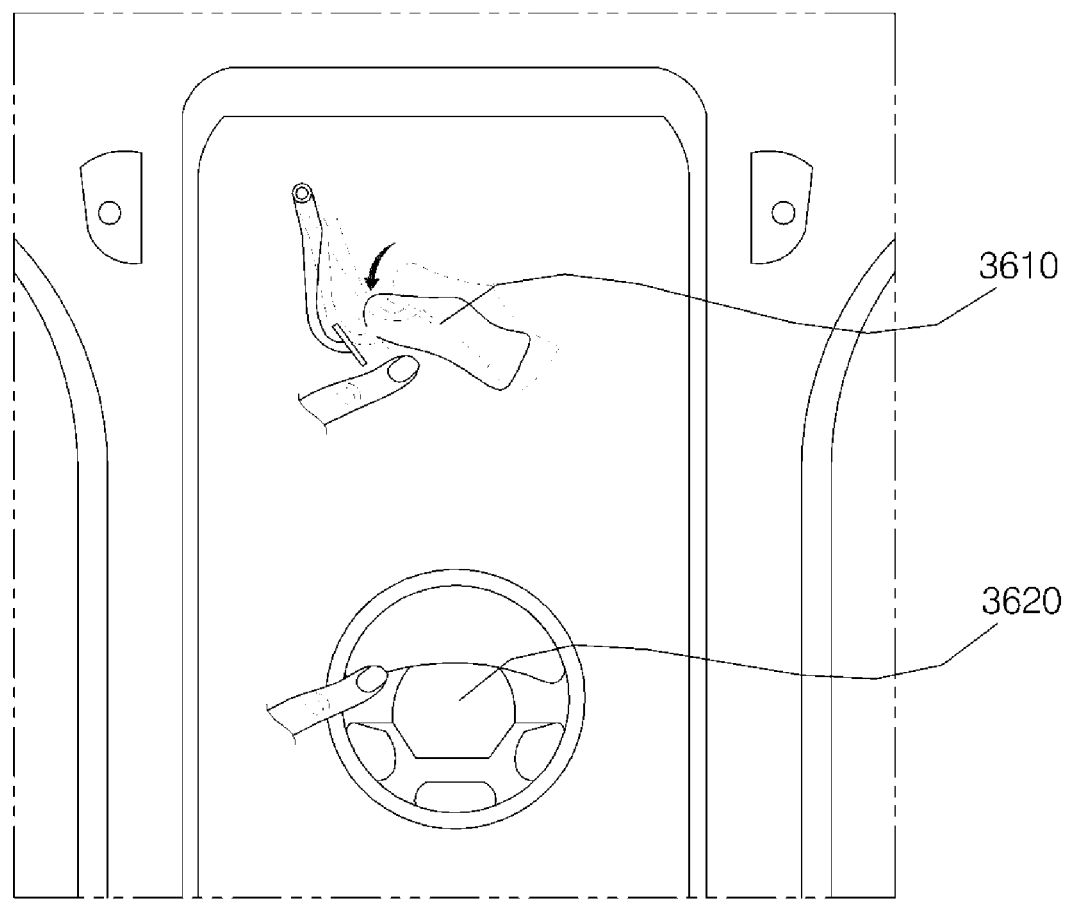

FIGS. 34 to 36 are diagrams illustrating how to operate after switch to an autonomous driving state according to an embodiment of the present invention. Referring to the drawings, if criteria for switching to an autonomous driving state is satisfied, the processor 270 can control the display unit 251 to display a screen 3410 for autonomous driving operations. The criteria for switching to an autonomous driving state may be based on at least one of the following: information on execution of a preset application, information about entrance in a preset level or higher of a preset application, driver gaze information, information on a degree of driving difficulty, speed information, and traffic flow information.

The screen corresponding to autonomous driving may include a content provision screen 3410, as shown in FIG. 34. For example, the screen corresponding to autonomous driving may include at least one of a screen of providing image contents and a screen of providing music contents. The screen corresponding to autonomous driving may include a screen for operation of a vehicle utility device. For example, the screen corresponding to autonomous driving may include at least one of the following: a screen for operation of a navigation device, a screen for operation of a communication device, a screen for operation of a music play device, a screen for operation of a schedule management device, and a screen for operation of a video play device. In addition, the processor 270 can receive emergency situation information from the object detection device 300 via the interface 245.

As illustrated in FIG. 35, the object detection device 300 may generate emergency situation information based on TTC between the vehicle 100 and an object 3510 (e.g., a preceding object) which is located outside the vehicle 100. The emergency situation information may be generated based on the information on the TTC between the vehicle 100 and the object 3510.

The object detection device 300 may generate emergency situation information based on information on a distance between the vehicle 100 and the object 3510 outside the vehicle 100, and information on a speed of the vehicle 100 relative to the object 3510 outside the vehicle 100. Emergency situation information may be generated based on the information on the distance between the vehicle 100 and the object 3510 outside the vehicle 100, and the information on the speed of the vehicle 100 relative to the object 3510 outside the vehicle 100. For example, the emergency situation information may be information about a predicted collision between the vehicle 100 and the object 3510.

As illustrated in FIG. 36, if emergency situation information is received via the interface 245, the processor 270 can display a screen corresponding to autonomous driving. The screen corresponding to autonomous driving may include a brake input button 3610 or a steering input button 3620. Further, the processor 270 can control the display unit 251 to display the brake input button 3610 or the steering input button 3620.

If a user input on the brake input button 3610 is received, the processor 270 can provide a signal to the vehicle drive device 600 to control operation of a brake apparatus. Even when the user input is received from a passenger, the processor 270 can provide a signal to control operation of the brake apparatus.

If the user input on the brake input button 3610 is received after a gesture is determined to be applied from the front passenger seat, the processor 270 can provide a signal to control operation of the brake apparatus. If a user input on the steering input button 3620 is received, the processor 270 can provide a signal to the vehicle drive device 600 to control operation of a steering apparatus.

Even when the user input is received from a passenger, the processor 270 can provide the signal to control operation of the steering apparatus. If the user input on the steering input button 3620 is received after a gesture is determined to be applied from the front passenger seat, the processor 270 can provide a signal to control operation of the steering apparatus.

Embodiments of the present invention have one or more of the following effects. First, by controlling an output differently based on whether a gesture is applied from the driver seat or the front passenger seat, it is possible to help a driver to focus on driving and therefore prevent an accident. Second, when a driver does not focus on driving, it is possible to forcibly switch to an autonomous driving mode for the purpose of safety. Third, an output of a display is controlled based on vehicle state information or driver gaze information, thereby reducing a possibility for an occident to occur.

The present invention as described above may be implemented as code that can be written on a computer-readable medium in which a program is recorded and thus read by a computer. The computer-readable medium includes all kinds of recording devices in which data is stored in a computer-readable manner. Examples of the computer-readable recording medium may include a hard disk drive (HDD), a solid state disk (SSD), a silicon disk drive (SDD), a read only memory (ROM), a random access memory (RAM), a compact disk read only memory (CD-ROM), a magnetic tape, a floppy disc, and an optical data storage device. In addition, the computer-readable medium may be implemented as a carrier wave (e.g., data transmission over the Internet). In addition, the computer may include a processor or a controller. Thus, the above detailed description should not be construed as being limited to the embodiments set forth herein in all terms, but should be considered by way of example. The scope of the present invention should be determined by the reasonable interpretation of the accompanying claims and all changes in the equivalent range of the present invention are intended to be included in the scope of the present invention.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternatives uses will also be apparent to those skilled in the art.

What is claimed is:

1. A user interface apparatus configured to be installed in a vehicle, the user interface apparatus comprising:
   a touch screen;
   a gesture detecting unit configured to detect a gesture of a user; and
   a processor configured to:
   determine whether the gesture detected by the gesture detecting unit is applied from a driver seat of the vehicle to the touch screen or from a front passenger seat of the vehicle to the touch screen, and
   control the touch screen to display a driver screen in response to the gesture being applied from the driver seat, and display a passenger screen in response to the gesture being applied from the front passenger seat,
   wherein the processor is further configured to:
   determine whether the vehicle is in a driving state, and
   disable applying of a touch input from the driver seat to the touch screen and maintain applying of a touch input from the front passenger seat to the touch screen, in case that the vehicle is in the driving state.

2. The user interface apparatus according to claim 1, further comprising:
   an internal camera configured to detect a gaze of a driver and a gaze of a passenger,
   wherein the processor is further configured to disable displaying of a screen on the touch screen based on driver gaze information and passenger gaze information.

3. The user interface apparatus according to claim 2, wherein the touch screen is divided into a first region and a second region,
   wherein the second region is closer to the front passenger seat than the first region, and
   wherein the processor is further configured to:
   disable displaying of a screen on the first region and applying of the touch input via the first region, and maintain displaying of a screen on the first region and applying of the touch input via the second region.

4. The user interface apparatus according to claim 1, wherein the processor is further configured to:
   change a type of a user input from a touch input to another input, in response to disabling applying of the touch input from the driver seat to the touch screen, and
   control the touch screen to display a notification informing inputs other than the touch input are enabled.

5. An autonomous vehicle comprising:
   a user interface apparatus installed in the autonomous vehicle,
   wherein the user interface apparatus comprises:
   a touch screen;
   a gesture detecting unit configured to detect a gesture of a user; and
   a processor configured to:
   determine whether the gesture detected by the gesture detecting unit is applied from a driver seat of the autonomous vehicle to the touch screen or from a front passenger seat of the autonomous vehicle to the touch screen, and
   control the touch screen to display a driver screen in response to the gesture being applied from the driver seat, and display a passenger screen in response to the gesture being applied from the front passenger seat,
   wherein the processor is further configured to:
   determined whether the vehicle is in a driving state, and
   disable applying of a touch input from the driver seat to the touch screen and maintain applying of a touch input from the front passenger seat to the touch screen, in case that the vehicle is in the driving state.

6. The autonomous vehicle according to claim 5, further comprising:
   an internal camera configured to detect a gaze of a driver and a gaze of a passenger,
   wherein the processor is further configured to disable displaying of a screen on the touch screen based on driver gaze information and passenger gaze information.

7. The autonomous vehicle according to claim 6, wherein the touch screen is divided into a first region and a second region,
   wherein the second region is closer to the front passenger seat than the first region, and
   wherein the processor is further configured to:
   disable displaying of a screen on the first region and applying of the touch input via the first region, and maintain displaying of a screen on the first region and applying of the touch input via the second region.

8. The autonomous vehicle according to claim 5, wherein the processor is further configured to:
   change a type of a user input from a touch input to another input, in response to disabling applying of the touch input from the driver seat to the touch screen, and control the touch screen to display a notification informing inputs other than the touch input are enabled.

\* \* \* \* \*